United States Patent [19]

Wishneusky et al.

[11] Patent Number: 4,975,828
[45] Date of Patent: Dec. 4, 1990

[54] MULTI-CHANNEL DATA COMMUNICATIONS CONTROLLER

[75] Inventors: John Wishneusky, Sunnyvale; Cecil Kaplinsky, Palo Alto; Anthony O'Toole, San Jose; Shahin Hedayat, Pleasanton; Shrikant Acharya, Fremont, all of Calif.

[73] Assignee: Cirrus Logic, Inc., Milpitas, Calif.

[21] Appl. No.: 84,717

[22] Filed: Aug. 5, 1987

[51] Int. Cl.⁵ .............................................. G06F 3/00
[52] U.S. Cl. ................................. 364/200; 364/228.5
[58] Field of Search .......................... 364/200, 900

[56] References Cited

U.S. PATENT DOCUMENTS 4,012,718  3/1977  Young et al. ................... 364/200 X
4,336,588  6/1982  Vernon et al. .................... 364/200

OTHER PUBLICATIONS

National semiconductor, INS8250-B Asynchronous Communications Element, May 1980, pp. 1 through 16.
National Semiconductor, NS1645/INS8250A/NS16C450/INS82C50A Asynchronous Communications Element, Feb. 1985, pp. 1-18.
National semiconductor, NS16550 Asynchronous Communications Element with FIFOs, Feb. 1986, pp. 1 through 20.
Signetics, SCN2651 Programmable Communications interface, Jan. 1983, pp. 1-1 through 1-14.
Signetics, SCN2652/SCN68652 Multi-Protocol Communications Controller, Jan. 1983, pp. 1-15 through 1-32.
Signetics, SCN2661/68661 Enhanced Programmable Communications Interface, Jan. 1983, pp. 1-51 through 1-67.
Signetics, SCN2681 Serial Dual Asynchronous Receiver/Transmitter (DUART), Jan. 1983, pp. 1-through 681-85.
Signetics, SCC2698 Octal Universal Asynchronous Receiver/Transmitter (Octal-UART), Apr. 1986, pp. 1-19.
Intel 8273, 8273-4, 8273-8 Programmable HDLC/SDLC Protocol Controller, 1979, pp. 1-137 through 1-161.

*Primary Examiner*—Raulfe B. Zache
*Attorney, Agent, or Firm*—Skjerven, Morrill MacPherson, Franklin & Friel

[57] ABSTRACT

This invention provides a flexible, general-purpose, engine-based architecture for a multi-channel data communications controller. It can be customized to handle a wide range of protocols and other host system requirements with minimal reliance on the host's processing power. The always present time-critical tasks of transmitting and receiving serial data, as well as transmitting and receiving characters to/from the host, are handled quickly and efficiently by utilizing dedicated interface processors. This leaves the general purpose main engine less burdened with these time cricital tasks, enabling it to perform the relatively more complex (though less time critical) tasks of assembling and disassembling characters, as well as maintaining RAM-based data FIFOs and performing error-checking and other protocol-related tasks. Custon protocols can be implemented merely by re-microcoding the machine, without requiring modifications to the basic architecture of the chip, substantially reducing design time. The flexibility of this general purpose architecture enables controllers to be more customized to a particular user's requirements, resulting not only in faster performance by the controller itself, but also in far less reliance on the host's processing power. What could previously only be done by the host in software can now be done by the controller itself much more quickly.

18 Claims, 12 Drawing Sheets

CHARACTER already Assembled

STATUS already Determined

Threshold (Recieve Data FIFO) specified by Host

LASTSTATUS = "good data"

COUNTER = 0

---

→ Get CHARACTER, STATUS

Store CHARACTER, STATUS in Recieve Data/Status FIFO

IF COUNTER = THRESHOLD

Set BIL Receive Interrupt Register with Ch#, "ready to assert"

Set Up BIL Pointer (FIFO Address) and Count Registers (from COUNTER)

COUNTER = 0

IF STATUS ≠ LASTSTATUS

STATUS = LASTSTATUS

Set BIL Receive Interrupt Register with Ch#, "ready to assert"

Set Up BIL Pointer (FIFO Address) and Count Registers (from COUNTER)

COUNTER = 0

COUNTER = COUNTER + 1

FIGURE 6 ish r1,r2 r1[1:0] contains encoded character length in two least significant bits
r2 will contain assembled character (right-justified)

| X7 | X6 | X5 | X4 | X3 | X2 | X1 | X0 |

I-Bit contains most recently sampled character

| | | | | | | | | |
|---|---|---|---|---|---|---|---|---|
| IF r1[1:0] = 00 | r2 = | 0 | 0 | 0 | 1 | X4 | X3 | X2 | X1 |
| IF r1[1:0] = 01 | r2 = | 0 | 0 | 1 | X5 | X4 | X3 | X2 | X1 |
| IF r1[1:0] = 10 | r2 = | 0 | 1 | X6 | X5 | X4 | X3 | X2 | X1 |
| IF r1[1:0] = 11 | r2 = | 1 | X7 | X6 | X5 | X4 | X3 | X2 | X1 |

RIGHT
JUSTIFIED
CHARACTER

| | | | | | | | |
|---|---|---|---|---|---|---|---|
| 5 "ish" instructions | 0 | 0 | 0 | I5 | I4 | I3 | I2 | I1 |
| 6 "ish" instructions | 0 | 0 | I6 | I5 | I4 | I3 | I2 | I1 |
| 7 "ish" instructions | 0 | I7 | I6 | I5 | I4 | I3 | I2 | I1 |
| 8 "ish" instructions | I8 | I7 | I6 | I5 | I4 | I3 | I2 | I1 |

FIGURE 7A

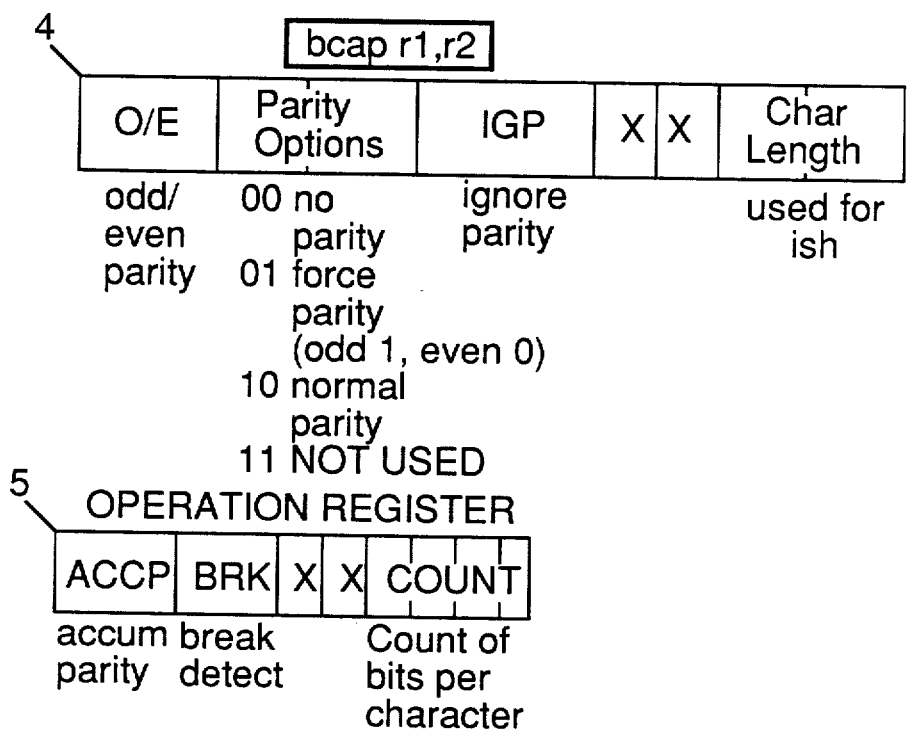

4. bcap r1,r2

| O/E | Parity Options | IGP | X | X | Char Length |
|---|---|---|---|---|---|
| odd/ even parity | 00 no parity<br>01 force parity (odd 1, even 0)<br>10 normal parity<br>11 NOT USED | ignore parity | | | used for ish |

5. OPERATION REGISTER

| ACCP | BRK | X | X | COUNT |
|---|---|---|---|---|
| accum parity | break detect | | | Count of bits per character |

ACCP = Generate accumulated Parity(as specified in Option Register) on ACCP and Current Bit (also used to test)

1. Accumulated Parity  ACCP = ACCP [Parity] I-Bit
   Generation and Check

ACCP is running generated parity
      can also check final parity when
      parity bit is received
   [Parity] specified in Option Register
   I-Bit is current bit upon entry, but is replaced
      by parity error status after parity bit checked 2. Break Condition Detect  BRK = BRK [logical OR] I-Bit BRK will equal "1" after all character bits sampled
   unless Break Condition (all zeros) satisified
   BRK is also gated into "c" flag of Index Register 3. Character Bit Count  COUNT = COUNT - 1

IF COUNT = 0
      set "Z" (zero) flag
      in ALU Index Register

FIGURE 7C

| "context return" | |
|---|---|
| rx | addr |
| rx z | addr |
| rx nz | addr |
| rx c | addr |
| rx nc | addr |
| rxi | addr |
| rx ni | addr |

IF [condition]

Store [addr] into Context RAM location corresponding to current Channel#,T/R bit RETURN (from microsequence)

|  | [conditions] |
|---|---|
| rx | UNCONDITIONAL RETURN |
| rxz<br>rxnz | Index Register "z" bit |
| rxc<br>rxnc | Index Register "c" bit |
| rxi<br>rxni | Index Register "i" bit |

FIGURE 7D

MULTI-CHANNEL DATA COMMUNICATIONS CONTROLLER

FIELD OF THE INVENTION

This invention relates generally to multi-channel data communications controllers and, in particular, to a flexible, general-purpose, engine-based architecture for such controllers that can be customized to handle a wide range of protocols and other host system requirements with minimal reliance on the host's processing power.

BACKGROUND OF THE INVENTION

Communication (whether synchronous or asynchronous) between two computers, or between various components of a computer system, is often accomplished serially, one bit at a time. Yet, microprocessors, microcontrollers and other computing devices handle data bits in parallel (often eight bits at a time), as actual data characters. Therefore, whether data is sent over phone lines, requiring the use of modems, or directly to a peripheral device (such as a serial printer), a communications interface is required, between the "host" processor (parallel data) and the device with which the host communicates, such as a modem or serial printer (serial data).

This interface device must convert is host's outgoing parallel data into serial data bits, and incoming serial data bits into data characters for the host. In addition, it may perform error-checking and various other protocol-related requirements, as well as handle the interfaces with the host system and the serial device with which the host communicates.

Such interface devices are commonly referred to as data communications controllers, or serial controllers, because they control the transmission and receipt of data through one of the host's serial ports (connected to a modem, serial printer or other serial device). Each serial port, or communications "channel, " of the host processor, must be controlled by such a device.

To avoid some of the hardware overhead involved when a separate controller is utilized for each channel, multi-channel devices have been developed. These devices handle multiple communications channels simultaneously, generally by duplicating hardware for each additional channel.

Because data is frequently sent through multiple channels simultaneously, recent multi-channel controllers have come to include hardware data queues ("first-in, first-out" queues or "FIFOs"), for both the transmission and the receipt of data across multiple channels. These FIFOs store data relating to each channel temporarily, until the host processor has time to access such data.

Multi-channel controllers also contain various registers (for storing communications parameters, such as baud rate and size of characters, for each channel), timers/counters (to synchronize the transmission and receipt of data) and mostly random logic to perform the primary tasks of sending/receiving data bits and assembling/disassembling data characters.

Current UARTs, such as the National Semiconductor NS 16550 ACE (Asynchronous Communications Element with FIFOs), and even multi-channel UARTs such as the Signetics SCC2698 Octal UART (eight-channel universal asynchronous receiver/transmitter), provide the host system with little flexibility beyond the setting of parameters (such as baud rate and data character size).

If a user desires to implement a customized protocol, or a collection of differing protocols, current controllers will either perform such tasks inefficiently (due to extensive reliance on the host's processing power—e.g., to implement "Xon/Xoff"data flow control—and an inability to recognize "special" characters, or even modify the the number and size of FIFOs and timers/counters), or be incapable of performing such tasks altogether.

Of interest in this area is the Intel 8273, 8273-4, 8273-8 Programmable HDLC/SDLC Protocol Controller, which, although technically microprogrammed, is built around an architecture dedicated to the HDLC and SDLC synchronous protocols. Employing the same architecture in a UART application, for example, would either be impossible or would result in an extremely inefficient device.

Moreover, current system design techniques necessitate custom controller architectures for custom protocols. Although multiple channels can be supported by such custom controller architectures, this is accomplished by practically duplicating the single-channel architecture for each additional channel.

The result of all of this inflexibility is that users with varying communications requirements end up with either too large a chip (with an excess of unnecessary features) or too small a chip (incapable of meeting the user's requirements).

SUMMARY OF THE INVENTION

What is therefore needed is a flexible data communications architecture—i.e., an engine-based, microprogrammed architecture, with dedicated processors to handle the controller's external interfaces, to the host system and to the multiple serial devices with which the host is communicating. This invention handles the always present tasks of transmitting and receiving serial data, as well as transmitting and receiving characters to/from the host, quickly and efficiently, utilizing dedicated processors. This leaves the general purpose main engine less burdened with these time critical tasks, enabling it to perform the relatively more complex (though less time critical) tasks of assembling and disassembling characters, as well as maintaining the data in the FIFOs and performing error-checking and other protocol-related tasks.

This invention is not restricted, for example, to four or five popular baud rates, but can implement virtually any specified baud rate, within a reasonable range (without the necessity of an additional external clock source). Moreover, custom protocols can be implemented merely by re-microcoding the machine, without requiring modifications to the basic architecture of the chip, substantially reducing design time. The entire user interface can be customized. The user can modify the size of FIFOs (implemented in RAM) as well as the number of timers/counters for a particular channel. Even the method and prioritization of interrupting the user can be modified, because such "control" features are implemented in firmware, and performed by a general purpose engine, rather than rigidly fixed in dedicated, random logic.

The flexibility of this general purpose architecture enables controllers to be more customized to a particular user's requirements, resulting not only in faster performance by the controller itself, but also in far less reliance on the host's processing power. What could previously only be done by the host in software can now be done by the controller itself much more quickly. Finally, this general architecture speeds up design time and results in smaller chips exhibiting greater functionality.

This invention overcomes the above-described obstacles by providing a general purpose, multi-channel data communications architecture, consisting of a hierarchy of three tiers of processor control.

The first tier of processors, "Bit Engines" (or, in some embodiments, "characters engines" of engines defined in terms of whatever units of data are required) handles the tasks which occur most frequently—the transmission and receipt of serial data to/from the multiple serial devices with which the controller communicates directly. In the current embodiment (described in detail below), two Bit Engines are utilized, one for the transmission of each bit to each external serial device )"Output Bit Engine" or "OBE") and one for the receipt of each bit from each such device ("Input Bit Engine" or "IBE").

As multiple serial devices simultaneously vie from the controller's attention (both to send and receive bits), these Bit Engines must handle all requests for service. The IBE must sample and recognize each incoming bit, while the OBE synchronizes the transmission of each outgoing bit. Both Bit Engines must constantly interrupt the "Main Engine" for service—to transfer each incoming bit or ask for the next outgoing bit, as well as to modify the appropriate timers/counters corresponding to the next "state" of that Bit Engine.

Regardless of the precise functions performed by these Bit Engines (described in detail below), the Bit Engines must perform these functions extremely quickly (in "bit time") so as not to miss the next bit-time period during which they must either send or receive the next bit. Highest priority is therefore given to these Bit Engines.

Upon receiving interrupts from the Bit Engines, the Main Engine must also quickly perform its "foreground" tasks of assembling and disassembling characters. In other words, given a data character from the host to be output from a particular channel, the Main Engine must disassemble that character into individual bits in time for the OBE to access such bits when it is ready for the next bit transfer. Similarly, the Main Engine must assemble each bit received by the IBE into the character being formed which, when completed, will be transferred to the host.

Next in priority to the constant barrage of bits entering and leaving the system is the "Bus Interface Logic" (or "BIL") which handles the "user interface" to the host processor. Data characters must be sent to and received from the host in an orderly fashion. Arbitration must be performed on the data and address busses to enable the BIL to master the bus to perform these tasks, while periodically enabling the Main Engine to perform its remaining "background" tasks.

The lowest priority is thus reserved for these background tasks performed by the Main Engine. These include managing the data in the FIFOs, scanning for the necessity of interrupting the host processor to send or receive data characters, and performing various timing delay, flow control and break detection functions. In short, the Main Engine performs, in the background, the complex, character-oriented (and therefore less time critical) tasks associated with customized protocols and other special requirements of the host system.

Thus, this three-tiered processor hierarchy enables time critical tasks to be performed quickly and efficiently by the Bit Engines and the Main Engine (foreground tasks), and the user interface to be handled by the BIL, while leaving the general purpose Main Engine relatively free to perform a vast array of complex (background) task which the user may incorporate into the controller via firmware. The result is an efficient, seemingly customized chip which can be designed quickly and relieves the host processor of the responsibility for performing the time-consuming tasks associated with multi-channel data communications.

In order to achieve efficient interaction among the three tiers of processors, a number of unique features have been incorporated into the design of this general purpose architecture. Most of these features facilitate the job of the host processor, freeing that processor from the responsibility of handling many of the more mundane, yet time-consuming tasks. These features will be described below in greater detail, but are briefly summarized here.

One such feature, "Good Data Interrupt," was created because most controllers not only assemble the serial data they receive from external devices into characters, but also perform a certain degree of error-checking on that data. It is therefore common for the host system to check the "status" of each character it receives from the controller. If that status indicates that the transmission of the character resulted in a communications error, for example, the host might execute an appropriate service routine to handle such an error. Checking the presence and status of each character (to determine what action to take) is a very time consuming task for the host processor to perform.

This Good Data Interrupt features relieves the host processor of most of the overhead associated with that task. Because most data received by the controller is "good data" (i.e., not the result of a communications error, or an exception such as a special character designated by the user), there is really no need to interrupt the host processor to inform it of each type of possible status. Rather, it is only necessary to interrupt the host to inform it that the status of the type of data has changed from one character to the next, and to inform the host of the number of characters of "good data" available for transfer.

So, for example, if twenty-two characters are received (ten characters of "good data" followed by an illegal character, a special character designated by the user, and then ten more good characters . . . so far), the host only needs to be interrupted four times (not twenty-two times), once to tell the host that ten characters of good data are available for transfer, a second time to tell the host than an illegal character was received, and a third time to inform the host that the special character the host was "on the lookout for" has arrived. Eventually, a fourth interrupt will inform the host of the second string of good characters, but only when that string is broken by some other type of character status (such as an illegal or special exception character), or when the host-specified threshold of characters has been received.

Another unique user interface feature made possible by this general purpose architecture, "Automated Data Transfer", involves the actual mechanism utilized for data transfer between the controller and the host processor. Even though multiple channels may be involved, this architecture retains the flexibility inherent in implementing FIFOs in RAM, while providing performance comparable to that achieved by dedicated hardware FIFOs.

Current controllers utilize dedicated hardware FIFOs with fixed addresses, requiring the host processor to manipulate pointers to transfer a block of data to or from the controller. For example, if the host desires to receive a block of sixteen characters, current controllers require that the host supply the controller with the address of the FIFO associated with the receiving channel.

This Automated Data Transfer mechanism relieves the Main Engine of the overhead of pointer manipulation. Rather than overburden the Main Engine with this task, the BIL is designed to perform this task with one set of pointer/counter hardware, rather than multiple dedicated hardware FIFOs with their associated addressing mechanisms. The preferred embodiment discussed below actually utilizes two sets of pointers/counters to provide a pipelining of successive interrupts.

Thus, the host need only "remember" three unique addresses, one to receive data, one to receive the status of that data and a third to transmit data. The host need not know either the actual size or location of the FIFOs. Even the appropriate channel number and direction is maintained by the controller.

Thus, in the example mentioned above, upon receiving an interrupt indicating that sixteen characters of data have been received (the host will already know if that data is "good data"), the host need only supply the "address" for the "receive data FIFO," and the Automated Data Transfer mechanism will respond to that address by using a pointer to the actual initial address in RAM where that data is stored. Moreover, dedicated counters will automatically decrement the count of characters, until all sixteen characters have been transferred, while incrementing the pointer to the actual RAM addresses where those characters are stored. The same mechanism permits the transfer of status information as well as the transmission of data by the host, relieving the host of the responsibility of maintaining actual addresses and manipulating pointers.

The BIL mechanism mentioned above shares a method of addressing ("context-oriented addressing") with another unique feature of this architecture—its "State Interrupt Handling" mechanism. Context-oriented addressing is implemented to enable the host, as well as the BIL and the Main Engine, to perform functions without regard to the particular channel with which they are associated. This addressing mechanism is useful because, aside from accessing the appropriate resources associated with a particular channel, the functions performed by the host, the BIL and the Main Engine are essentially channel independent.

Thus, local and global addresses are utilized. Global addresses refer to the actual "memory-mapped" locations of the FIFOs and other RAM-based "devices," as well as the actual hardware registers associated with the IBE, OBE, BIL, Main Engine and other modules of the controller, which are not channel specific. Local addresses essentially partition the memory map into equivalent segments associated with a particular channel. Thus, local addresses may be employed to access corresponding registers in any of the channels.

While local/global addressing schemes are supported by the instruction sets of many of today's computers, the context-oriented addressing mechanism utilized in the Main Engine's Interrupt Handler enables this microcoded engine to perform much like a hardwired state machine, combined with a dedicated interrupt vectoring mechanism. An area of RAM, designated as "context RAM," contains a series of entry points to firmware routines, one for each combination of channel numbers and their direction (transmit or receive).

Upon receiving an interrupt from the IBE or the OBE, the Main Engine, using the known channel number and direction supplied by the Bit Engines, immediately vectors to the entry point (contained in the context RAM table) of the appropriate firmware routine. Context-oriented addressing enables this vectoring process to occur almost as rapidly as if it were hardwired.

Moreover, an additional mechanism (the "context return" opcode described below) enables these vectors to point to the appropriate firmware routine, even if there are more routines than there are channel number/direction combinations. This is achieved by having the firmware itself modify the context RAM entry points before the end of each routine, loading in the known entry point of the next appropriate routine (to be executed at some later time, after the next Bit Engine interrupt for that same channel and direction).

A final unique mechanism "Character Assembly/Disassembly" instruction, facilitates the general purpose Main Engine's performance of the time-critical foreground tasks associated with assembling and disassembling characters. These unique opcodes, each performed by the Main Engine's ALU in one machine cycle, represent basic building blocks of the character assembly/disassembly process.

Briefly, these instructions consist of four opcodes: (1) the "ish" opcode, which efficiently shifts the received bit into the appropriate location in the character being assembled, so that the assembled character will be right-justified; (2) the "osh" opcode, which performs the corresponding function for character disassembly, (3) the "bcap" opcode, which decrements the bit count to indicate when an entire character has been sent or received, while also calculating the accumulated parity, bit by bit, of that character (both for parity generation, for outgoing characters, and for detecting parity errors, for incoming characters) as well as checking for the break condition (a character consisting entirely of zeros), and (4) the "context return" opcode, alluded to earlier, in which each firmware routine returns the entry point of the next appropriate routine to be executed for the transmission or receipt of data across the then-current channel.

The three-tiered processing architecture summarized above, with its associated Good Data Interrupt, Automated Data Transfer, State Interrupt Handling and Character Assembly/Disassembly mechanisms, is described in detail below in the context of the preferred embodiment of this invention—the CL-CD180 eight-channel asynchronous communications controller ("MCCC OCTART").

It should be noted that the flexibility achieved with this invention enables many other embodiments, which can handle synchronous as well as asynchronous protocols. For example, character-oriented protocols can be implemented by transforming the Bit Engines into "Character Engines," and adding additional character recognition logic, and perhaps DMA hardware (to speed up memory throughput) and CRC error-checking hardware (to free up the Main Engine). Even Bit-Oriented Protocols can be implemented with this architecture, although intelligent "buffer managers" and "memory controllers" may be required.

Although additional hardware support may be necessary, the complexity of even customized, synchronous protocols can be handled merely by re-microcoding this general purpose architecture, resulting in dramatic reductions in the time required to customize a multi-channel communications controller.

Variable numbers of times/counters, flow control (e.g., "Xon/Xoff"), special character detection, interrupt handling and even existing product emulation can be implemented in this manner. Moreover, by implementing this general architecture using "storage logic array" ("SLA") technology, a variety of hardware logic modifications can be achieved through mere metal mask changes.

This invention will be more fully understood in conjunction with the following detailed description, illustrated by the attached drawings.

BRIEF DESCRIPTION OF THE DRAWINGS

FIG. 6 illustrates the logic flow underlying the firmware embodiment of the Good Data Interrupt mechanism (which can also be embodied in random logic).

FIGS. 7a, 7b, 7c and 7d illustrate the logic flow of the Character Assembly/Disassembly opcodes ("ish," "osh," "bcap" and "context return"), executed by the ALU in the Main Engine module of the MCCC OCTART.

DETAILED DESCRIPTION OF PREFERRED EMBODIMENT

The following description is meant to be illustrative only and not limiting. While the preferred embodiment of this invention is described, other embodiments (implementing custom synchronous and other serial protocols, parallel protocols, such as the "centronics" interface, as well as a variety of enhancements to the controller's user interface) will be obvious in view of the following description.

GENERAL ARCHITECTURE

Figure 1A:
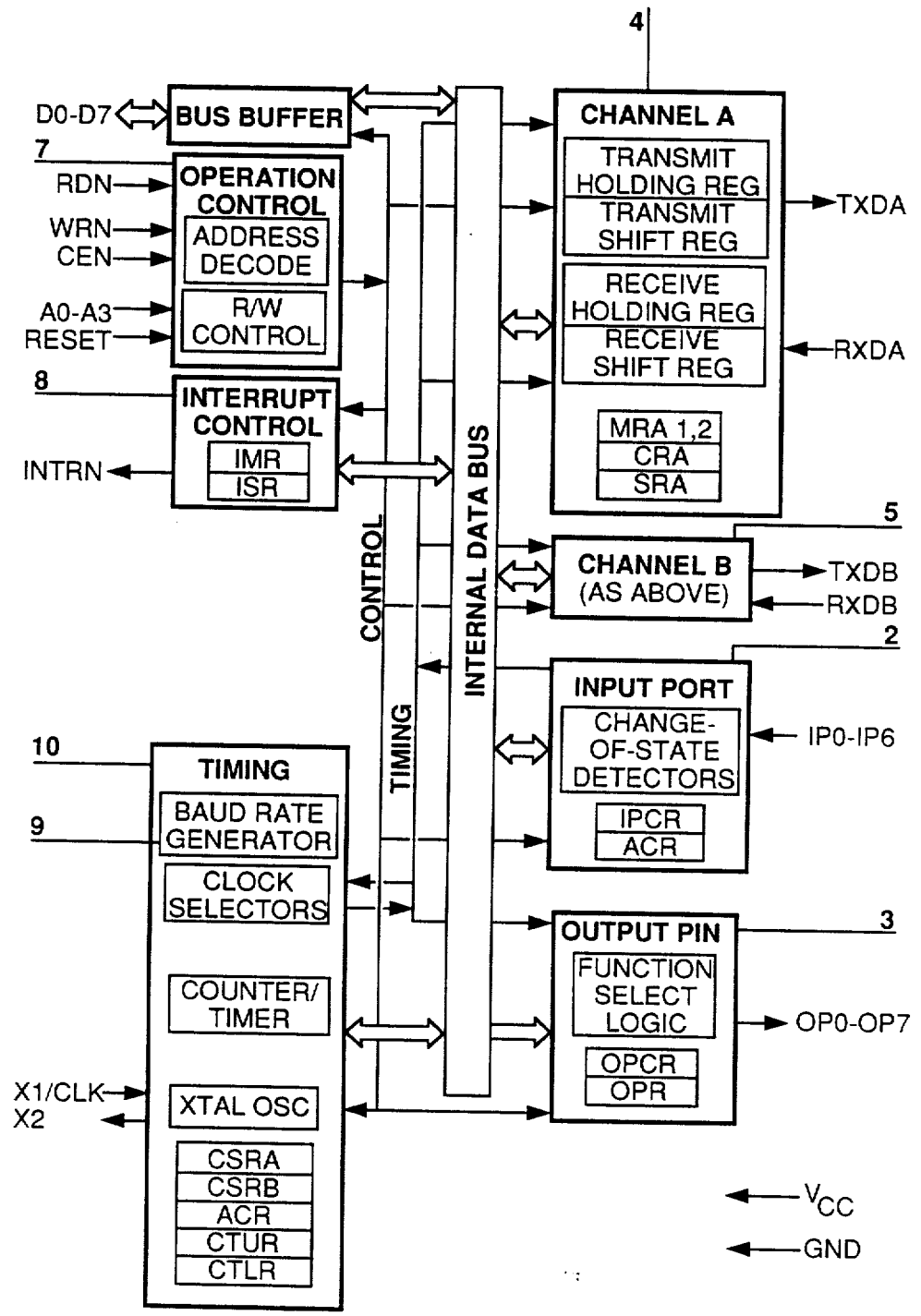
FIGS. 1a and 1b illustrate the rigid architecture of a typical multi-channel data communications controller, and, in particular, the duplication of dedicated logic from a two-channel (FIG. 1a) to an eight-channel (FIG. 1b) device.
Figure 1B:
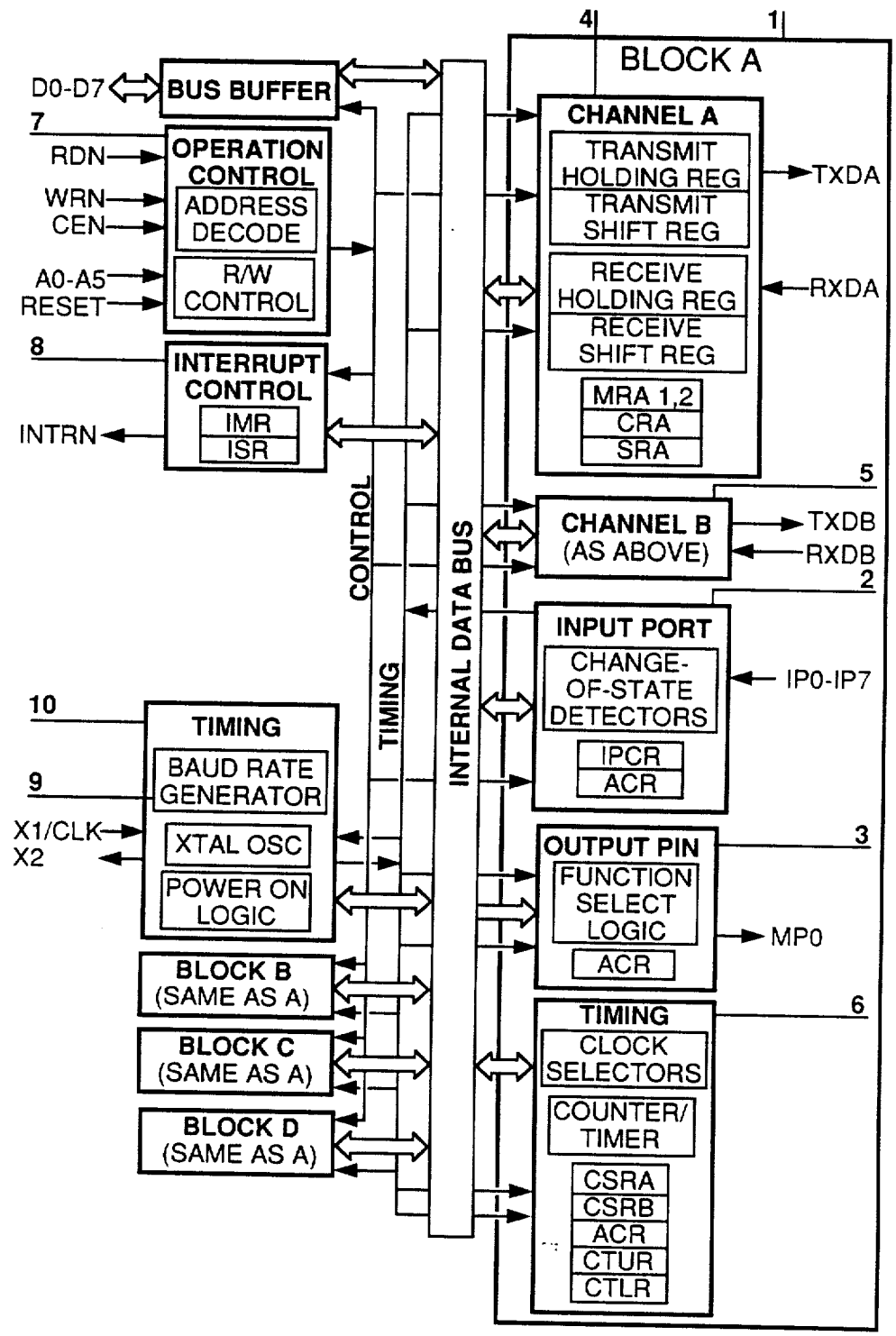

FIG. 1b illustrates a typical multi-channel UART architecture, that of the Signetics SCC2698 Octal UART. Note that Block A 1 contains dedicated logic to transmit and receive serial data from any of two external serial devices, as well as to assemble and disassemble data characters (using Channel A 4 and Channel B 5).

Dedicated logic in Channel A shifts bits into and out of holding registers in order to assemble and disassemble data characters for communication with one external serial device. Such logic is duplicated in Channel B, enabling such assembly and disassembly of characters for communication with two separate external serial devices. Additional Timing logic 6 is used to implement the appropriate baud rate for such communication, based upon pre-defined parameters loaded into hardware counter registers.

Note that all Block A, including its Timing logic, as well as its input Port, Output Pin, Channel A and Channel B modules, is duplicated three more times in order to achieve the functionality of an eight-channel device. In other words, this eight-channel "octart" is created, for the most part, by duplicating the logic of the two-channel "duart," illustrated in FIG. 1a. Some logic, of course, is not duplicated—e.g., the Operation Control 7 and Interrupt Control 8 modules, which handle communications with the host processor, as well as the Baud Rate Generator 9 and other timing logic 10. Nevertheless, the vast majority of the logic in the two-channel device (see FIG. 1a) has simply been duplicated to create an eight-channel device.

Comparing FIG. 1a and FIG. 1b to FIG. 2, however, (a block diagram of the preferred embodiment of this invention, the MCCC OCTART), it can be seen, even from this rough block diagram, that no such duplication of logic has occurred. There exists only one engine, the IBE A, for receiving bits of data from external serial devices. This engine does not even contain logic to assemble these bits into data characters. Rather, it is dedicated solely to sampling and receiving bits of data from any of eight external serial devices, and then interrupting the Main Engine B, which executes firmware routines to perform character assembly.

Similarly, there exists only one engine, the OBE C, for transmitting bits of data to external serial devices. This engine, which does not contain logic to disassemble data characters, is dedicated solely to synchronizing the transmission of data to any of eight external serial devices, interrupting the Main Engine to initiate character disassembly functions via firmware, and to provide additional bits of data for transfer.

Thus, these two I/O Bit Engines handle multiple channels not by duplicating their logic multiple times, but by utilizing time division multiplexing to "time share" handling of the transmission and receipt of bits across multiple channels. In essence, each of the two Bit Engines quickly scans each channel to sample incoming bits and to transmit outgoing bits.

The MCCC OCTART performs the same basis functions (serial data transfer with external devices, data character transfer with the host processor, and character assembly and disassembly) on one chip (clocked at 10 MHz in this embodiment by a master clock) as do other multi-channel serial controllers, such as the Signetics Octal UART. Yet, the MCCC OCTART isolates those functions into three distinct tiers of processors.

The BIL D handles all communications, including interrupts and data character transfers, with the host processor. The IBE and OBE handle all serial data transfers with external devices. The Main Engine is left free to perform the time critical functions of character assembly and disassembly, enabling it also to perform a vast array of other complex internal data management and protocol-related functions under microcode control—i.e., with great flexibility for customization.

For example, the received data FIFO of the Signetics Octal UART has a fixed capacity of three characters. This may be sufficient for certain communications requirements, but insufficient for others, resulting in many delays during data transfer. Because the MCCC OCTART architecture contains RAM-based FIFOs E, as opposed to hardware FIFOs, and can resize those FIFOs (either dynamically, or by modifying the firmware), the size of FIFOs can be customized to the user's specific requirements. One channel might require a three-character FIFO, whereas another channel might require a ten-character FIFO, and still another channel might not required a FIFO at all.

Moreover, counters/timers can serve a variety of purposes, such as synchronizing the transmission or receipt of data bits, counting the number of data bits or characters transferred or received, or even determining how much time has passed between the receipt of particular data characters. The number of different uses for such counters/timers is virtually limitless.

It is therefore extremely useful to be able to customize the precise function as well as the number and size of features such as counters/times. This is accomplished in the MCCC OCTART through changes in firmware. Counters/timers can be as large and as numerous as desired, limited only by the amount of RAM configured for such purposes. More importantly, the functionality of the counter can be truly programmed (e.g., the rate of decrementing the counter might accelerate after a certain period of time). The Signetics Octal UART, on the other hand, offers only the limited flexibility of supplying four counters/timers which can be "programmed" (i.e., parameterized) only in the sense that certain timer/counter values can be specified. Their precise functionality cannot be modified, nor can their number and size be customized to precise user specifications. The result is either insufficient functionality or inefficient use of hardware resources.

Flow control ("Xon/Xoff") can even be fully implemented in the firmware of the MCCC OCTART, relieving the host processor of this task. Error-handling routines can be "built into" the controller. The controller can be programmed to interpret certain special characters in the data stream as embedded "commands." There are infinite other examples of the dramatically increased flexibility which results from utilizing a general purpose microcoded architecture, as opposed to using dedicated random logic.

In essence, many of the software constructs which could in the past only be achieved through significant host interaction can be implemented in the firmware of the MCCC OCTART. Such flexibility is simply not available with rigid random logic implementations as previously exist, for example, in the Signetics Octal UART, or in earlier Signetics communications controllers, including the SCN2651 Programmable Communications Interface, the SCN2652/SCN68652 Multi-Protocol Communications Controller, the SCN2661/SCN6861 Enhanced Programmable Communications Interface and the SCN2681 Series DUART.

It should be noted that, although many controllers use the term, "programmable," they are actually merely "parameterizable"—i.e., the user can set registers to particular data values (such as one of sixteen baud rates), which data is used by the controller to perform a fixed function on that data.

The MCCC OCTART, on the other hand, is capable of modifying not merely the data parameters used by the controller, but also the actual functional steps the controller performs (such as implementation of a custom protocol and prioritization of particular host interrupts), as well as customized "virtual resources" utilized by the controller (such as variable FIFO depth, and variable number, size and functionality of counters/timers).

Figure 2:
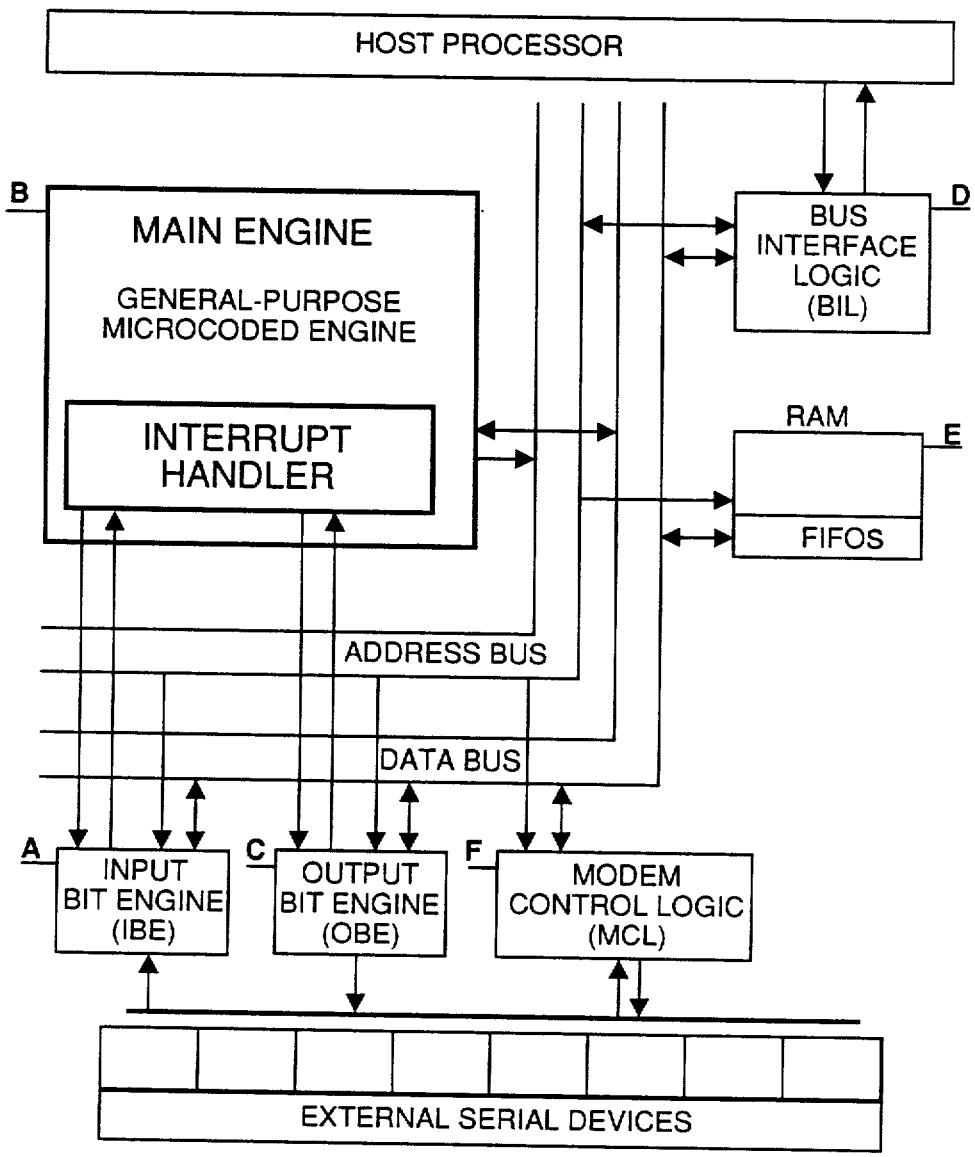
FIG. 2 illustrates the general purpose architecture of the preferred embodiment of this invention, the MCCC OCTART.

In addition to the three tiers of processors which distinguish the MCCC OCTART from previous serial controllers, FIG. 2 also illustrates the "Modem Control Logic" ("MCL") F which the MCCC OCTART utilizes, for example, if the host processor is communicating with another computer via phone lines, requiring modems on each end. The MCL provides the standard modem "handshake" signals ("data set ready,""carrier detect,""request to send" and "clear to send"), relieving the Main Engine of this task. Numerous examples of similar implementations of modem control logic exist in the art. See, e.g., the National Semiconductor INS8250-B Asynchronous Communications Element, the NS16450/INS8250A/NS16C450/INS82C50A Asynchronous Communications Element and the NS 16550 Asynchronous Communications Element with FIFOs. None of these controllers, however, possesses the flexibility inherent in the general purpose microcoded Main Engine B at the center of the MCCC OCTART architecture.

The three "processor" modules of the MCCC OCTART (the I/O Bit Engines, the BIL and the Main Engine) will now be described in detail, with particular emphasis on the unique mechanisms (Good Data Interrupt, Automated Data Transfer, State Interrupt Handling and Character Assembly/Disassembly) summarized above.

I/O BIT ENGINES

Figure 3A:
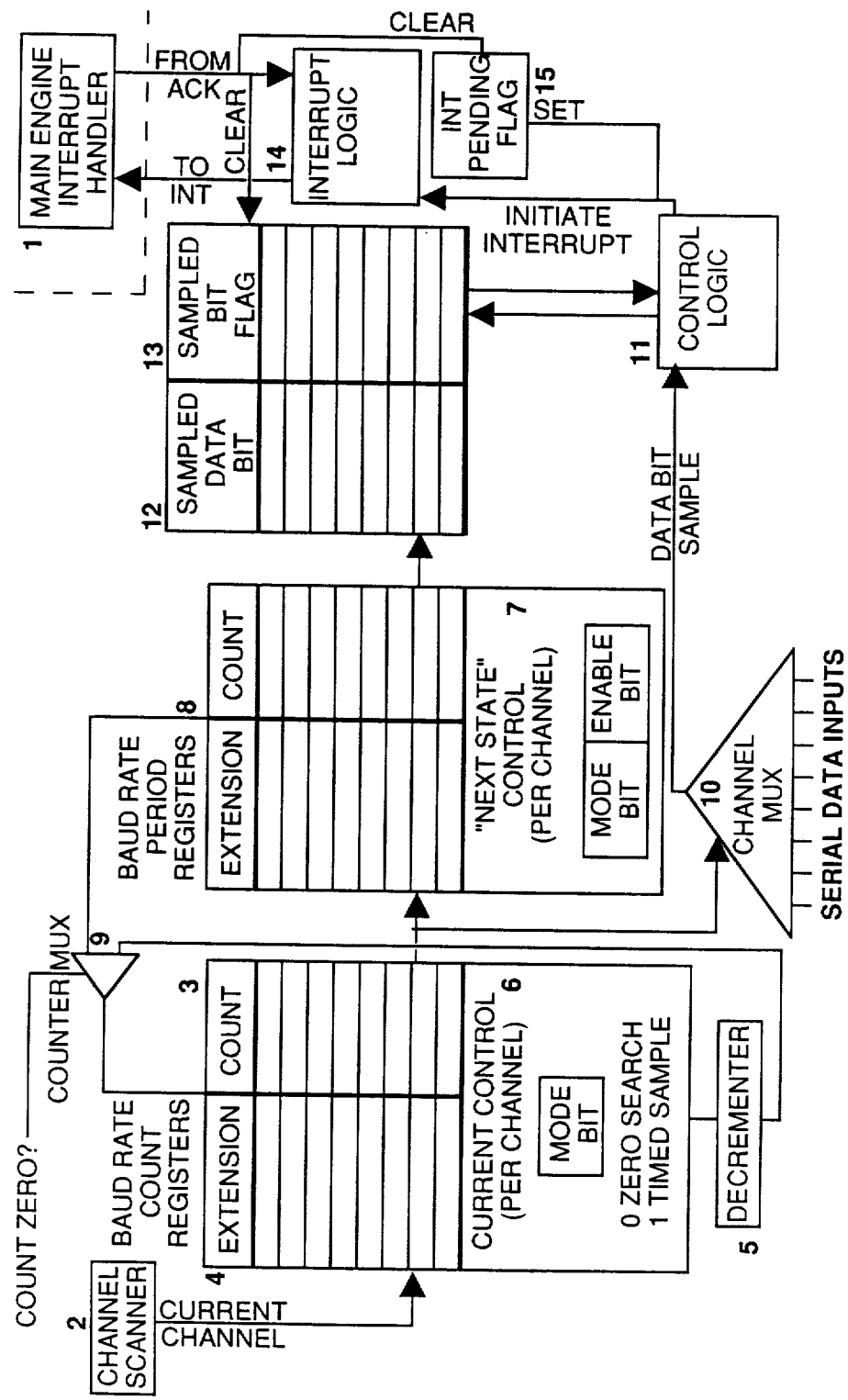
FIG. 3a illustrates in greater detail the architecture of the Input Bit Engine (IBE) module of the MCCC OCTART.

FIG. 3a illustrates the internal components of the Input Bit Engine, the function of which is to scan all external devices (with each channel having its own baud rate) for receipt of bits of data. As a bit is received, the Input Bit Engine interrupts the Main Engine's Interrupt Handler 1, which initiates the appropriate firmware routine to handle that bit.

The Channel Scanner 2 is the IBE's master channel counter. Because the MCCC OCTART communicates with up to eight external devices, the Channel Scanner repeatedly counts from one to eight, clocked by the MCCC OCTART's system clock. Thus, during each cycle of that system clock, the value of the Channel Scanner indicates the current channel being scanned.

There exists one Baud Rate Count Register 3 (16 bits in this embodiment), and one Baud Rate Extension Count Register 4 (5bits in this embodiment) for each channel. These registers are cascaded, with the Baud Rate Extension Count Register as the most significant 5 bits. Together, there are initially loaded with value equal to the number of clock ticks (divided by the total number of channels) required to sample input from that channel twice for each bit (i.e., "half-bit time").

The Baud Rate Count register is loaded with a one sixteenth-bit time (for eight channels) value, and the Baud Rate Extension Count Register is loaded with a value of eight, the composite count causing sampling to occur at half-bit time intervals. These two registers can therefore access a range from one sixteenth bit time to two-bit time, in one-sixteenth-bit time increments.

For example, given a channel with a baud rate of 1200 bits per second, and a 10 MHz system clock, then, during each second, 1200 bits will be sent or received and 10 million clock ticks will occur. Thus, assuming a configuration of three channels, the Baud Rate Count Register will count down to zero (via the Decrementer 5) in time to sample input once each bit ("bit time") if it is set to the number of clock ticks per bit (10 million divided by 1200), divided by the number of channels (3), approximately 2778. The Baud Rate Count Register will therefore be set to one-half that value (1389), permitting bits to be sampled each half-bit time.

The IBE samples inputs in one of two modes: a "timed sample" mode (in which input is sampled either every half-bit time or every full bit time), or a "zero search" mode (in which data is sampled as frequently as possible until a binary "0" is detected). There are two Control Bits for each channel. The Control Mode Bit 6 determines in which mode the IBE operates (with the Baud Rate Extension Count Register determining the frequency at which the IBE operates in timed sample mode), and the Control Enable Bit 7 determines whether that channel is enabled (because it may be desirable to completely disable a particular channel).

The "next state" values (for each channel) of the Baud Rate Count Register (set initially by the host), the Baud Rate Extension Count Register and the Control Bits, are maintained in the Period Registers 8. Whenever the Baud Rate Count Register or the Baud Rate Extension Count Register is decremented to zero (as described below), the Counter MUX 9 detects this fact and reloads the respective values from the Period Register corresponding to that channel.

In asynchronous protocols, such as those handled by this MCCC OCTART embodiment, a normal character is "framed" by a "start bit" (a binary "0") and a "stop bit" (a binary "1"), with the character itself (generally from 5 to 8 bits) in between.

When the search for a start bit begins, the IBE is always in zero search mode, as indicated by the current Control Mode Bit (associated with the Baud Rate Count Registers) for each channel. During this mode, the Baud Rate Count Registers are not decremented. Instead, the input on the current channel is sampled as frequently as possible (i.e., each "nth" clock tick, where n is the number of channels), invoking the Channel MUX 10, which causes the current channel's input to be sampled.

The Control Logic 11 checks the sampled input (knowing, from the Control Mode Bit, that it is in zero search mode). If the sampled bit is not a binary "0", the zero search is repeated. This process continues indefinitely, until a binary "0" is detected (indicating the "edge" of a potential start bit), at which point the Control Logic transfers the IBE into time sampled mode, by modifying the current Control Mode Bit. At this point, it is still possible that a valid start bit was not detected (e.g., if noise caused a momentary "0" value). This possibility is handled in the timed sample mode.

Upon entering the timed sample mode, each channel is scanned (every nth clock tick for n channels), with the current scanned channel indicated by the Channel Scanner. The corresponding Baud Rate Count Register and Baud Rate Extension Count Register are decremented, by the Decrementer, as two cascading registers. When either of these two registers reaches zero, it is reloaded with its initial value, which is maintained in its corresponding Period Register 8 (one for each channel).

The Baud Rate Extension Period Register is initially set to sample in half-bit time. This enables the "middle" of the potential start bit to be examined, to determine whether a valid start bit has been detected (assumed if a "0" is again detected at this point).

This process of decrementing the cascaded Baud Rate Count Register and Baud Rate Extension Count Register continues until the Baud Rate Extension Count Register reaches zero, indicating that it is time to sample input from the current channel. The Channel MUX is then invoked, causing the current channel's input to be sampled.

The Control Logic functions somewhat differently in timed sample mode than it does in zero search mode. It does determine from the Control Mode Bit (as in zero search mode) whether the IBE is in timed sample mode. But the similarity ends there. Because the Baud Rate Extension Count Register reaches zero relatively infrequently, compared to the rate at which the Channel Scanner scans each channel (every nth cycle, given n channels), the Control Logic must perform additional functions.

Relatively infrequently, when the Baud Rate Extension Count Register reaches zero, the Control Logic loads the sampled bit (received upon invocation of the Channel MUX) into the Sampled Data Bit Register and sets the Sampled Bit Flag (one for each channel). This flag indicates that the sampled bit is ready for inspection by the Main Engine. Once the Main Engine samples this bit, it clears the flag (sometime before the Baud Rate Extension Count Register again reaches zero for that channel). But the Main Engine must somehow be informed, via interrupt, that a bit (for the current channel) is ready for inspection.

To solve this problem, the Sampled Bit Flag also serves to notify the Control Logic of the necessity to invoke the IBE's Interrupt Logic 14 (before it loads the Sampled Data Bita and sets the Sampled Data Bit Flag), causing it to interrupt the Main Engine, informing the Main Engine that a bit is ready for inspection. Thus, during the many nth cycle periods, while the Baud Rate Extension Count Register is still counting down to zero, the Control Logic conditionally initiates interrupts to the Main Engine.

Because the IBE can have only one interrupt pending to the Main Engine at any given time, it is necessary for the Control Logic to check the Interrupt Pending Flag 15. If it is set, then the Control Logic cannot initiate another interrupt. It if is not set, and the Sampled Bit Flag for that channel is set, then the Control Logic will invoke the Interrupt Logic, causing it to interrupt the Main Engine.

In addition, the Control Logic will test the currently sampled data bit and, if and only if it is a binary "1", will reload the Control Mode Bit register from the "next state" Control Mode Bit Period register (causing the current Control Mode Bit to be set, and the zero search mode to be resumed automatically in the event of an invalid start bit).

Thus, in zero search mode (always the initial mode), the Control Logic loads the Sampled Data Register and, if the sampled bit is a binary "0", modifies the Control Mode Bit, putting the IBE into timed sample mode. In timed sample mode, during every nth cycle (for n channels), the Control Logic checks the Interrupt Pending Flag and, if it is not set and the Sampled Data Bit Flag is set, the Control Logic then invokes the Interrupt Logic to interrupt the Main Engine. When the Baud rate Extension Count Register reaches zero (relatively infrequently), causing a bit to be sampled, the Control Logic also loads the Sampled Data Bit Register and sets the Sampled Bit Flag for that channel. The additional logic, which reloads the Baud Rate Count Registers from the corresponding Baud Rate Period Registers (reloading the Control Mode Bit only if a binary "1" is detected) guarantees that the IBE will automatically remain in zero search mode until a valid start bit has been detected.

Much of the remaining logic, however, is performed by firmware routines in the Main Engine. It has already been explained that the IBE is initially in zero search mode (searching for the initial edge of a start bit), and that this process continues until a binary "0" (initial edge of start bit) is detected, at which point the Control Logic modifies the Control Mode Bit, putting the IBE into timed sample mode (half-bit time).

In timed sample mode, the IBE will also constantly be scanning the channels (each of n channels scanned every nth cycle), but, every n cycles, instead of sampling a channel's input, the Control Logic will initiate interrupts if no interrupt is currently pending and that channel's Sampled Bit Flag is set.

In addition to this interrupt function (necessary to permit the Main Engine to examine sampled bits), the Control Logic must assist the Main Engine in verifying whether the start bit edge (detected in zero search mode) is in fact a valid start bit. As mentioned above, the timed sample mode initially causes the IBE to sample input every half-bit time. Thus, the "middle" of the potential start bit will be sampled. Upon being interrupted, the Main Engine knows to invoke the firmware routine which checks for a valid start bit (by a process discussed below in the State Interrupt Handling section).

If the firmware routine determines that the start bit is invalid (because the value changed from "0" to "1" between the edge and the middle of the bit), then that routine loads its own entry point into "Context RAM," causing the same routine to be executed after each sampled bit on that channel until a valid start bit is detected. If, however, the firmware routine determines that the start bit is valid (assumed, if the bit remained a binary "0" from its initial edge to its middle), then it loads the entry point for the "end of start bit" routine, and modifies the Baud Rate Extension Period Register, causing the IBE to remain in timed sample mode.

The IBE, sampling in half-bit time, will next sample the end of the alleged start bit (which sample is ignored by the firmware). On this interrupt, the foreground routine will reload the Baud Rate Extension Period Register to cause future samples to occur at full bit time intervals.

The Baud Rate Period Registers will not, however, be loaded into the Baud Rate Count Registers until after the "middle" of the first bit of the character (one half-bit time later) is sampled, generating an additional interrupt to the Main Engine. An interrupt will be generated from the sampling of the middle of this first bit of the character, as well as for successive bits of that character (at one bit time intervals), Each of these interrupts will cause the Main Engine to invoke firmware routines to assemble that character from the sampled bits. These functions are discussed in detail below in the Main Engine and Character Assembly/Disassembly sections.

The final action taken by the IBE involves the detection of the stop bit. Because the Main Engine knows the width (number of bits) of data characters, it knows when the stop bit should occur and, after sampling the middle of the stop bit, determines if that stop bit is in fact valid. If so, the Main Engine firmware routine simply modifies the "next state" Control Mode Bit (associated with the Period Registers), eventually putting the IBE back into the zero search mode (looking for the initial edge of the next character's start bit), starting the entire character detection process over again. If the stop bit was invalid, the Main Engine firmware detects that fact, and can inform the host processor of a framing error.

Figure 3B:
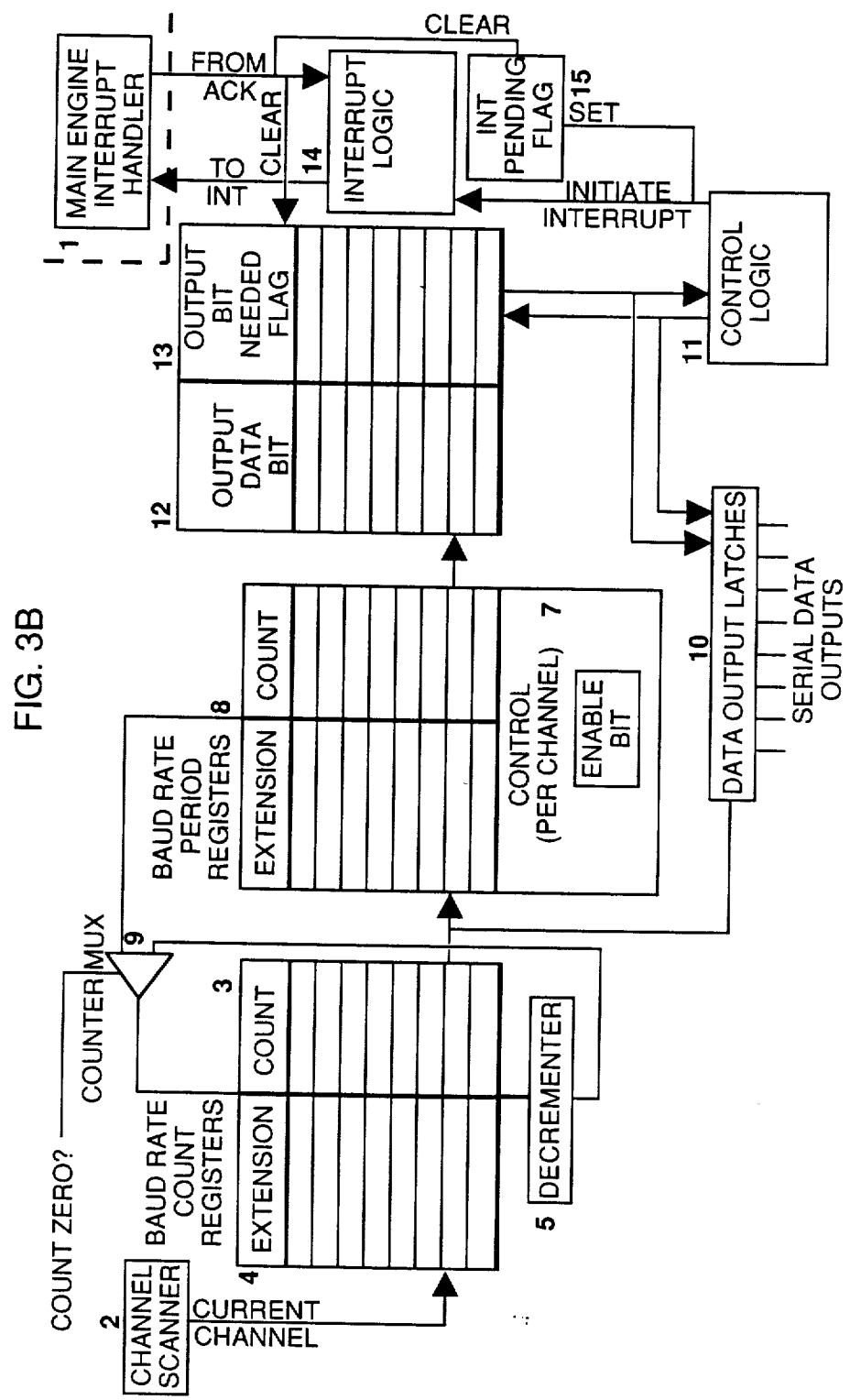
FIG. 3b illustrates in greater detail the architecture of the Output Bit Engine (OBE) module of the MCCC OCTART.
Figure 4:
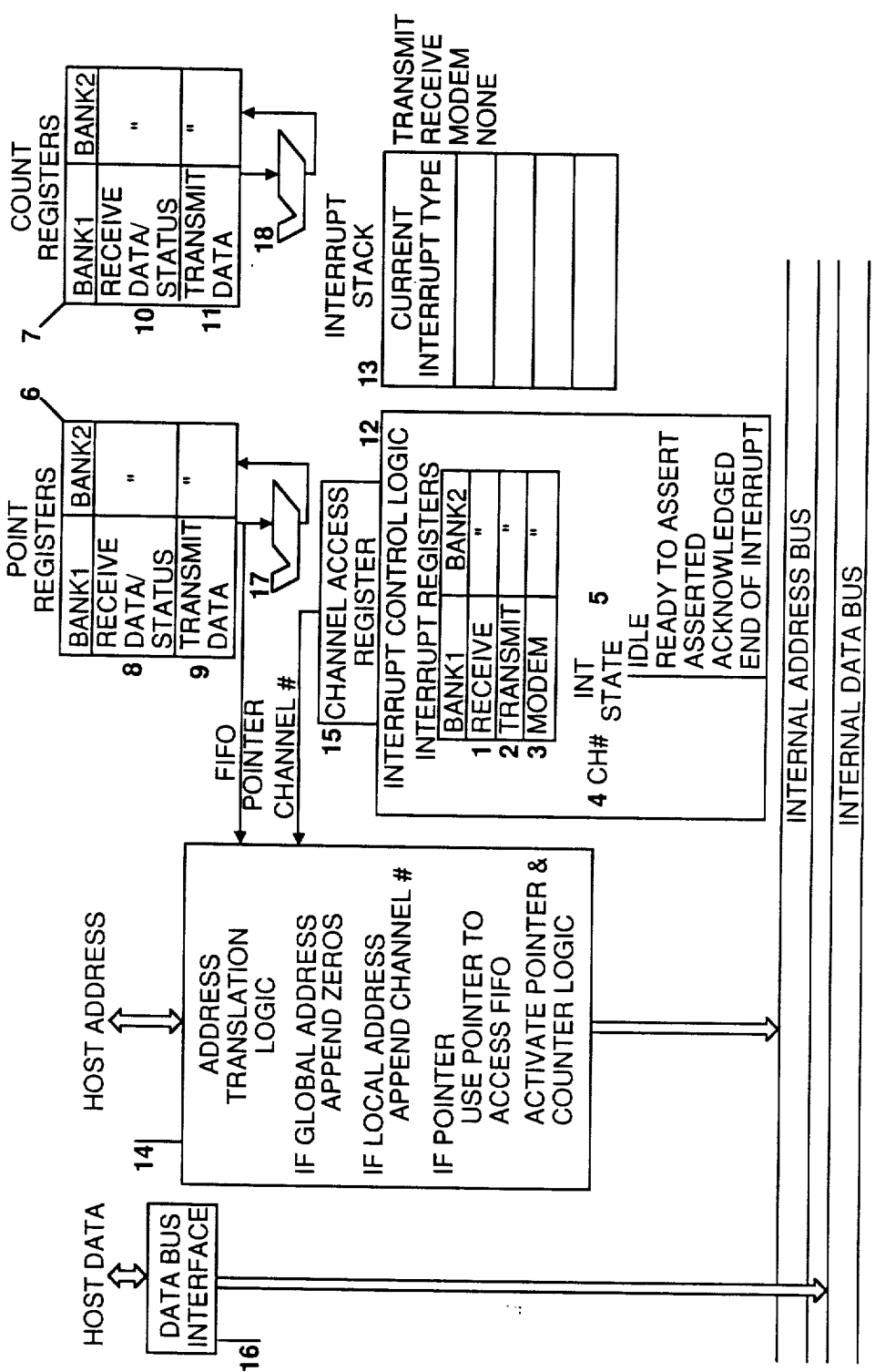
FIG. 4 illustrates in greater detail the architecture of the Bus Interface Logic (BIL) module of the MCCC OCTART, particularly the Automated Data Transfer mechanism.

The OBE, illustrated in FIG. 3b, functions in a manner very similar to that of the IBE. The Channel Scanner 2 performs the same function of counting the eight channels, one every eighth clock cycle. The Baud Rate Count Register 3 is identical to that in the IBE, although the Baud Rate Extension Count Register 4 serves a simpler function—it is usually set to cause full bit time sampling, thereby enabling the OBE to output bits at the specified baud rate. There is no need for start bit or stop bit detection (although the Main Engine firmware routines cause characters to be framed by start and stop bits, a process which is transparent to the OBE). Because of the lack of need for start and stop bit detection, no "Control Mode Bit" need exist, although the Control Enable Bit 7 is still present, to permit one or more channels to be disabled.

The differences lie in the Control Logic and in the process of interrupting the Main Engine. Instead of Sampled Data Bit Registers, the OBE contains Output Data Bit Registers which contain one bit (the "next" bit to be output for each channel). A second bit is latched, in a Data Output Latch Register, to produce continuous output to external serial devices, forming a two-bit output pipeline. Instead of a Sampled Bit Flag, the IBE contains an Output Bit Needed Flag, which indicates to the Main Engine that additional bits of output are needed to fill the two-bit pipeline.

The Control Logic is far simpler than in the IBE. It simply moves the Output Data Bit into the Data Output Latch, and sets the Output Bit Needed Flag. In addition, if no interrupt is pending (i.e., the Interrupt Pending Flag 15 is not set), then the Control Logic causes the Interrupt Logic 14 to interrupt the Main Engine.

This process continues until all bits of a character have been sent (including the final stop bit), at which time the process is simply repeated again and again. The Main Engine disassembles the next character and fills the two-bit pipeline with bits of that character, a process which is also completely transparent to the OBE, which need not distinguish one character from the next.

The IBE and OBE functions are quite discrete, and relatively transparent to the rest of the MCCC OCTART. By confining their functionality to sending and receiving bits (even start bit and stop bit detection is primarily controlled by the Main Engine's firmware), they retain a great deal of flexibility to be reused for very different purposes, such as highly customized protocols or imbedded commands to the main Engine (enabling the performance of almost any imaginable function under firmware control).

Without duplicating hardware, the IBE and OBE can be used to detect start bits, stop bits, middle bits, or whatever type of asynchronous, or even synchronous, protocol one can imagine. Additional hardware may be necessary, but the full functionality of the IBE and OBE can be utilized quite efficiently, taking full advantage of the flexibility offered by the firmware-controlled Main Engine.

BUS INTERFACE LOGIC (Automated Data Transfer)

Whereas the IBE and OBE handle the MCCC OCTART's interface with external serial devices, the BIL handles the MCCC OCTART's other interface, with its host processor. Characters must be received from the host for the Main Engine to disassemble into bits for the OBE to transmit, and, conversely, bits received by the IBE and assembled into data characters by the Main Engine must be transferred to the host. Although all serial controllers must perform these data character transfer functions, the BIL's method of automating this data transfer process is rather unique, relieving the host processor of a great deal of the responsibility of determining when the FIFO is empty. This process also achieves a significant reduction in implementation cost by avoiding the duplication of the pointer addressing mechanism for each channel.

Existing serial controllers, such as the Signetics SCC2698 illustrated in FIG. 1, merely decode addresses (which must be maintained and supplied by the host) and provide read/write circuitry. The host processor must do the rest. If, for example, characters have been assembled by such controllers, and are ready to be transferred to the host, the host processor must determine, from among multiple channels, which precise address (channel-dependent) contains the first data character, and must specify that address to the controller. Moreover, the host must determine, after each character is transferred, whether the FIFO is empty.

The BIL greatly simplifies the host's role in this process. Due to the MCCC OCTART's use of context-oriented addressing (described below in the State Interrupt Handling section), the host need not specify from which channel data was received. The BIL has access to this information (loaded by background firmware routines), and can provide it to the host.

The Main Engine's firmware routines detect the necessity of interrupting the host to indicate that data can be transferred. For example, the MCCC OCTART maintains a FIFO to store data characters, transmitted by the host processor, until the Main Engine is ready to disassemble those data characters and transmit the individual bits via the OBE. A firmware routine will detect when a particular channel's transmit data FIFO is empty, indicating that the host should be interrupted so that is can send additional data characters to be transmitted through that channel.

A firmware routine will also detect when the host-specified threshold in a particular channel's receive data FIFO is reached (e.g., when five bytes are stored in an eight-byte FIFO), indicating that the host should be interrupted so that it can receive these data characters. In addition to transmit and receive interrupts, if a modem is employed as one of the external devices, the firmware also detects when the status signals of that modem have changed, indicating that the host should be interrupted so that it can read the modem's new status.

It should be noted that the Main Engine's firmware routines (the function of which can be modified) will generally perform this task of determining the necessity of interrupting the host processor. In addition, the firmware will also initialize appropriate BIL registers to enable the BIL to perform the necessary data transfers.

The firmware will initialize one of three registers (for a particular interrupt)—the Receive Interrupt Register 1, the Transmit Interrupt Register 2 and the Modem Interrupt Register 3—from one of the two banks of such registers, if that register is in its "idle" state. Because the firmware knows which type of interrupt is required, it knows which of the three registers to initialize. This initialization involves loading the appropriate register with the channel number 4 (e.g., the channel whose transmit data FIFO is empty) and the state of that interrupt 5 (initially "ready to assert"). That state will eventually be changed to "asserted" and then "acknowledged," and, once the interrupt has been serviced, to its "end of interrupt" state, and then back to its "idle" state.

In addition, the firmware will initialize (for each "interrupt type") the corresponding bank of Pointer Registers 6 and Count Registers 7. There are two banks of each of these registers in the current embodiment to create a pipeline, enabling the BIL to respond to one interrupt while the Main Engine is preparing for the next interrupt. Each set of Pointer Registers, for a particular bank, contains a Pointer Receive Data/Status Register 8 and a Pointer Transmit Data Register 9. Each set of Count Registers, for a particular bank, contains a Count Receive Data/Status Register 10 and a Count Transmit Data Register 11.

The Pointer Receive Data/Status Register contains a "local address" —i.e., when concatenated with the channel number, it "points to" the actual location of the first (initially) data character in that channel of the receive FIFO. This method of "context oriented addressing" (described below in the State Interrupt Handling section) enables various components of the MCCC OCTART (including the BIL) to address actual registers and FIFO locations without requiring the host to specify the channel number (which the BIL maintains internally). The receive FIFO contains interleaved received data (at even addresses) and status information (at odd addresses). The Pointer Transmit Data Register also contains a local address which points to the first (initially) location of the transmit FIFO. The transmit FIFO will store data characters transmitted by the host until the Main Engine is ready to disassemble them.

The Count Receive Data/Status Register contains the total number (initially) of data characters received by the MCCC OCTART, and ready to be transferred to the host processor. The Count Transmit Data Register (initially zero) is used to count the number of data characters actually transferred by the host.

Once the firmware has initialized these registers (one of the three types of Interrupt Registers and the corresponding Pointer and Counter Registers), the BIL hardware takes control, via the Interrupt Control Logic 12. The Interrupt Control Logic constantly scans the Interrupt Registers. Once the state of one of these Interrupt Registers is set to its "ready to assert" state by the firmware, the Interrupt Control Logic asserts an interrupt to the host processor. The host processor then responds to that interrupt by issuing an "interrupt acknowledgment."

The host's interrupt acknowledgment signal consists of a number from one to seven, which represents the standard Motorola 68000 interrupt level. The host processor previously initialized the Context Address Memory (for each channel) to the desired interrupt level. The Interrupt Control Logic compares the interrupt acknowledge level to the prespecified level in the Context Address Memory for the corresponding channel. If they match, and the state of the corresponding interrupt is "asserted," then the interrupt is intended for the MCCC OCTART. Otherwise, the host's interrupt acknowledge is intended for some other device, and the Interrupt Control Logic simply ignores that acknowledge signal.

Once the Interrupt Control Logic determines that its interrupt has been correctly acknowledged, it stores this fact by pushing information onto the top of the Interrupt Stack 13 (i.e., information pertaining to the current interrupt being serviced). This information consists of two bits which indicate the type of interrupt (transmit, receive, modem or "none"). This information, when combined with the channel number, can then be used at a later time by the Address Translation Logic 14 (to address the proper register for data transfers) or the Pointer and Count Registers (to correctly increment and decrement pointers for that particular type of interrupt).

Once the Interrupt Control Logic pushes this information onto the Interrupt Stack, the Interrupt Control Logic then sends a Status Vector to the host processor. This vector contains a "chip ID" (so that the host can determine which chip, in case there are others, is interrupting the host) and the type of interrupt (including status information, such as "good data" for a receive data interrupt). The number of characters to be transferred, the channel number and additional miscellaneous information can then be accessed by the host.

The "Good Data Interrupt" mechanism (described below) relieves the host of the task of checking the status of each data character received. Instead, the host now knows precisely how many characters to receive, and that they are all of a particular status type.

Once the host receives this Status Vector, it can proceed to initiate the data transfer. As mentioned above, the host's job has been tremendously simplified. The host need only maintain four addresses. Once address is used to receive the Modem status. A second address is used to transmit data characters. A third address is used to receive data characters, and the fourth address is used to receive data status information. Note that the channel number and the FIFO addresses (where data characters are stored) are all maintained by the MCCC OCTART. The host need not maintain this information.

More importantly, the host knows (by reading a register) that, for example, ten characters of "good data" are waiting in the receive data FIFO. Without knowing the precise location of these characters, the host simply initiates a read by specifying the one and only receive data address. The BIL's Address Transition Logic will compute the actual address of the first data character, and will automatically increment that address to access the remaining characters.

Upon receiving one of these four addresses, the Address Translation Logic determines the actual address of the register or FIFO data. Note that this Address Translation Logic is not only used for data character transfer, but for all reading and writing of registers. Thus, the Address Translation Logic first determines if this address is a "global register" (i.e., a register not associated with any particular channel). If so, it simply appends zero to the host's specified address, and initiates either a read or write operation on that register. If that address is a "channel register," the Address Translation Logic appends the known channel number to that address, and initiates either a read or write operation on that register. A Modem Interrupt falls into this category. The BIL need not transfer a block of data, so it merely supports the host's access to the "modem status register" (containing the recently changed status signal from the modem), as well as to any other channel-specific registers of the interrupting device.

In the above cases, in which the host is not initiating a normal data character transfer, but is simply reading from or writing to a register on the MCCC OCTART, the Data Bus Interface 16 may come into play. In most cases, data is simply transferred between the host and the MCCC OCTART, with the Data Bus Interface merely synchronizing communication between the internal and external data busses. If, however, the host desires to "program" this interface, an additional task may be performed. For example, the host might desired that, when it writes to a certain register, additional information (e.g., the channel number) be written to that register. The Data Bus Interface can perform this task. In other embodiments, a variety of other tasks can be performed, even under firmware control, creating unlimited possibilities.

In this case, however, in which the Address Translation Logic determines that the host is in fact initiating a data character transfer—i.e., the host supplies an address which is associated with one of the two banks of Pointer Registers (the Pointer Receive Data/Status Register 8 and the Pointer Transmit Data Register 9)—then the Address Translation Logic simply accesses the location pointed to by that Pointer Register (with the channel number appended). This location will be either the precise location in the receive FIFO of the first data character (for odd addresses, or status information for even addresses) to be read by the host, or the first location in the transmit FIFO to which data will be transferred by the host.

It is at this point that the Address Translation Logic directs the Pointer Registers and Count Registers to perform their important tasks, via the one set of Pointer Manipulation Logic 17 and Counter Manipulation Logic 18. Additional logic is not required on a per channel basis. This one set of logic, and the two banks of Pointer and Counter Registers are sufficient. Note that information regarding the type of interrupt (receive data, receive status or transmit data) which is currently being serviced is available from the top of the Interrupt Stack.

In the case of data transmission by the host, the appropriate Pointer Register (which the firmware initializes to point at the first location to which data characters are written) is simply incremented by one (via the Pointer Manipulation Logic) each time the host initiates a write operation. This obviates the need for the host to maintain (and increment) an address, much less maintain the precise global address.

The Count Register (which the firmware initializes with the total number of data characters to be written) is decremented by one (via the Counter Manipulation Logic), enabling the BIL to maintain a precise count of data characters actually written by the host.

In the case of receipt of data by the host, the Pointer Register (which points at the location from which data characters are read) is incremented by two (because the status information is interleaved in between data characters), although the Count Register is still only decremented by one. This enables the host to avoid receiving the status information (because the host already knows the status of the data, due to the Good Data Interrupt mechanism).

In the case of receipt of status by the host, the Pointer Register points to an odd address (one byte past the data character to which that status pertains). Although the read operation is initiated, transferring the status of that first data character to the host, the Pointer Register and the Count Register are neither incremented nor decremented.

This may seem unusual, until one considers the limited circumstances under which the host does not already know the status of received data. Generally, that status is known, because most data characters received are "good data." If, however, the status is some type of error or special character, even the Good Data Interrupt feature will not reveal the precise type of error or special character (although, in other embodiments, it may be feasible to obviate the need for the host ever to check the status of any character, depending on the number of different types of errors or special characters desired).

The host may therefore desire to check the type of error or special character, and then handle that situation with a software service routine. In such a case, a block data transfer is not generally necessary. Therefore, the Pointer Register is not incremented at this time, to permit the host's software service routine to read the special character at a later time.

Once the interrupt has been handled (i.e., the host has completed its transfer or receipt of all data characters), the host sends an "end of interrupt" signal to the BIL (modifying the state of the Interrupt Register to "end of interrupt"). Upon receipt of this signal, the Interrupt Control Logic pops the information off the top of the interrupt Stack. In this state, the firmware can perform (at its leisure) any additional cleanup which may be necessary before reenabling that interrupt register bank for further data transfers (by changing that Interrupt Register state into its "idle" state, at which time the BIL is free to repeat this process for the next interrupt, if any, issued by the firmware (by changing the state to the "ready to assert" state, after initializing channel, pointer and count registers).

If the top of the Interrupt Stack contain a value indicating "no interrupt" (as described above), then the Pointer Registers and the Count Registers remain idle. Although no interrupts are being handled at a particular time, the BIL continues to receive read and write requests from the host, and to perform address translation (as explained above), enabling the host to read and write from global or local (channel-specific) registers on the MCCC OCTART.

MAIN ENGINE

General

The I/O Bit Engines (described above) handle the MCCC OCTART's interface to external serial devices, such as modems and serial printers. Bits are transferred to and from the MCCC OCTART across this interface. The Bus Interface Logic (also described above) handles the MCCC OCTART's other interface, to the external host processor. Characters are transferred to and from the MCCC OCTART across this interface (as well as parameters and commands to the MCCC OCTART).

Figure 5:
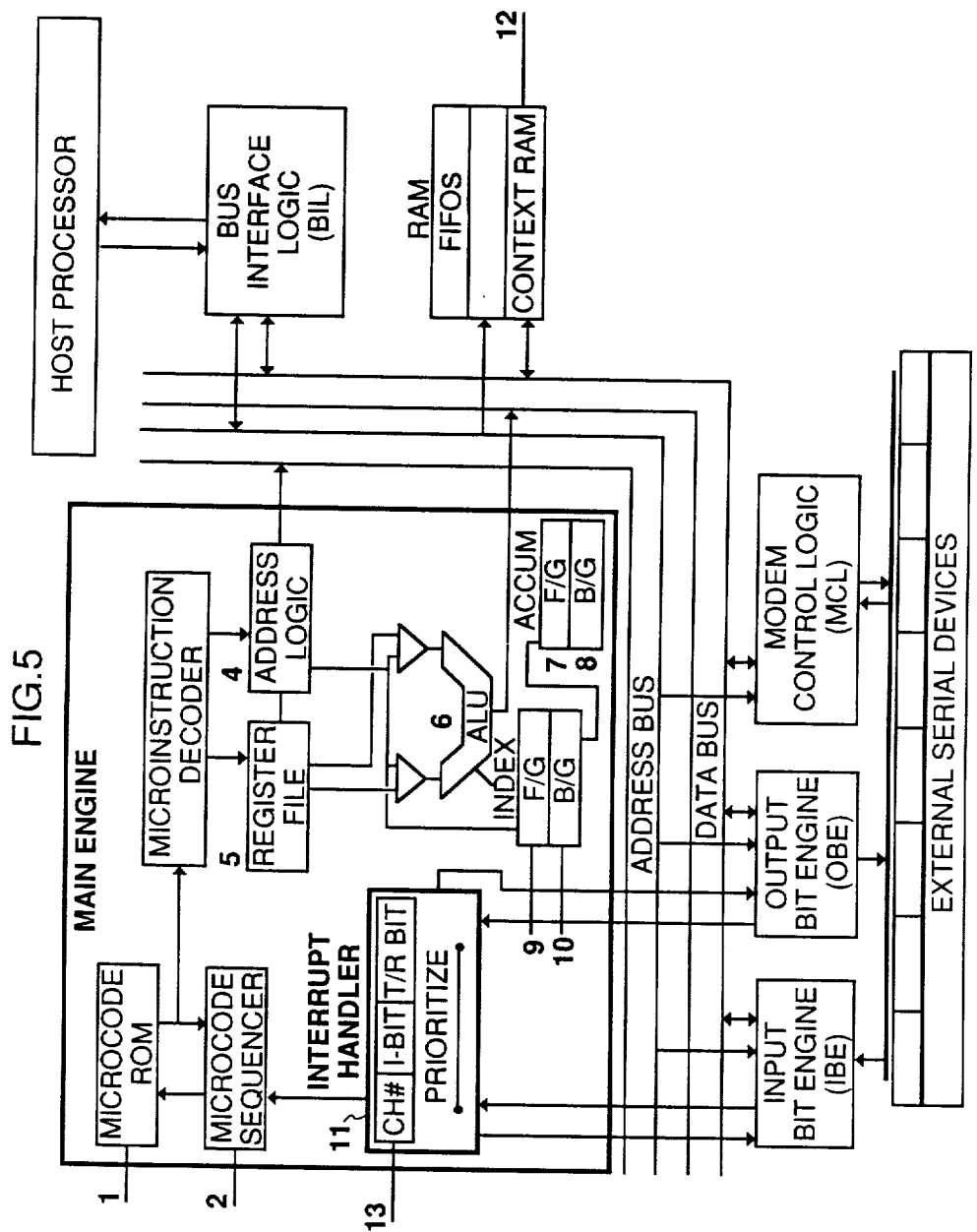
FIG. 5 illustrates in greater detail the architecture of the Main Engine module of the MCCC OCTART, particularly the State Interrupt Handling mechanism.

In between these to interfaces lies the Main Engine (illustrated in FIG. 5), which performs the primary tasks of disassembling characters (received by the BIL from the host) into bits for the OBE to send to external serial devices, and assembling bits (received from external serial devices via the IBE) into characters for the BIL to send to the host. In addition to these primary, bit-oriented (and therefore time critical) tasks, the Main Engine must also perform a variety of complex character-oriented (and less time critical) tasks, such as management of the data FIFOs, maintenance of timers/counters, complex protocol-related tasks, and other desired tasks programmed into firmware.

Much of the architecture of the Main Engine is standard to any microprogrammed engine. For example, the Microcode ROM 1 contains sequences of microcode (firmware) which control the transfer of data among registers as well as the operation of the ALU. There is a standard Microcode Sequencer 2 which increments addresses into the Microcode ROM, causing microinstructions to be executed sequentially in accordance with their physical address.

Of course, as with virtually any Microcode Sequencer, this sequential execution may be modified by a "branch" instruction (which causes execution to be transferred to a specified address) or a "subroutine call" (which is simply a branch, but with the address immediately following the current address stored so that execution can return to that location when the subroutine is completed, by a "subroutine return" microinstruction).

As with any microprogrammed engine, there is a Microinstruction Decoder 3, which recognizes various fields of the microinstruction and diverts the bits in those fields to the hardware controlled by such bits. For example, the Microinstruction Decoder recognizes certain fields of the microinstruction as addresses to the chip's registers not located in the Main Engine, in which case it divers those bits into the Address Logic 4, which causes the appropriate register to be either read or written. The Address Logic is necessary because only some of the chip's registers are physically located in the Main Engine's Register File 5, whereas others may be elsewhere on the chip, requiring that they be accessed via the chip's internal address bus.

The ALU 6 is not unlike any other two operand ALU. It can perform basic logical and arithmetic instruction, the results of which are gated into either the Foreground Accumulator 7 or the Background Accumulator 8. Certain ALU operations cause status flags to be set (e.g, a "zero flag" indicating that the result of the ALU operation equals zero). These status flags are gated into either the Foreground Index Register 9, or the Background Index Register 10, and may be tested by subsequent microinstruction. The above features are standard to virtually any ALU.

There are, however, three significantly non-standard, quite unique, elements of the Main Engine. One lies within the ALU itself, stemming from the fact that the character assembly and disassembly process must occur quite rapidly. Upon receiving an interrupt from the OBE, for example, indicating that it needs the next bit to send, the Main Engine must strip that bit from the character (provided by the host) in time for the OBE to send that bit at the specified baud rate. The same is true of the next bit, and so on, until all bits of that character have been sent.

So, in addition, to performing standard logical and arithmetic instructions, the ALU performs a few unique instructions, designed to facilitate rapid performance of the character assembly and disassembly process. These unique microinstruction opcodes are described below.

A second unique feature is the Good Data Interrupt mechanism referred to earlier, by which the firmware in the Main Engine, after assembling received bits into characters and determining the status (good data, parity error, etc.) of those characters, determines when there has been a change in status from one character to the next, and sets up registers in the BIL to cause the host to be interrupted for changes in status, thereby relieving the host of the task of checking each character's status. This procedure is discussed below.

A third unique feature of the Main Engine is the mechanism employed in its Interrupt Handler 11. This mechanism, upon receiving an interrupt from one of the Bit Engines (indicating that a bit has been received from, or needs to be sent to, one of the external serial devices), causes the appropriate firmware routine to be accessed immediately, via the firmware entry points maintained in the Context RAM 12, without having to redetermine the channel number and the state of the character assembly or disassembly process. This is achieved by means of a quasistate machine and interrupt vectoring mechanism, described below.

In addition to the three unique features of the Main Engine described below, it should be noted that the Main Engine is primarily interrupt-driven, at least for the time-critical tasks of character assembly and disassembly. When servicing an interrupt, the Main Engine (controlled by firmware) performs these time-critical tasks in the foreground (i.e., it responds immediately to interrupts). Because these tasks are so time-critical, it is important that the firmware's task be simplified as much as possible (relative to the capabilities of the hardware). This is the reason, for example, for the unique Character Assembly/Disassembly microinstruction opcodes. By performing basic steps of character assembly and disassembly in one cycle, the entire process can be performed relatively quickly.

When not servicing interrupts, the Main Engine (still under firmware control) performs other task of a less time-critical nature in the background (i.e., at a relatively liesurely pace, in between interrupts). These background tasks can be more complex because they are not under as great a time constraint. They can be performed while entire characters are being assembled and disassembled—i.e., in character time.

These background tasks are virtually unlimited in the current embodiment. The firmware can cause the Main Engine to perform a vast array of tasks, utilizing the relatively general purpose ALU. One of the primary tasks performed in the background in this embodiment has already been mentioned—the Good Data Interrupt mechanism (described below). Because determining of the status of a character is not time-critical (it needs only be performed in character time), typically taking less than 500 microseconds, this task can be performed in the background.

Other background tasks involve management of the FIFOs and the counters/timers. For example, as mentioned above, the Main Engine is responsible for loading the initial number of characters to be transferred to the host (for a given interrupt) into the BIL's Count Register. Another example is the storage of assembled characters into the receive data FIFOs. Once a character has been assembled, and its status determined, it must be stored in the next free location of the receive data FIFO (for a particular channel).

Additional background tasks involve complex protocol-oriented tasks. For example, if the host desires to implement "Xon/Xoff" flow control (a handshake protocol which enables data transfer to be stopped and restarted—e.g., when the data buffer of one device is full), the firmware controls the Main Engine's detection of the conditions under which interrupts are necessary, and then causes the appropriate actions to occur. A virtually unlimited number of extremely complex protocol-related features (especially for synchronous protocols) can be implemented in this and other embodiments.

A final, but very important, background task performed in this embodiment is the constant scanning of channels for detection of host interrupt conditions (and, if desired, detection of changes in the status of the modem signals.) As described above, the Main Engine's firmware determines when it is necessary to interrupt the host—e.g., when the transmit data FIFO is empty. The firmware constantly scans the channels, checking the FIFOs to determine whether any of these conditions is met. If so, it sets up the appropriate BIL registers (as described above) to inform the BIL of the necessity to interrupt the host.

None of these background tasks need be performed in "bit time." They are therefore performed in the background, while the Main Engine has enough time to perform these relatively complex tasks. Following the descriptions of the three particularly unique features of the Main Engine is an example of the foreground and background tasks performed by the Main Engine during a typical data communications session.

Good Data Interrupt

After the Main Engine's firmware assembles bits received via the IBE into a data character, that firmware must also determine the status of each such data character, so that the host can receive not only the character itself but also status information about that character (e.g., whether a parity error occurred during the transmission of that character). Virtually all serial controllers provide this type of status information to the host.

But, because the vast majority of data characters transmitted from external devices do not generate parity or other communication errors, and are not one of the few special characters a host might request the serial controller to detect, it is extremely inefficient to require the host to receive and examine the status information for every character, only to determine, for the vast majority of characters, that the character is "good data."

It is therefore a significant feature of this invention that the host only be informed of changes in the status of received data characters, so that the host can simply receive an interrupt indicating the necessity of transferring, for example, ten characters of good data, without having to receive or check the individual status of each of those ten data characters.

There are a variety of possible firmware (as well as hardwired logic) embodiments of this feature. The preferred embodiment utilized in the MCCC OCTART, the underlying logic of which is illustrated in FIG. 6, first involves determination by the firmware of the status of the received data character. This status may fall into one of three categories. The character may have resulted in a communications error, such as a parity error or framing error, or the character may be one of the special characters which the host requested that the MCCC OCTART detect, or the character may simply be "good data."

In other embodiments, it may be desirable to supply the host with a different interrupt for each possible type of status information, completely obviating the need for the host to perform any further status-checking operations. In this embodiment, however, although the precise status of the character is stored with that character, the user is given only one of three different interrupts.

The firmware determines the status of the character being received as each bit is received. For example, a running parity check is performed by a unique ALU opcode described in greater detail below. Once all bits of a character have been received, the accumulated parity check contains information as to whether a parity error occurred for that character. Framing errors are also detected in this manner, but by the firmware itself without assistance from any unique ALU opcode. If no communications error occurred, the firmware will compare the data character against the host-specified "special" characters to determine if the received character matches any of the special characters. If no communications error occurred, and the character is not a special character, then the character is deemed "good data."

After the firmware determines the status of the character, it must, of course, write both the data character itself and its associated status information into the receive data FIFO. In addition, the firmware determines whether the status of that character is different from the status of the previous character. If it is, the firmware must inform the BIL to interrupt the host, indicating the status of that previous character, as well as the number of consecutive characters up through that previous character with the same status.

In order to accomplish this task, the firmware must maintain a count of characters of a particular status, until a character is received with a different status (or the host-specified threshold of characters has been received). At that point, the firmware must not only write the channel number into the Receive Interrupt Register of the BIL, and set the "ready to assert" flag (as described above), but must also set up the Count Register for that channel (also described above) so that the BIL's Interrupt Control Logic can inform the host of the number of data characters of a particular data type are ready to be transferred. The firmware then resets the counter to one, and repeats this process beginning with the most recently received character the status of which changed from that of the previous character.

For example, assume that six characters of good data are received, followed by one character which results in a parity error, followed by a special character the detection of which was requested by the host, followed by three more characters of good data. Assume further that the receive data FIFO can hold eight characters, but that the host sets the threshold at five.

The firmware will initialize the "status counter" to zero, and the "last status type" to "good data," and will then store the first character and its associated status information ("good data") in the receive data FIFO (incrementing the receive data FIFO pointers, another background task performed by the Main Engine's firmware). The firmware until then determine that the threshold has not been reached and that the status type has not changed. The firmware will then increment the Status Counter to one. This same process will continue for each of the next four characters, with the Status Counter eventually incremented to five.

After storing the sixth character and its status ("parity error"), but before the Status Counter is incremented to six, the firmware will determine that the Status Counter equals the host-specified threshold, and set up to BIL registers (as described above) to cause the BIL to issue a first interrupt to the host, informing the host that five characters of good data are ready to be transferred from the receive data FIFO to the host. The host can then retrieve these five characters at its leisure, knowing (without having to check the status of each character) that they are all "good data."

The firmware continues processing the sixth data character after resetting the Status Counter to zero. The processing of the sixth data character is then resumed, with the firmware determining that the status type has not changed, and the incrementing the Status Counter to one. Upon processing the seventh character, however, the firmware will determine that, although the threshold has not been reached, the status type has changed (from "good data" to "error"). The firmware will store this new Status Type (only indicating "error" in this particular embodiment), and set up the BIL registers to cause the BIL to issue a second interrupt to the host, informing the host that one character of status type, "good data" (the previous character) has been received. The firmware will then reset the Status Counter to zero, and then perform the normal increment of that Status Counter (in this case, incrementing the Status Counter to one).

The firmware will then store the eighth character and its status information ("special") into the receive data FIFO. The firmware will again determine that the status type has changed (from "error" to "special"), and will store this new Status type (only indicating "special" in this particular embodiment), and set up the BIL registers to cause the BIL to issue a third interrupt to the host, informing the host that one character of status type, "error, " has been received. The firmware will then reset the Status Counter to zero, and then increment that Status Counter. Note that, for "error" or "special" status types, the host may need to perform additional processing (perhaps in software, in an interrupt service routine) to determine the precise type of communications error or special character received, in order to respond appropriately.

The firmware will then store the ninth character and its status information ("good data") into the receive data FIFO, and will again determine that the status type has changed (from "special" to "good data"). The firmware will store this new Status Type ("good data"), and set up the BIL registers to cause the BIL to issue a fourth interrupt to the host, informing the host that one character of status type, "special," has been received. The firmware will then reset the Status Counter to zero, and then increment that Status Counter.

The firmware will then store the tenth character and its status information ("good data") into the receive data FIFO, but this time will determine that not only the threshold not been reached, but that the status type remains "good data." The firmware will therefore simply increment the Status Counter to two, and repeat this process for the eleventh character, incrementing the Status Counter to three. Eventually, additional characters will either result in a change of status type, or a number of "good data" characters equal to the host-specified threshold, at which point another interrupt will occur.

Note that, in this example, although eleven characters were received, the host was only interrupted four times (corresponding to the three changes in data status type and the one instance of exceeding the host-specified receive FIFO threshold). Moreover, the host will never need to transfer or to check the status of the nine characters of "good data." The character which generated a "parity error," and the "special" character may, however, require further processing by the host. Nevertheless, communications errors and special characters occur relatively infrequently (compared to "good data"), and always require special processing by the host (in an interrupt service routine). Therefore, this mechanism results in a far more efficient use of the host's processing power than do existing serial controllers which require that the host check the status of every data character received, even through the vast majority of these characters are simply "good data."

State Interrupt Handling

Whereas the Good Data Interrupt mechanism described above is performed by the Main Engine's background firmware routines at a relatively liesurely pace, the Main Engine's foreground firmware routines must perform extremely time-critical character assembly and disassembly tasks on an interrupt-driven basis. In other words, upon receiving interrupts from the I/O Bit Engines, the Main Engine must quickly respond to those interrupts in bit time.

One obvious method of speeding up this process is the use of specialized microinstruction opcodes (described below), which enable many of the basic component steps of character assembly and disassembly to occur within one machine cycle. An additional method employed in the MCCC OCTART is the rapid invocation of the appropriate firmware routine, illustrated in the Interrupt Handler module of the Main Engine in FIG. 5. Once the Main Engine receives an interrupt from either of the I/O Bit Engines, this State Interrupt Handling mechanism initiates execution of the appropriate firmware routine within two machine cycles.

As mentioned above, each of the I/O Bit Engines can initiate an interrupt to the Main Engine. During the cycle in which an interrupt is issued, the Main Engine's Interrupt Handler 11 must first prioritize these two interrupts, if in fact two interrupts are present (one from the IBE and one from the OBE), and then acknowledge the higher priority interrupt. In This embodiment, the IBE interrupts are given priority over the OBE interrupts, because the former occur much more frequently (usually in half-bit time) than the latter (usually in full bit time).

The Interrupt Handler acknowledges the interrupt by clearing either the Sampled Bit Flag (IBE) or the Output Bit Needed Flag (OBE). Upon receiving this acknowledgement, the IBE (or OBE) drives the Channel Number and an optional Interface Bit (I-Bit—i.e., the bit sampled by the IBE, unused for OBE interrupts) into the Context Register 13 of the Interrupt Handler. The Interrupt Handler also loads the Context Register with the T/R bit, indicating whether the interrupt is a transmit interrupt (OBE) or a receive interrupt (IBE).

The Context Register enables the Interrupt Handler to pipeline I/O Bit Engine Interrupts, with the Main Engine's foreground code responding to one interrupt while the Interrupt Handler is in the process of vectoring to the foreground code for the next interrupt.

The Interrupt Handler uses the "context" (i.e., the channel number and the T/R Bit) to obtain the starting address of the appropriate firmware routine. As mentioned above, every firmware routine has been programmed with starting address of the next firmware routine for that context. If, for example, a firmware routine determines that a valid start bit has been detected, it knows that, when the next interrupt occurs for that context, the firmware routine which processes normal character bits should be executed. Thus, every firmware routine, before returning control, stores the entry point of the next appropriate firmware routine (for that context) in the corresponding Context RAM location. This is accomplished by means of the unique "context return" microinstruction opcode, described in the next section.

The Context RAM contains one word of memory for each possible context—i.e., for each combination of channels and directions. Thus, the Context RAM in the MCCC OCTART contains sixteen words of memory, for each of the two directions (transmit or receive) of each of the eight channels. Each word of memory in the Context RAM contains the starting address (entry point) of the appropriate firmware routine (already loaded by the "context return" microinstruction of the previously executed firmware routine for the same context).

Note, however, that the number of firmware routines does not correspond to the number of different contexts. The entry point in the Context RAM therefore represents not merely a vector to the firmware routine associated with a particular context, but rather, a vector which also represents the current "state" of that context (e.g, the initial state of character assembly on channel five, wherein a determination is made as to whether a valid start bit has been detected).

In other words, the Context RAM entries serve two purposes: (1) the current selection of the appropriate firmware routine (of the many existing routines), representing the current "state" of firmware tasks in progress for a particular context, and (2) a vector to the starting location of that firmware routine.

Thus, if the Interrupt Handler receives a Bit Engine interrupt in cycle N, it will prioritize interrupts (if necessary), acknowledge the higher priority interrupt, fetch the context, and, in cycle N+2, load that context into the Main Engine's Index Register (while the first microinstruction of the firmware routine is fetched). Thus, two machine cycles following the cycle in which the I/O Bit engines interrupt the Main Engine, the first microinstruction of the appropriate firmware routine will be executed.

By loading the context into the Main Engine's Index Register, the foreground routines can access this context in order to address channel-specific registers and FIFO locations. In addition, they can test the Interface Bit or add it into the data character being assembled, via the "ish" microinstruction opcode described below.

As mentioned above, the Interrupt Handler maintains a "two-stage interrupt pipeline" which operates concurrently with the Main Engine's execution of firmware instructions. Thus, while a firmware interrupt routine is executing its first foreground instruction, the interrupt handler is acknowledging the next IBE or OBE interrupt (if present). During the second instruction of the interrupt routine, the interrupt handler is ready to support fetching the first instruction of the second interrupt routine. Thus, if the second instruction of the first interrupt routine is the context return instruction, the next instruction executed will be the first instruction of the second interrupt routine.

The Main Engine therefore does not "lose" any execution cycles due to the interrupt handling mechanism. During the two cycles in which this mechanism is processing an I/O Bit Engine interrupt, the Main Engine is, in parallel, either executing background code, or executing the first (of at least two) foreground I/O Bit Engine interrupt service routines.

Character Assembly/Disassembly

The primary reason for the Main Engine's ability to assembly and disassemble characters in bit time (as a foreground, interrupt-driven task) is the utilization of customized microinstruction opcodes, designed to enable the ALU to perform critical component steps of character assembly and disassembly in one machine cycle. There are four such opcodes, one which performs the basis bit-by-bit step of character assembly ("ish"), one which performs the corresponding step of character disassembly ("osh"), one which performs the basic bit-by-bit steps of counting the current number of bits in the character being assembled, while accumulating and checking parity and detecting the break condition ("bcap"), and one which writes the entry point of the next firmware routine to be executed, for the current Context, into the Context RAM location corresponding to that Context ("context return").

The purpose of the "ish" opcode is to assemble the character, bit by bit, until it is right-justified in the specified register. The goal is to perform a generalized task, so that the same "ish" microinstruction can be employed repeatedly (without distinguishing among the particular bits of the character being assembled) until, after the last repetition, the character is both assembled and right-justified.

The microinstruction opcode is of the form, "ish r1,r2" (illustrated in FIG. 7a), where r2 is the register specified for character assembly, and r1 contains an encoded character length (from 5 to 8 bits in this embodiment), which is used as shifting information. The r1 register is actually used primarily for the "bcap" opcode discussed below, but its two least significant bits are used for this "ish" opcode.

The result of the "ish" opcode is as follows. If the least significant bits of r1 are "00", then the character is five bits in length. Therefore, the least significant five bits of the r2 register (which is an eight-bit register) are treated as a five-bit shift register, while the most significant three bits are set to zero. During each execution of the "ish" opcode, the least significant five bits are shifted one bit to the right (with the least significant bit destroyed), the current received bit is transferred from the ALU's Index Register into the location previously occupied by the 5th least significant bit of r2. Because less significant bits are transferred first (by convention), then, after this instruction has been repeated five times, the five received bits which make up the data character will be right-justified in the r2 register, as illustrated in FIG. 7a.

For six, seven and eight-bit characters, the instruction simply treats r2 as a six, seven or eight-bit shift register, respectively, and, after the one-bit shift to the right, inserts the current bit into the 6th, 7th or 8th least significant position, respectively, of r2. Thus, the "ish" opcode execution results can be summarized as follows (where I is the current bit received by the IBE, and r1[1:0] contains the encoded character length and r2[7:0] will contain the assembled right-justified character):

| If r1[1:0] = 00 | then | r2 = 0 0 0 1 r2[4:1] |
|---|---|---|
| If r1[1:0] = 01 | then | r2 = 0 0 1 r2[5:1] |
| If r1[1:0] = 10 | then | r2 = 0 1 r2[6:1] |
| If r1[1:0] = 11 | then | r2 = 1 r2[7:1] |

The "ish" opcode causes the Main Engine's hardware to shift the five, six, seven or eight least significant bits of r2 (depending upon the value in the two least significant bits of r1) one bit to the right, destroying the least significant bit of r2 in the process. It then fetches the current bit from the ALU's Index Register and inserts it into the 5th, 6th, 7th or 8th least significant bit of r2 (after the shift), gating a binary "0" into the 3, 2 or 1 most significant bits of r2.

Thus, in one machine cycle, the "ish" instruction performs the basic step of character assembly which, if repeated 5, 6, 7 or 8 times (i.e., once for each bit of the character), will yield an assembled, right-justified character in r2.

Figure 7B:
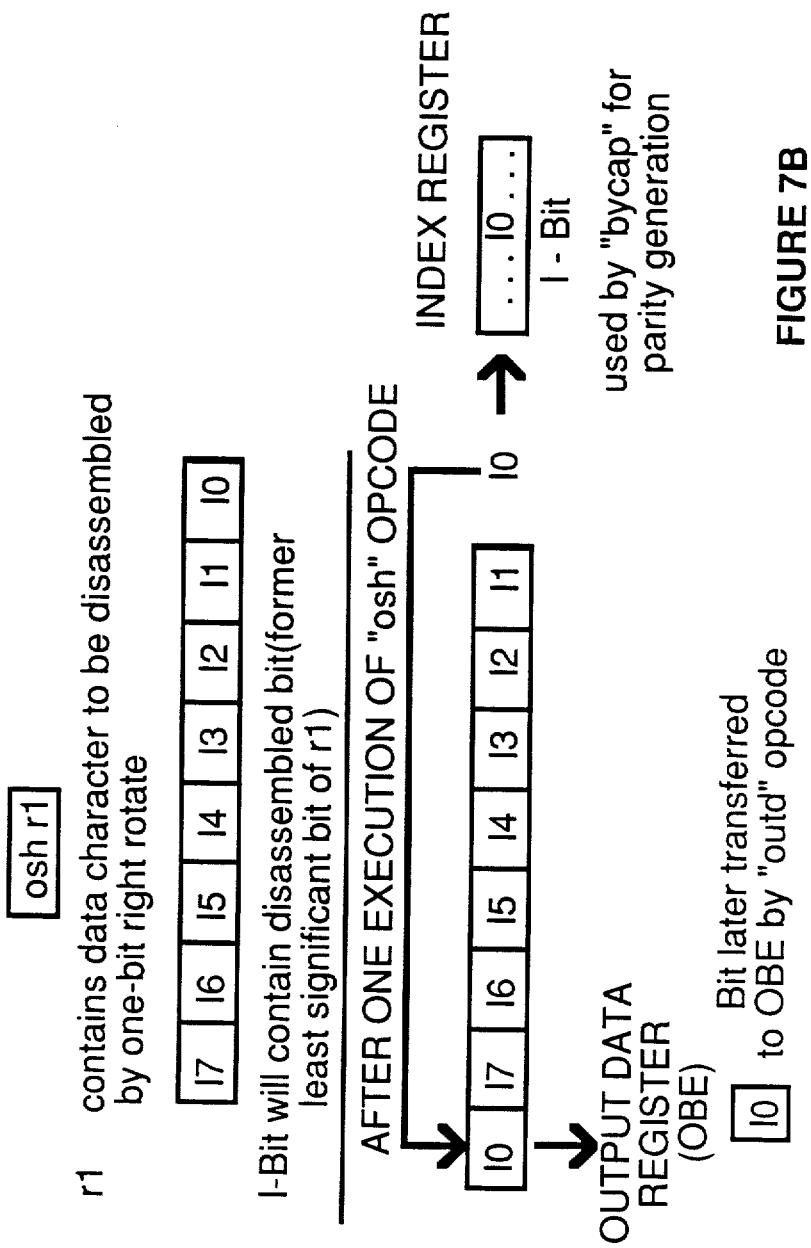

The "osh" microinstruction opcode, illustrated in FIG. 7b, is analogous to the "ish" opcode, but for character disassembly. The form of the "osh" opcode is "osh r1" where the r1 register contains the character being sent by the host processor. The Main Engine hardware simply rotates the r1 register one bit to the right, not only rotating the least significant bit of r1 (r1[0]) into the most significant bit position of r1 after the shift, but also storing that bit into the Main Engine's Index Register, for use by the "bcap" instruction for parity generation in support of bit transmission (described below).

Thus, the "osh" instruction simply disassembles the least significant bit of the character in r1, stores it into the Index Register, and shifts r1 one bit to the right so that the next execution of the "osh" instruction will do the same for what was the second least significant bit of the character, and so on, until all bits of the character have been disassembled and prepared for transmission via the OBE.

After the "osh" opcode stores the disassembled bit into the Index Register, and rotates that bit into the most significant bit position of r1, a normal "outd" microinstruction will transfer that bit from r1, across the internal data bus, to the OBE Output Data Register (for the channel specified by the host in the Channel Access Register).

The "bcap" instruction, illustrated in FIG. 7c, performs three significant tasks in the same machine cycle. It maintains a count of bits 3 which is decremented and, if it reaches zero (indicating that all bits of a character have been processed), results in the setting of the "zero" flag in the ALU's Index Register (for use by conditional branch microinstructions —e.g., when the firmware needs to know whether an entire character has been assembled or disassembled).

The "bcap" instruction also performs a running parity generation (and determines parity errors) 1, as well as detecting the "break" condition 2 (all zeros) by logically "OR"ing the accumulated "break bit" with the current bit in the Index Register.

The form of the "bcap" opcode is "bcap r1, r2" where r1 is the "option register" 4 and r2 is the "operation register" 5. The option register, r1, is an eight-bit register the two least significant bits of which contain an encoded character length (already discussed above with respect to the "ish" opcode). These bits, as well as the 3rd and 4th least significant bits, are not used by the "bcap" code. The "bcap" opcode uses the four most significant bits of r1, which contain (from most to least significant) one bit indicating whether parity is of an odd or even type, two bits indicating the type of parity ("00" for no parity, "01" for force parity [forced to 1 for odd, 0 for even] and "10" for normal parity"["11" is not used)], and one bit which is set if parity is to be ignored.

The operation register, r2, is also an eight-bit register, although only its two most significant bits, and its four least significant bits, are used. The most significant bit represents the accumulated parity, with the next most significant bit representing the "break detect" bit, and the four least significant bits representing the accumulated "count" of bits processed for the current character.

As mentioned above, the "count" is simply decremented and tested against zero, which, if true, causes the "zero flag" inn the Index Register to be set. The "accumulated parity" bit and the current bit in the Index Register are used to determine the new "accumulated parity" bit (depending upon which type of parity operation is specified in r1. For received bits, once all bits or a character have been received, the sampled parity bit can be compared against the accumulated parity bit to determine if a parity error in fact occurred.

The third, and final, operation of the "bcap" opcode involves "break" detection. As mentioned above, by simply performing a logical "OR" on the "break detect" bit and the current bit, the state of the "break detect" bit after all bits of a character have been processed will indicate whether the break condition was satisfied. In other words, if any bit of a character is nonzero, the "break detect" bit will be set for that character. Otherwise, it will remain zero, indicating that the break condition is satisfied. The "break detect" bit output is connected to the "c" flag of the Index Register, so that it can be tested by conditional branch and return microinstruction.

The fourth unique microinstruction opcode, the "context return" opcode, illustrated in FIG. 7d, has frequently been referred to above. When the microcode is written, the programmer knows which routine will be executed (for a given context) after the completion of the current routine (perhaps conditionally if there are multiple exits to a given routine). Therefore, the "context return" opcode is simply a conditional or unconditional return instruction which not only causes a standard return of execution, but also copies the address specified in the "context return" instruction (i.e., the entry point of the next routine to be executed for that context) to be written into the Context RAM location corresponding to that context.

For example, for the instruction "rxz addr," the ALU determines whether the zero flag in its Index Register is set. If so, a standard return is performed after the specified address is written into the Context RAM location corresponding to the current (known) context. If not, execution of the next microinstruction in that routine continues sequentially.

Thus, the "context return" opcode is of the form "rx addr,""rxz addr," "rxnz addr,""rxc addr,""rxnc addr,""rxi addr" or "rxni addr." These different forms of the opcode differ only in the condition which determines whether the return (and writing of the address into Context RAM) will occur. The "rx" opcode is an unconditional return. The "rxz" and "rxnz" opcodes return on the condition that the "zero flag" in the ALU's Index Register is set or not set, respectively. The "rxc" and "rxnc" opcodes return on the condition that the "c flag" in the ALU's Index Register is set or not set, respectively. Finally the "rxi" and "rxni" opcodes return on the condition that the "i flag" in the ALU's Index Register is set or not set, respectively.

EXAMPLE

The integral operation of the above-described components of the MCCC OCTART can be illustrated by considering their operating during a portion of a typical communications session.

The host processor will initiate a communications session by first initializing various registers of each channel being used, by writing various parameters (such as the number of bits per character, and the desired baud rate) into the appropriate registers of the MCCC OCTART. For example, there is a global Channel Access Register, to which the host writes the number of the channel (of the eight possible channels) to be configured. After initializing that register, the host can simply use local addressing, without having to refer to a particular channel.

Thus, the baud rate can be specified for receiving data, simply by writing to the Baud Rate Period Count Register in the IBE, without having to specify the channel number again, or having to keep track of more than one address for the various baud rate receive registers. In addition, the host can initialize other registers with such parameters as parity options, character length and even special characters to be detected by the MCCC OCTART. The host can also enable any of the various interrupt modes supported (to specify the conditions upon which the MCCC OCTART will interrupt the host), and can activate any of the channels for transmitting or receiving data.

All of the "parameterization," as well as actual data transfer itself (e.g., when the host sends data characters to be transmitted via a particular channel, or receives characters from that channel), is controlled by the BIL. For example, whenever the host desires to send parameters to initialize any of the MCCC OCTART's registers, the BIL's Address Translation Logic translates the address specified by the host into either a global address (by appending zeros onto the most significant bits of the host-specified address) or a local address (by appending the known channel number onto the most significant bits of the host-specified address). This address translation mechanism is described above in greater detail. Note that, for data transfer, if the host addresses the BIL's Pointer Registers, the Address Translation Logic uses those registers as pointers into the data FIFOs, as well as activating the Pointer and Counter Manipulation Logic (for access to subsequent characters).

Having translated the host-specified address, the BIL sends that address along the internal address bus, enabling the appropriate register to send or receive data via the internal and then external data busses (perhaps with some modification of that data, as described above, by the Data Bus Interface), upon initiation of a read or write operation by the host. Perhaps most significantly, the BIL automates the data character transfer process (as described above) by maintaining and manipulating address pointers, thereby relieving the host processor of having to perform this task.

Returning to our example, after the MCCC OCTART's registers have been parameterized by the host (and one or more channels have been activated for receipt and/or transmission of data), the Main Engine initializes the Context RAM (for all active channels) with the starting address of the "start bit validation" firmware routine, and enables the IBE, which initiates a zero search, looking for the initial edge of a start bit on any of the active channels.

As explained above in the I/O BIt Engines section, the Input Bit Engine samples each active channel's input every nth cycle (where n is the number of channels), until a binary "0" is sampled, at which point a start bit edge is assumed, and the IBE activates its baud rate counters, causing sampling to occur every half-bit time. Assume that a start bit edge was detected on channel one. Note that the IBE now knows the context (receipt of data along channel one), and can enable the Main Engine, as well as the BIL, to access that context information.

During this time, the Main Engine's firmware is executing whichever background routine might be appropriate at that time (such as scanning for conditions upon which the host should be interrupted). Once the middle of the alleged start bit is sampled, the IBE interrupts the Main Engine (during execution of one of its background routines), at which point the Main Engine immediately responds to this interrupt, utilizing the State Interrupt Handling mechanism described above (with the Context RAM entry for receipt of data on channel one already initialized) to invoke the "start bit validation" routine.

This foreground firmware routine then examines the "middle" of the first sampled bit, available in the Sampled Data Register of the IBE. If it is a binary "1", then an invalid start bit has been detected, and the routine simply exits after loading its own starting address into the Context RAM location corresponding to the "channel one receive data" context (causing the routine to be executed again after the next start bit edge is found, and the middle of the alleged start bit is sampled).

As explained above in the I/O Bit Engines section, the IBE automatically returns to zero search mode (after testing the "middle" of the alleged start bit itself) in the event of an invalid start bit, and continues in timed sample mode in the event of a valid start bit (although the firmware modifies the Baud Rate Period Extension Count Register for the current context, to cause the IBE to perform full bit time (not half-bit time) sampling.

Eventually, however, the sampled bit will be a binary "0," indicating that a valid start bit has been detected, and the routine will exit after initializing the "option" register (with the host-specified character length and parity type) and storing the entry point of the next routine (which is invoked at the end of the start bit) into Context RAM. Remember that the IBE will already have reloaded the baud rate counters to sample the the next input on channel one a half-bit time later (i.e., at the end of the start bit).

The microcode for this routine might, for example, look like the following:

| | Start Bit Validation Routine | | |
|---|---|---|---|
| strt: | rxni | strt | invalid start, get back to level search |
| | mov | opt, rcount | initialize count and parity |
| | rx | stcnt | recognize validated start bit |

After sampling the end of the start bit, the IBE again interrupts the Main Engine, at which point the Interrupt Handler invokes the routine (the entry point of which was previously loaded into Context RAM, as described above) which handles the end of the start bit, by causing the IBE to begin sampling at full bit time, rather than half-bit time, by modifying the IBE's Baud Rate Extension Count Period Register for channel one. Note that by the time this modification takes effect, the IBE will already have sampled the middle of the first bit of the data character (at half-bit time). The current routine, however, ignores the samples data (at the end of the start bit), and returns after storing the address of the "character assembly" routine into Context RAM.

Upon sampling the middle of the first bit of the data character, the IBE again interrupts the Main Engine, causing the character assembly routine to be executed. This routine inserts that first sampled bit into the character being assembled, using the "ish" instruction described above. Remember that repeated execution of the "ish" instruction will result in the assembled character being right justified. The Main Engine then executes the "bcap" instruction (also described above) in order to (1) decrement the character count, causing the "zero-flag" to be set if character assembly will be complete after the next bit, (2) perform a running parity generation (so that, at the end of the character, if the host so specifies, that generated parity value can be compared with the received parity bit), and (3) perform a running "break detect" check, by logically "OR"ing each data bit with the accumulated value of previous "OR"s for the current character (to determine if all bits of the character are "0", the "break" character).

This routine then tests the "zero flag" to determine if character assembly will be complete after the next bit. If not, it simply returns after storing the entry point of this same routine (to continue character assembly) into Context RAM. Otherwise, this routine checks the "parity type" in the options register (r1), to determine if a parity bit will be sent with this character. If not, it stores the entry point of the "final character bit with no parity" routine in Context RAM. Otherwise, it stores the entry point of the "final character bit with parity" routine in Context RAM.

Additional routines determine if parity or framing errors occurred, and if the "break" character (all zeros) was received, and set the appropriate flags. After modifying the IBE's Control Mode Bit (to begin start bit detection), storing the assembled character in a temporary holding register and setting a flag indicating that character assembly is complete, the process is then repeated, by storing the entry point of the "start bit validation" routine into Context RAM.

All channels undergo a similar process, with the IBE interrupting the Main Engine, causing the Interrupt Handler to initiate firmware foreground routines to assemble characters and detect communications errors. A similar process is performed for bits transmitted via the OBE (except that the "osh" instruction is used for character disassembly, and, instead of sampling and validating start, stop and parity bits, these bits are merely transmitted along with the character bits).

While the Main Engine is not assembling and disassembling characters in response to I/O Bit Engine interrupts, the Main Engine's firmware background routines are executed. These background routines can perform a wide variety of functions, such as detecting completion of character assembly (sometime before the next character is received and assembled) and storing the assembled character into the next free area of the receive data FIFO in RAM. Other routines inspect the status of received characters and stored this status information in the receive data FIFO in RAM (interleaved with the data itself). If the host so specifies, a background routine will compare received characters with host-specified "special" characters, and set additional status FIFO bits to so inform the host.

As mentioned above, the host may vary the manner in which the MCCC OCTART interprets characters and informs the host. These variations involve not merely writing different parameter values to the chip at execution time, but actually writing firmware routines, for example, so as to significantly customize the communications process to the host's specifications. One such example is the implementation of "Xon/Xoff" flow control. Without being specifically designed into the MCCC OCTART, this feature could be added with mere firmware changes, relieving the host processor of a significant amount of processing time. Many other examples exist (limited only by one's imagination) due to the extreme flexibility of this general purpose microcoded engine.

Returning to our example, a time will be reached when, as characters continue to arrive, it is necessary to interrupt the host—e.g., if the transmit data FIFO is empty, or the receive data FIFO threshold (specified by the host) is reached. It is at this point that the Good Data Interrupt mechanism (described above) and the BIL's Automated Data Transfer mechanism (also described above) come into play. The process by which the host is interrupted, and data of a particular status type is transferred to the host (and data is received from the host), has already been described in detail in the Good Data Interrupt and Automated Data Transfer sections, so it need not be repeated here.

Schematics (Appendix A) and firmware routines, including the MCCC OCTART's microinstruction set (Appendix B), for a specific implementation of the preferred embodiment of this invention, are attached as appendices to this specification.

APPENDIX A
Schematics
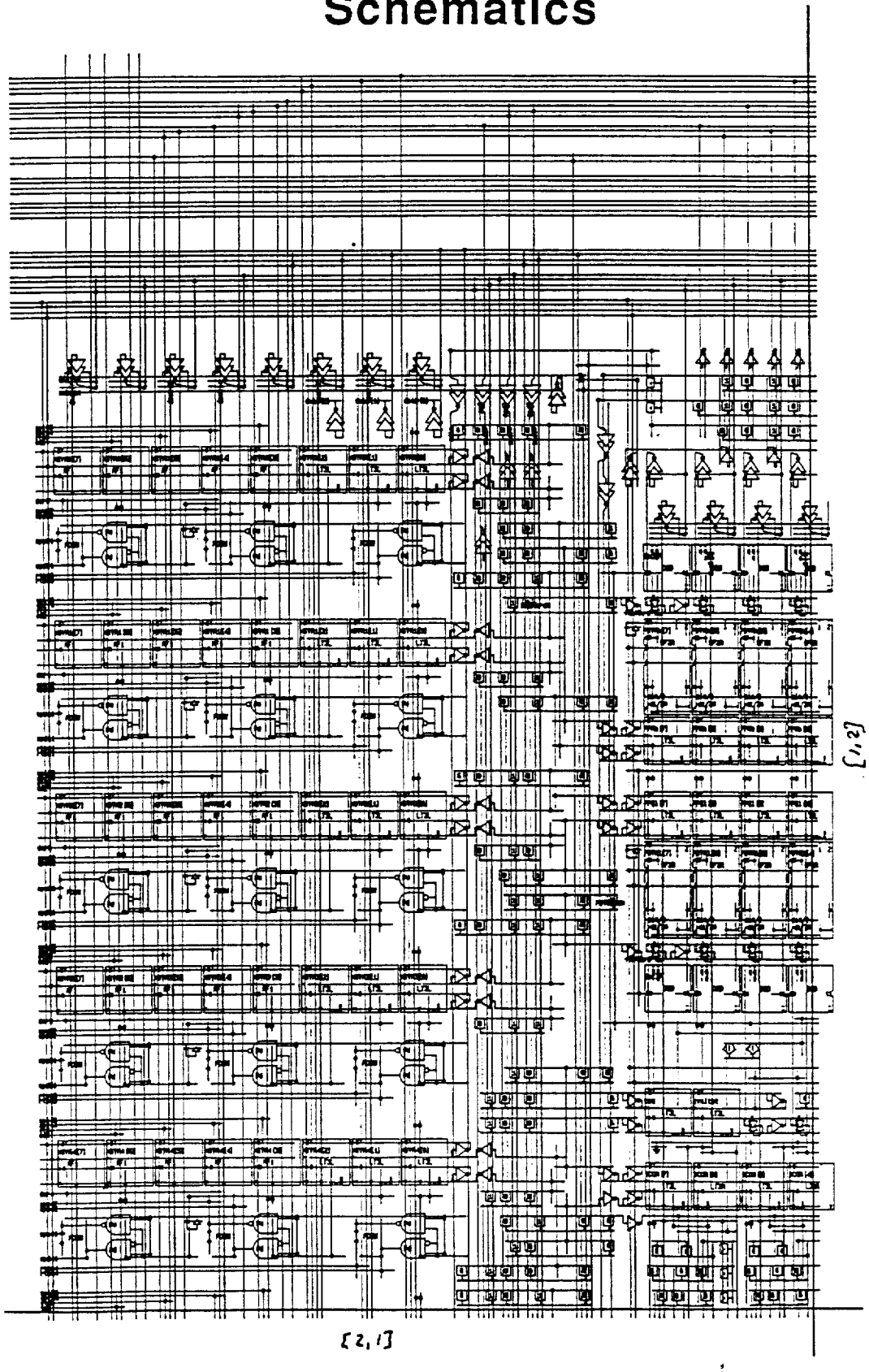

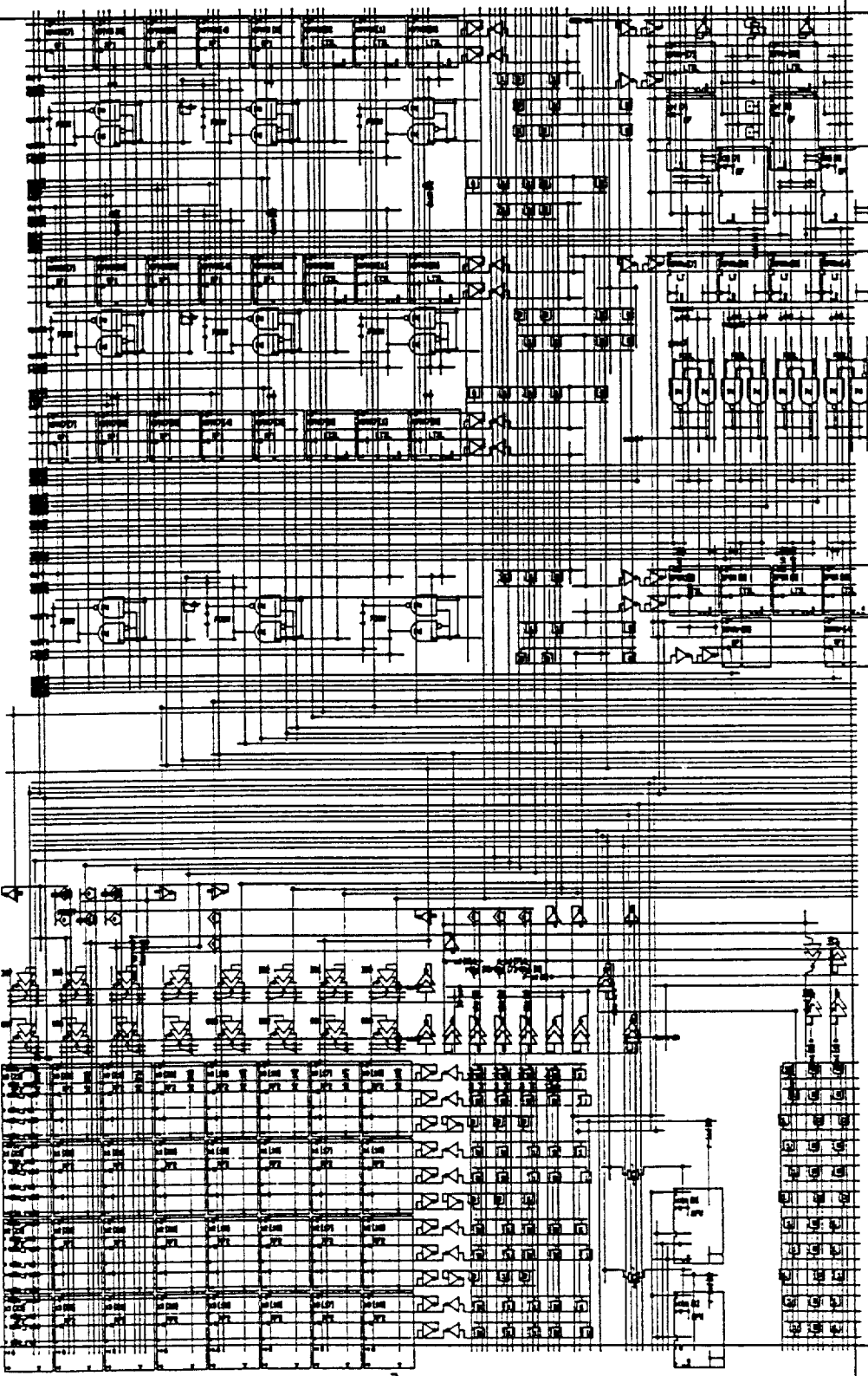

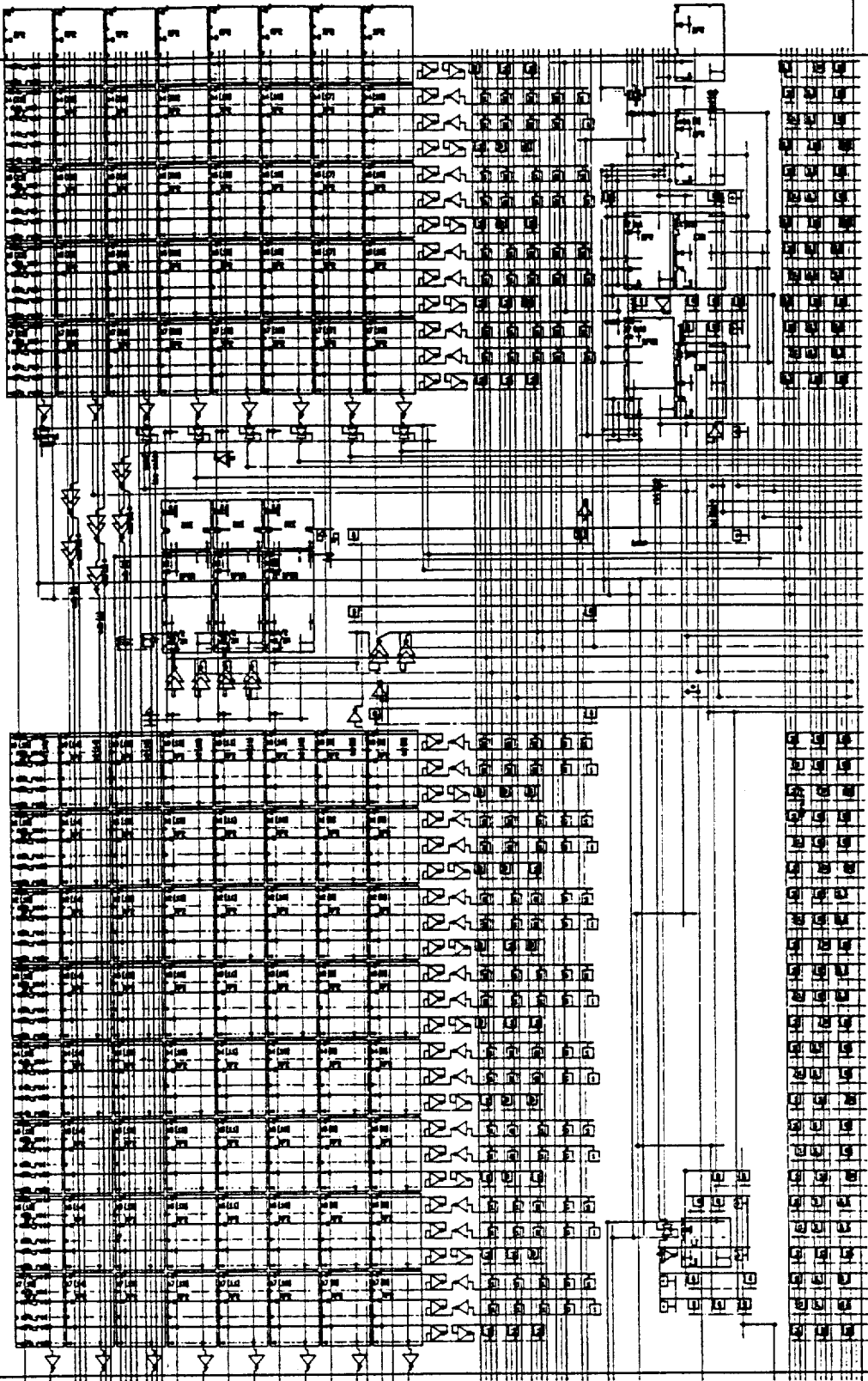

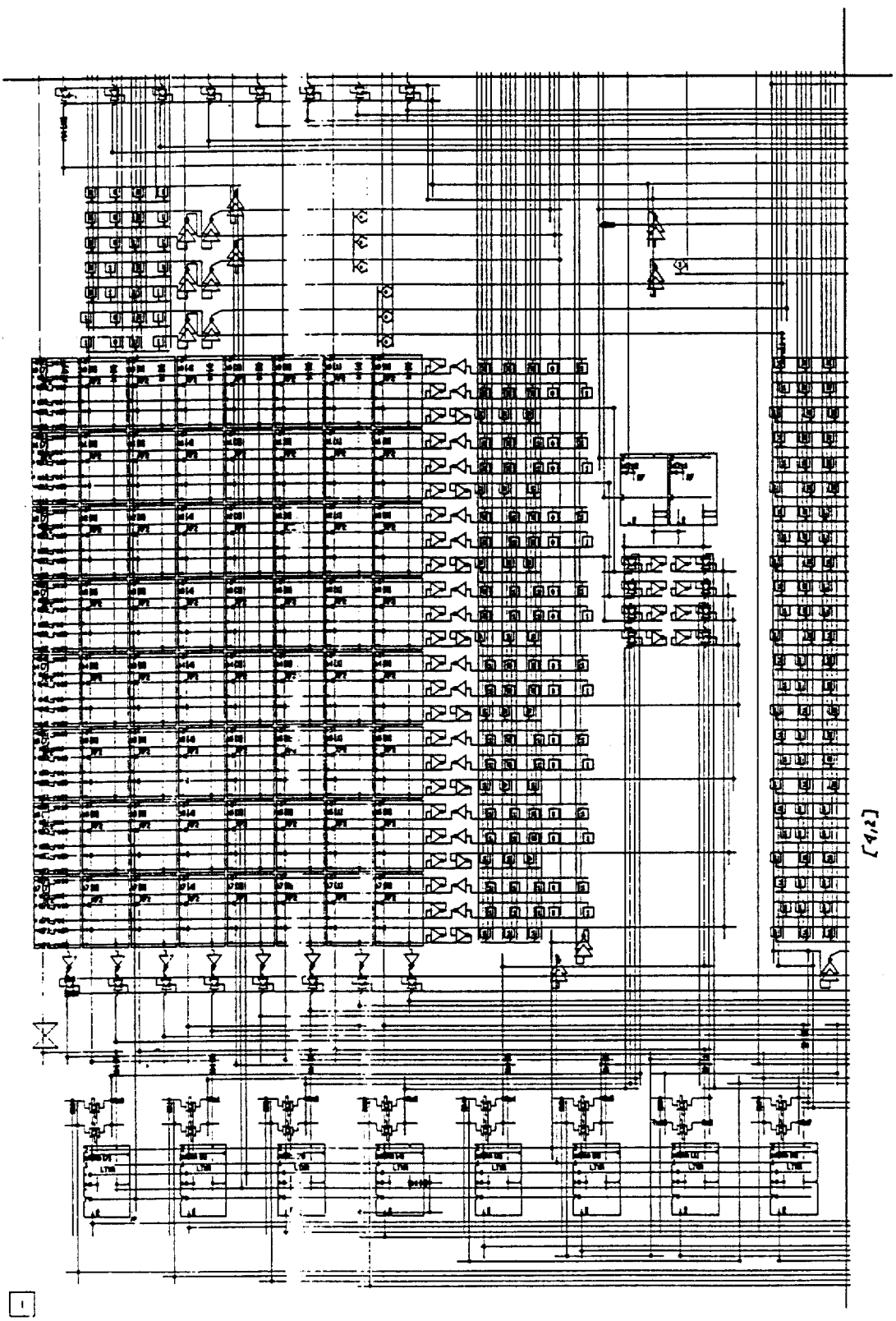

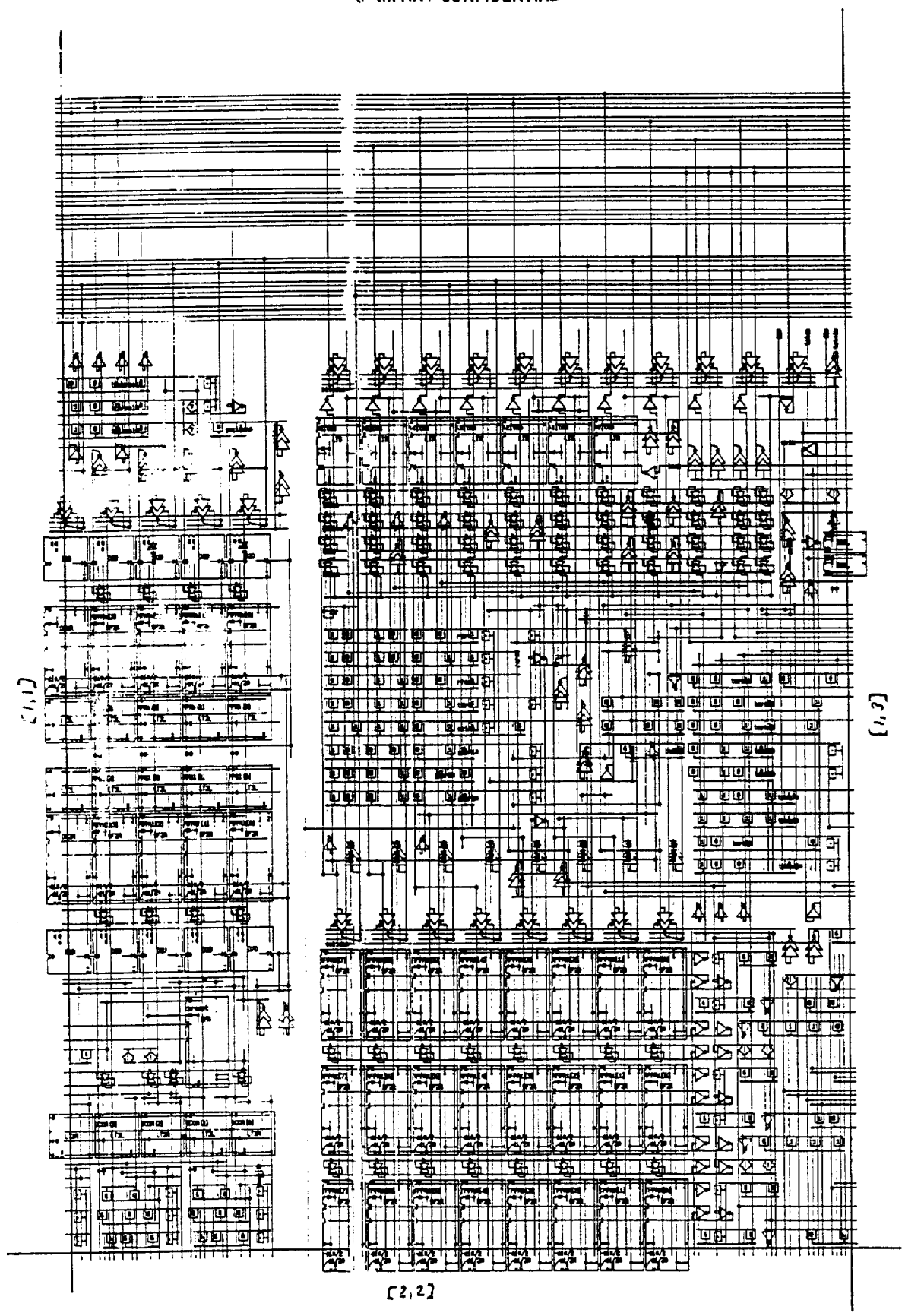

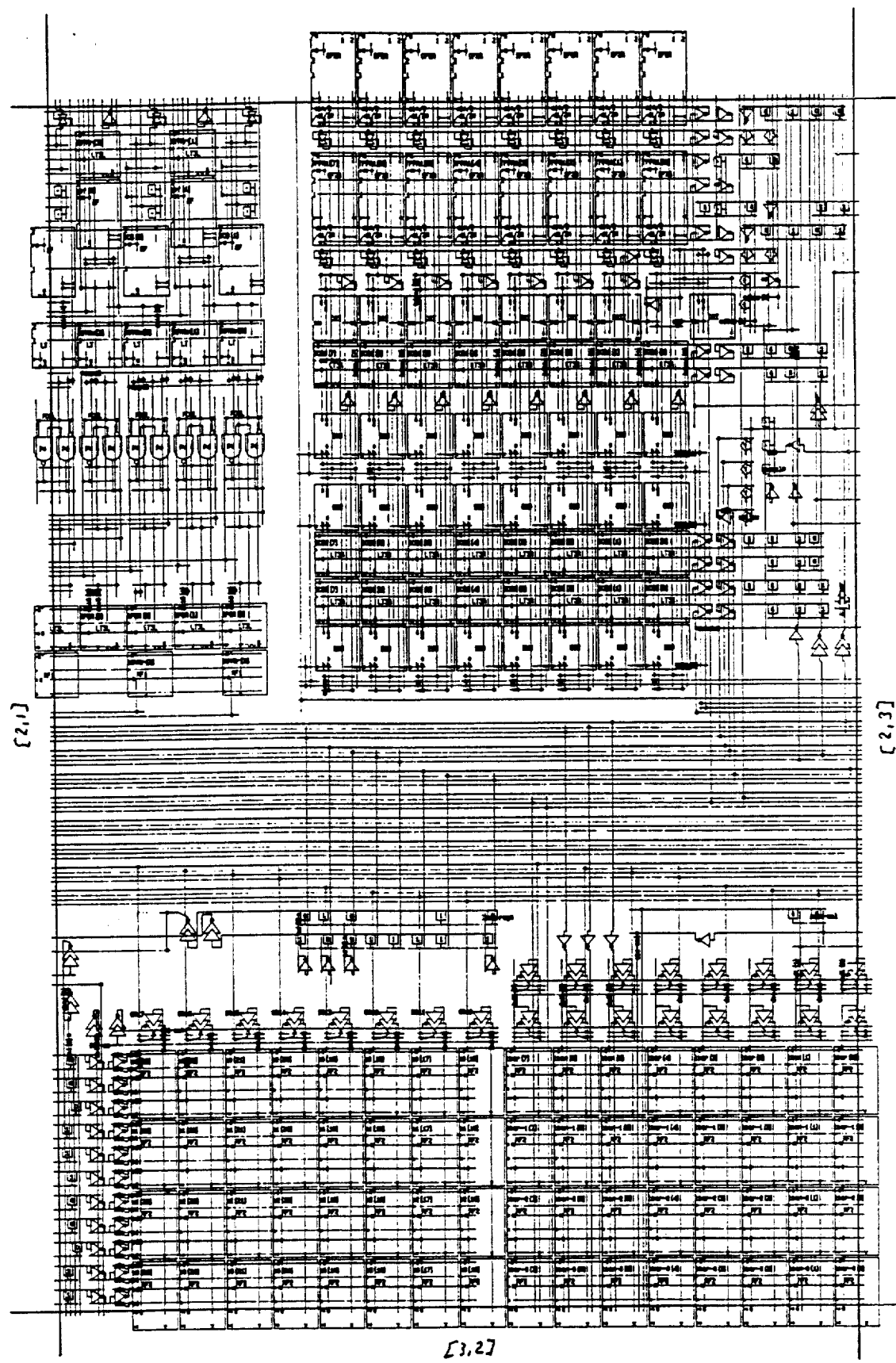

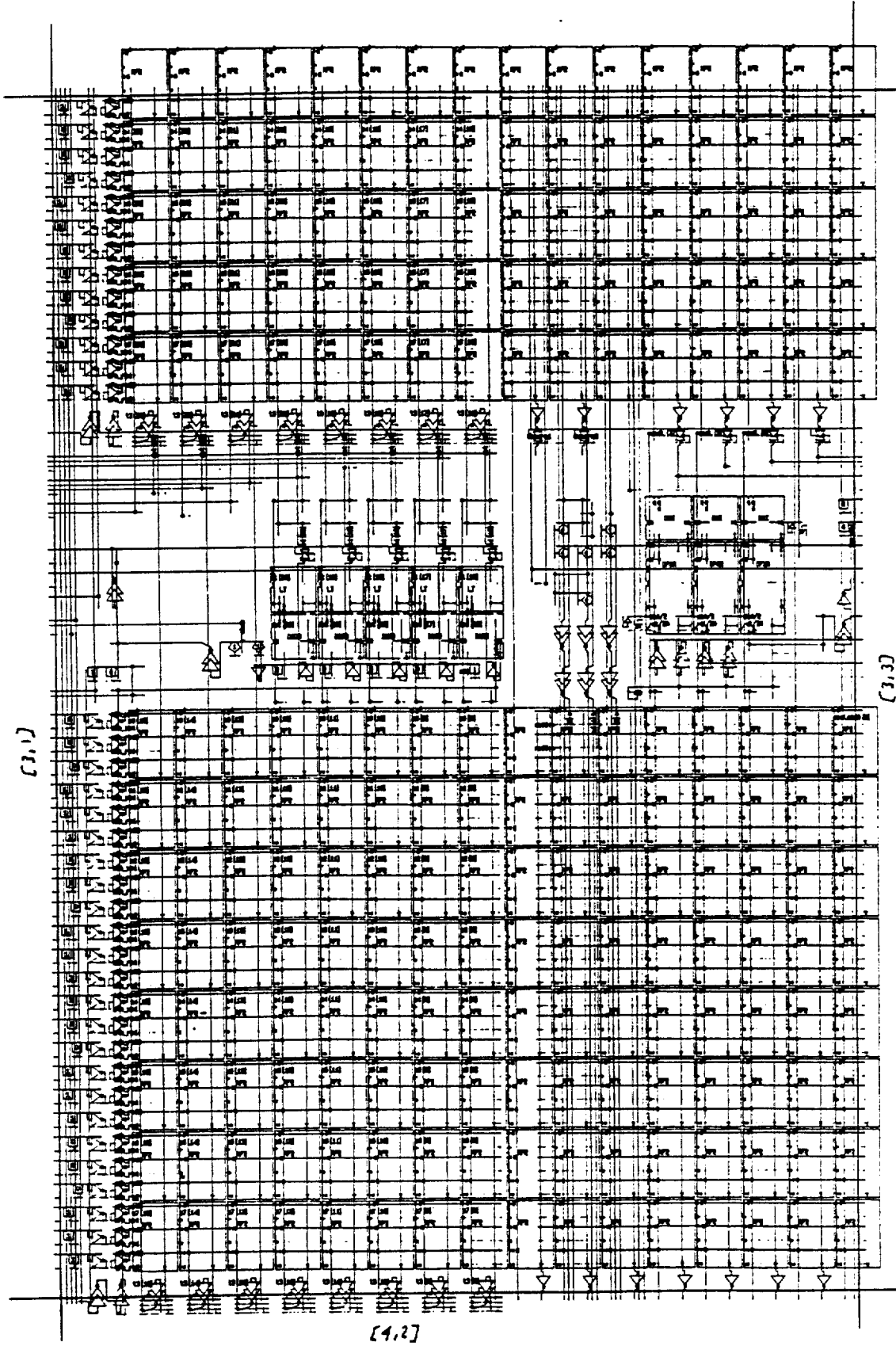

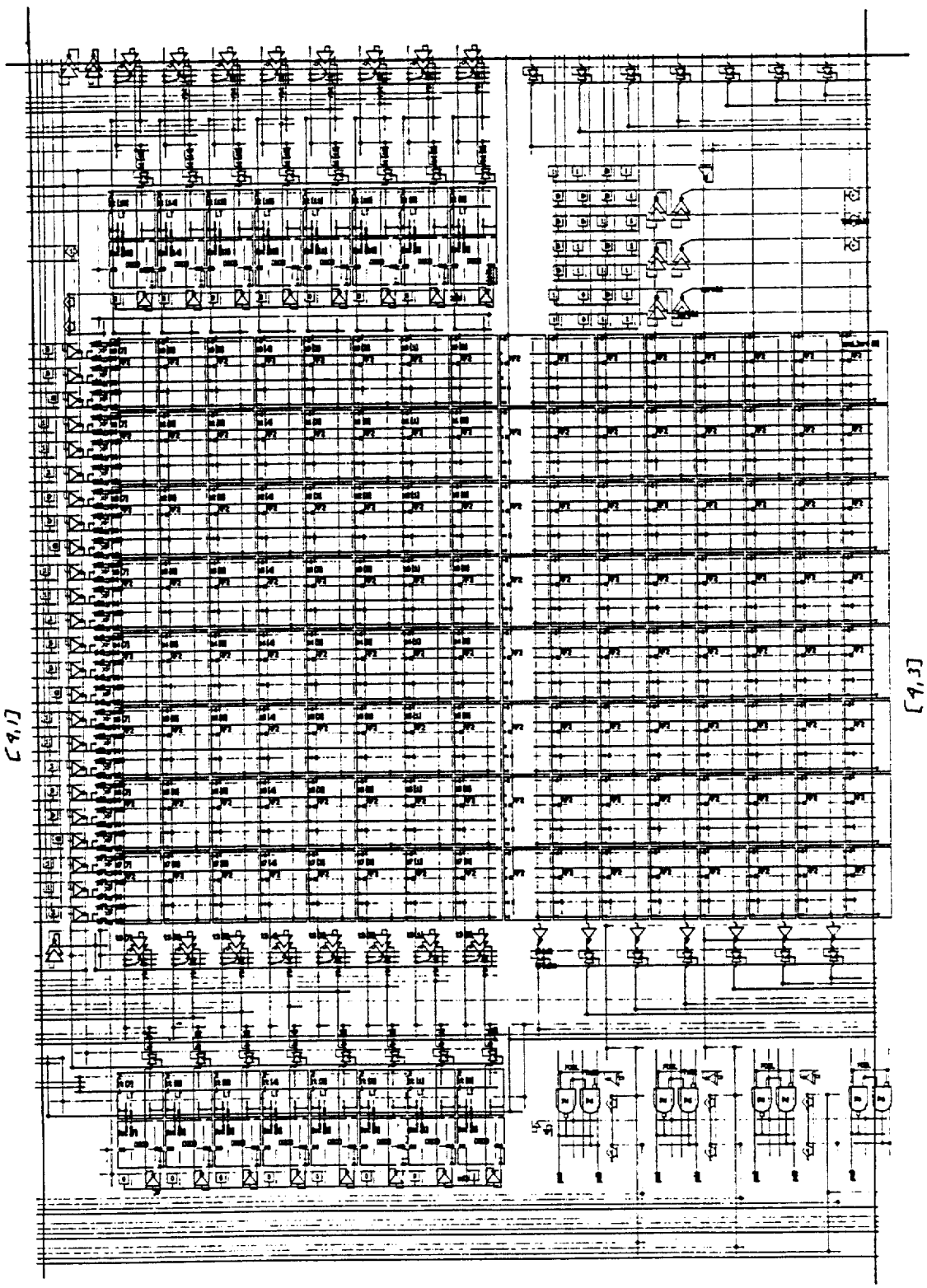

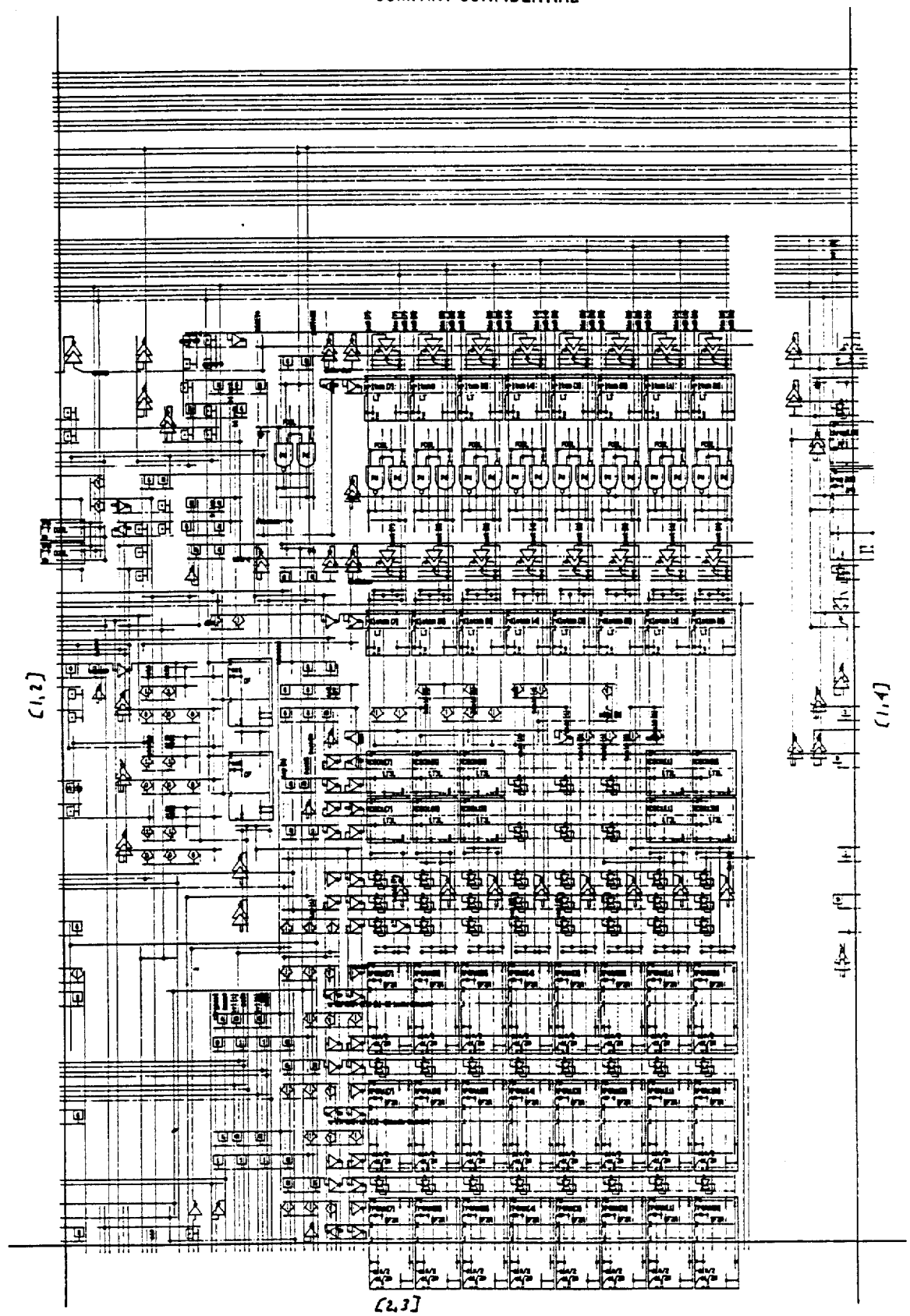

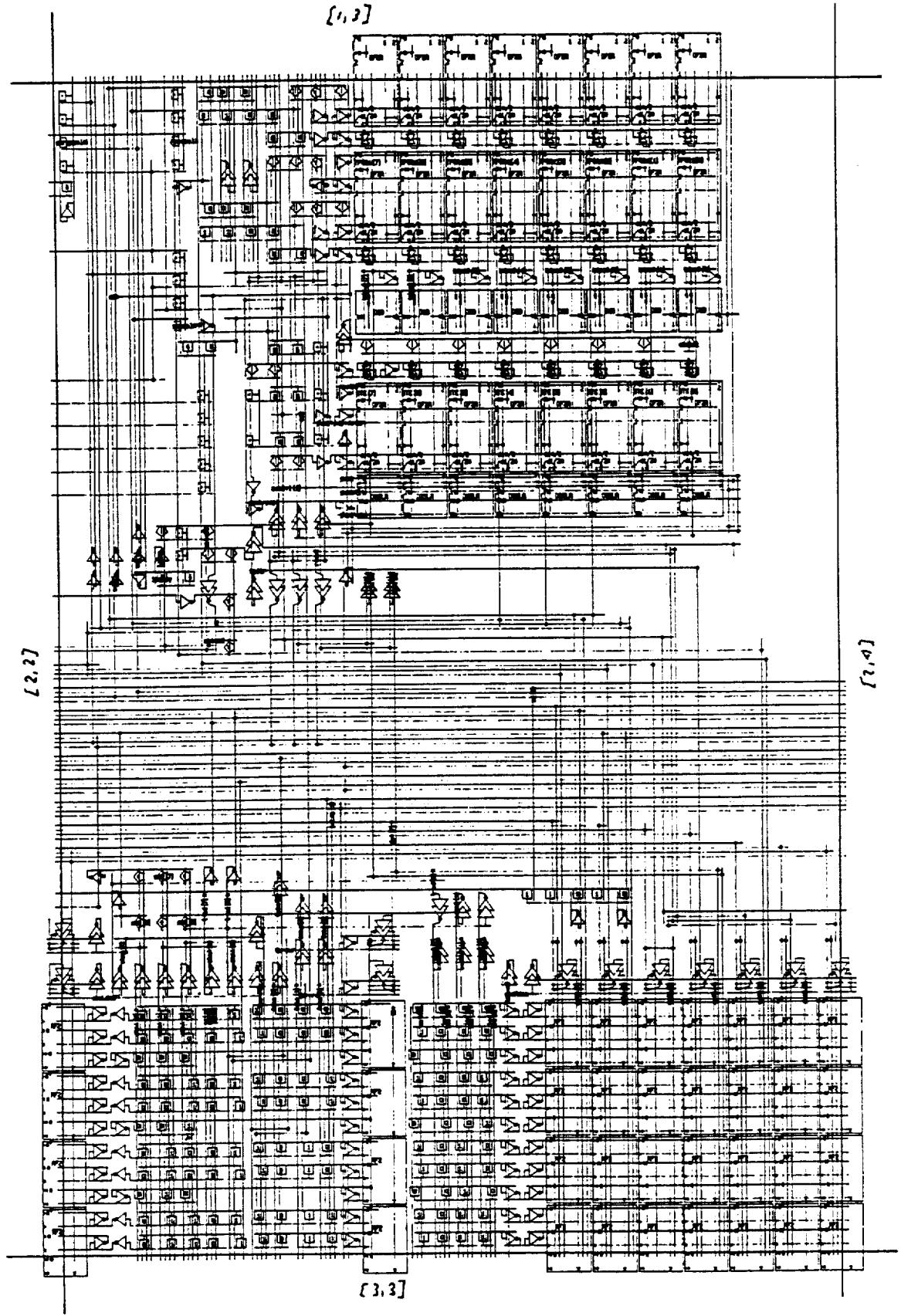

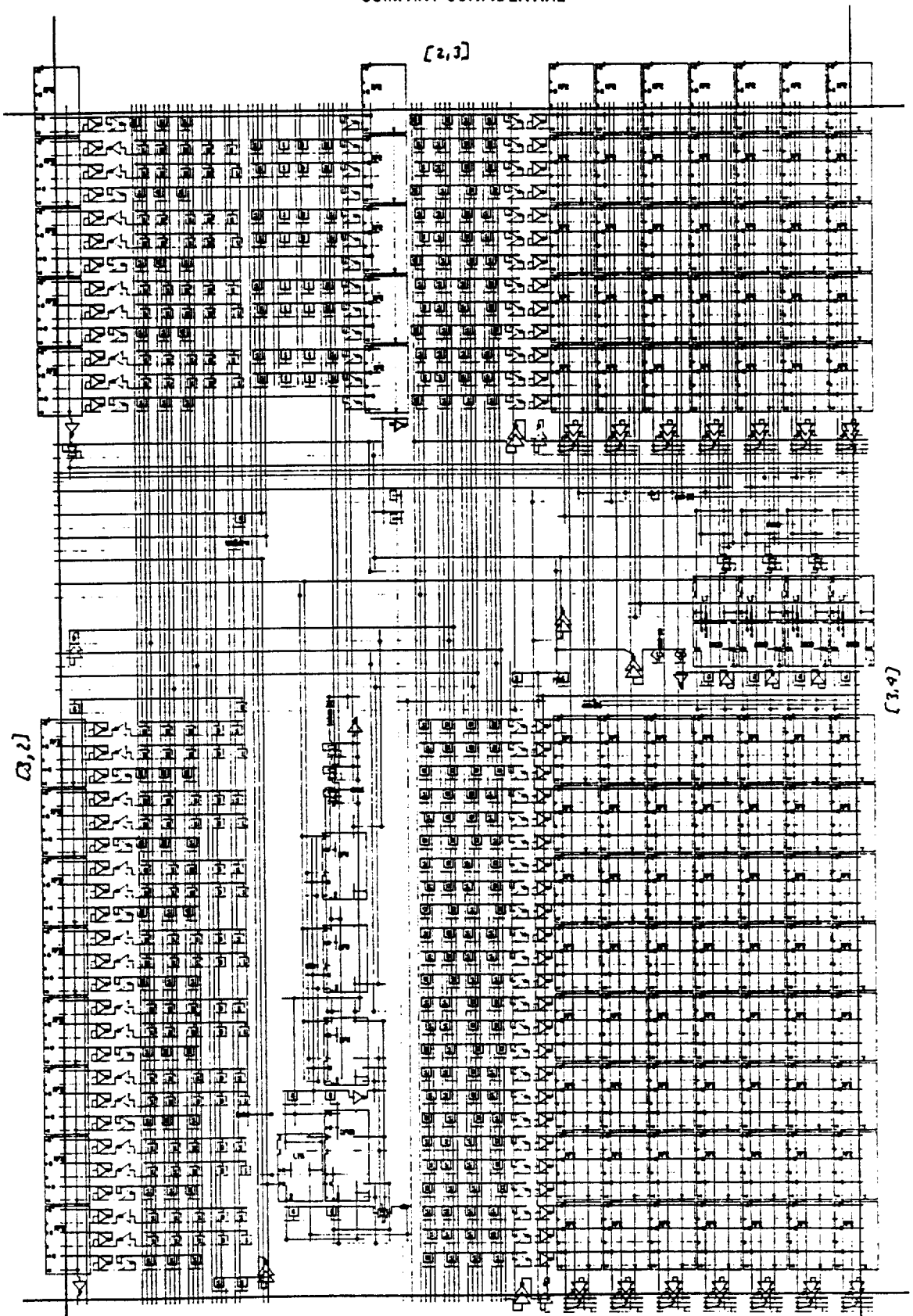

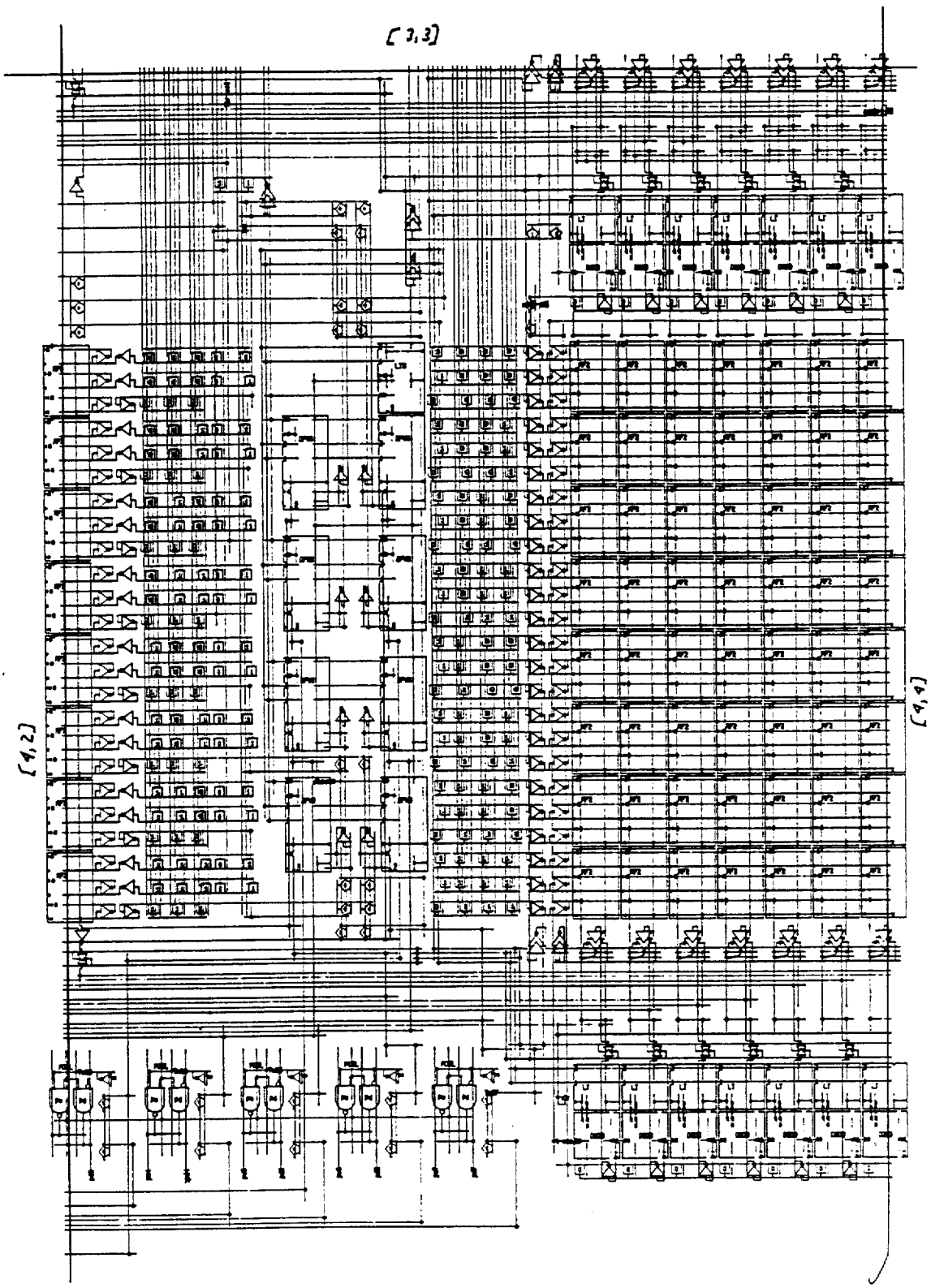

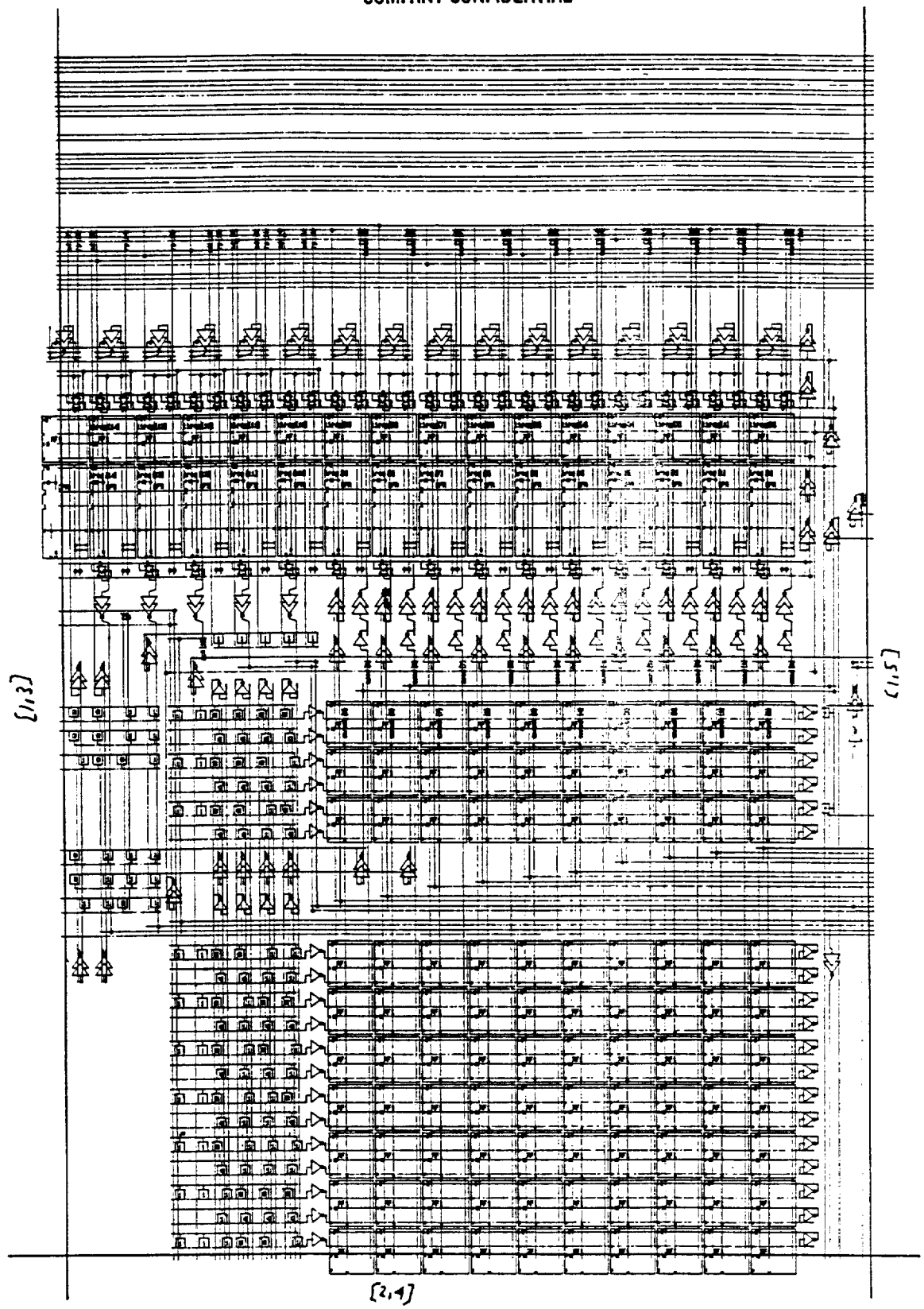

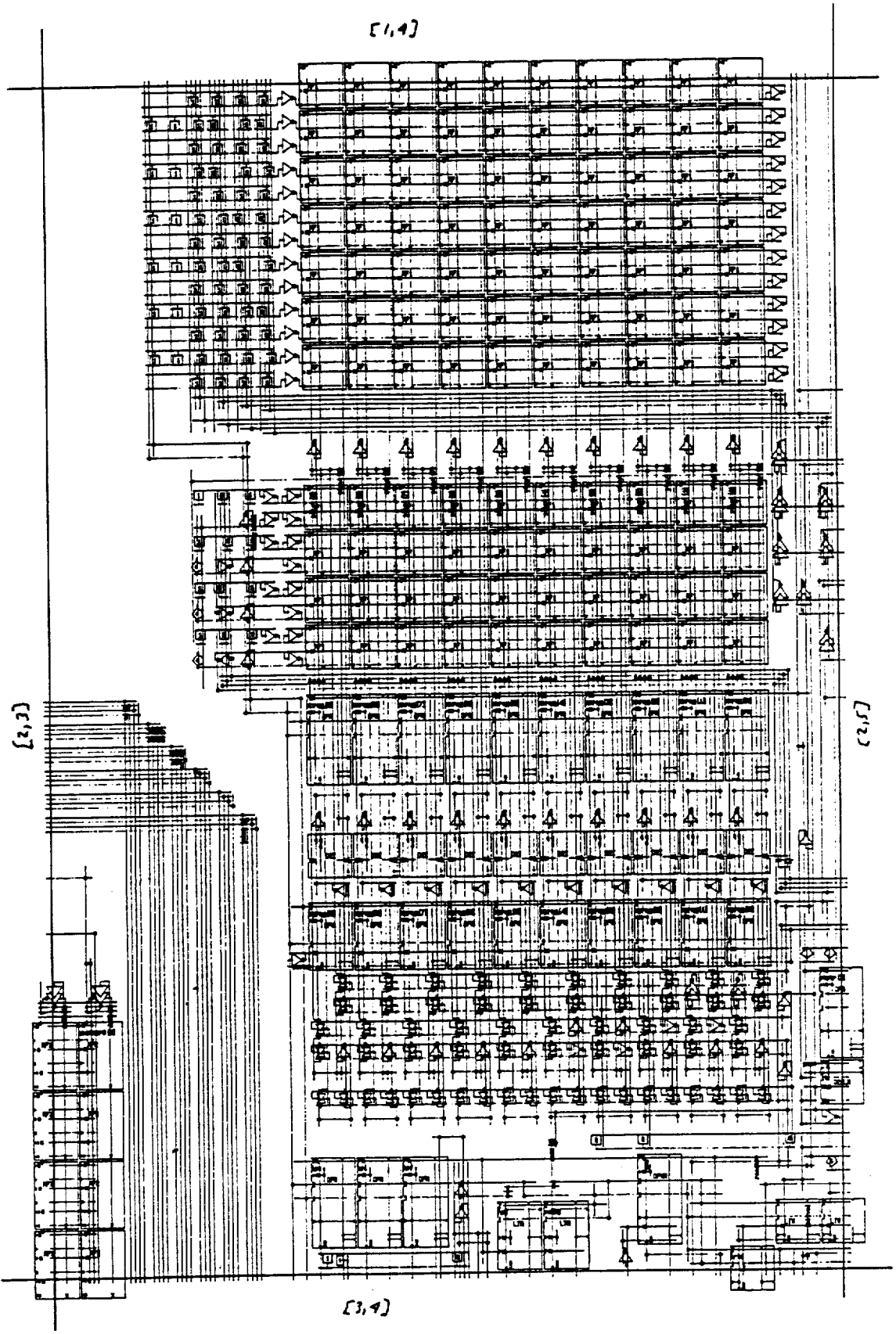

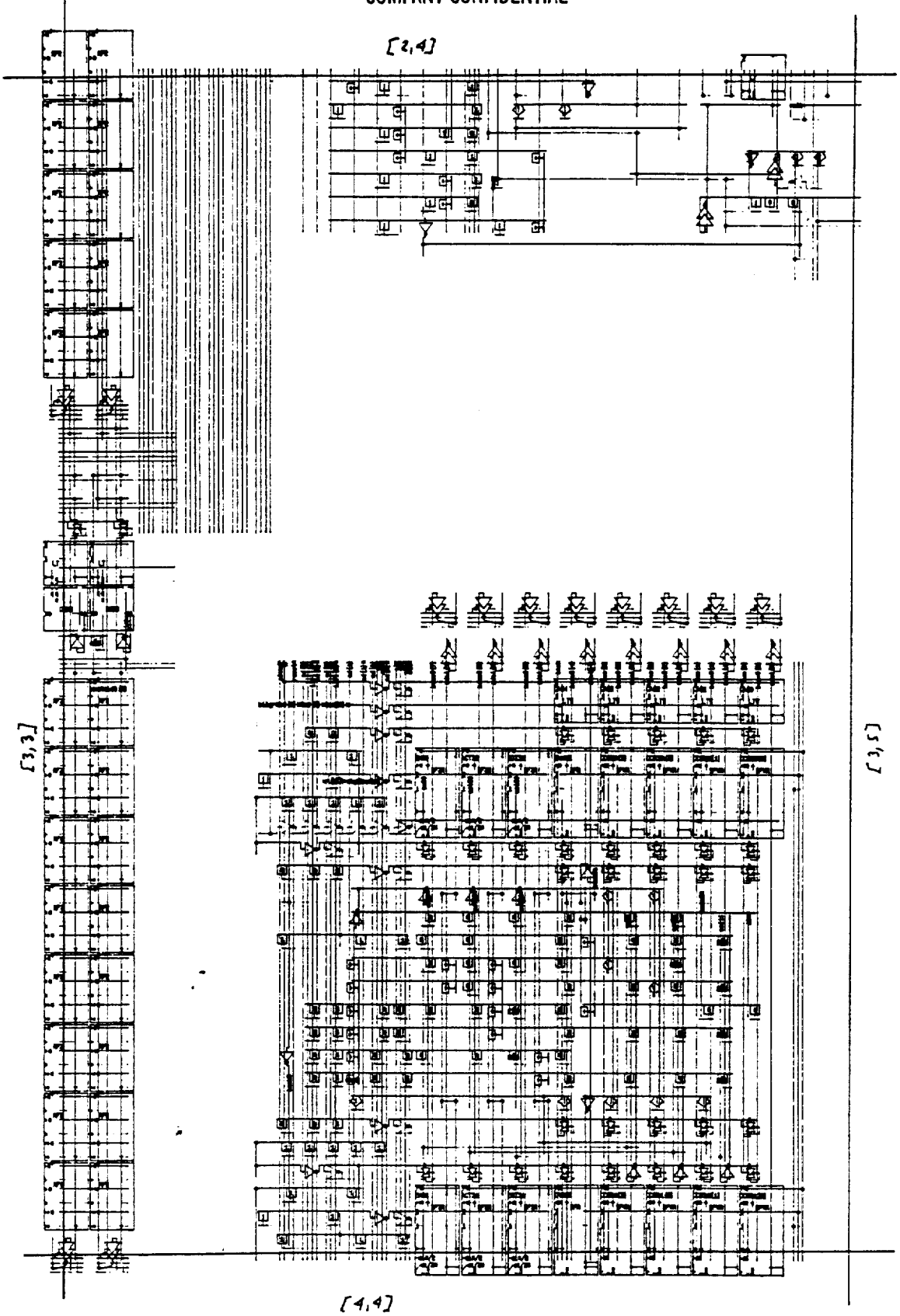

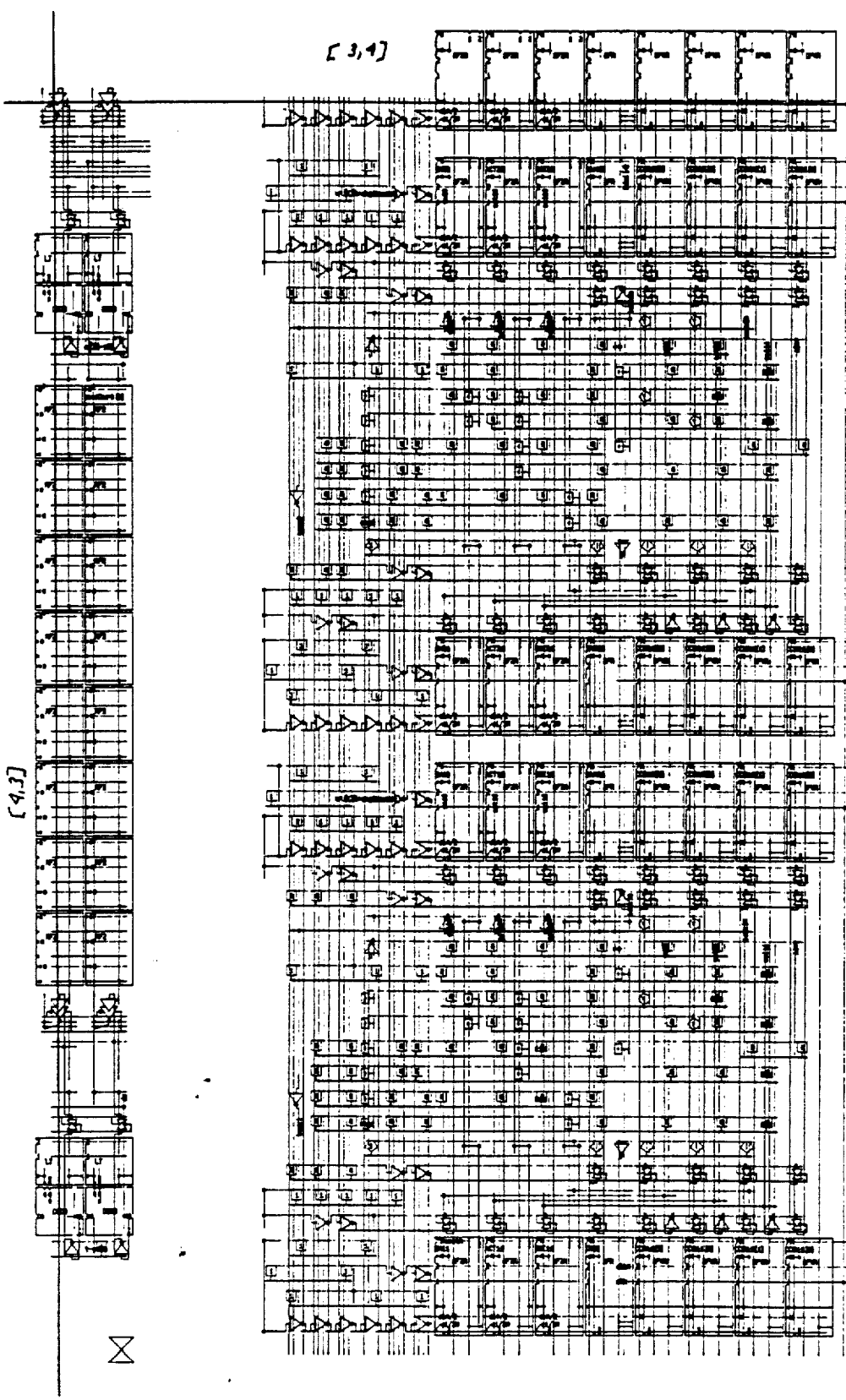

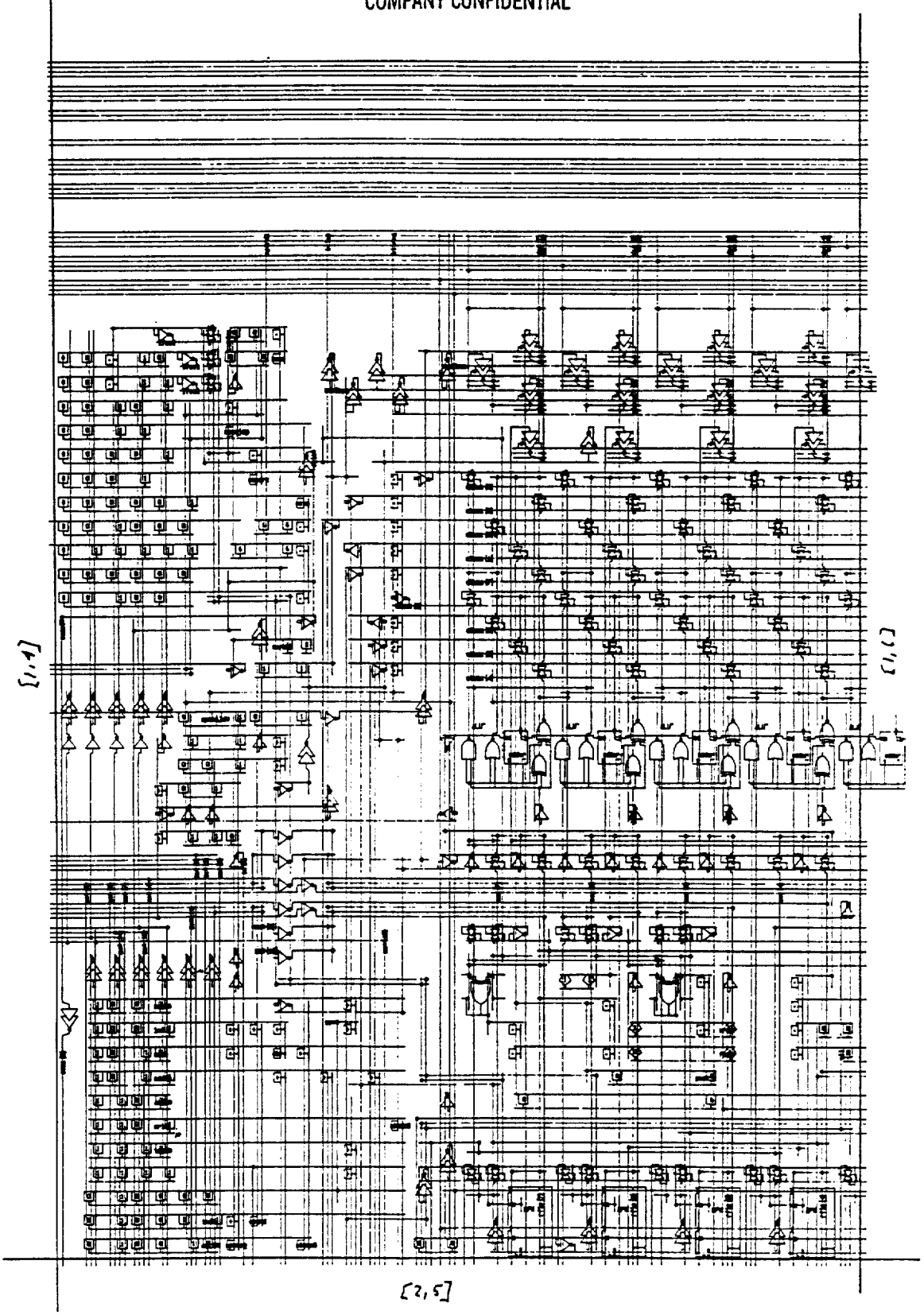

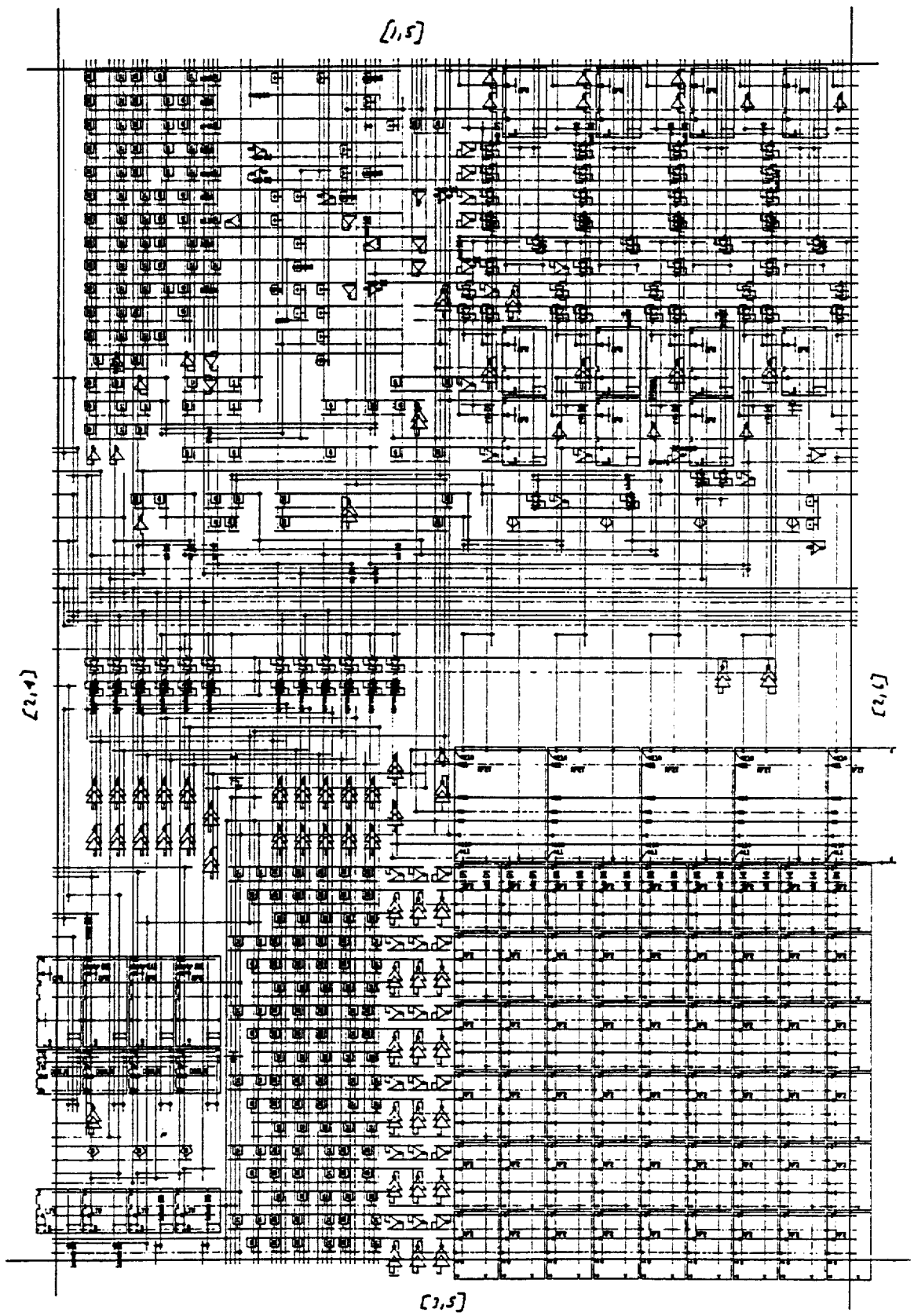

CIRRUS LOGIC, INC.
COMPANY CONFIDENTIAL

[3,5]

[4,4]

[4,6]

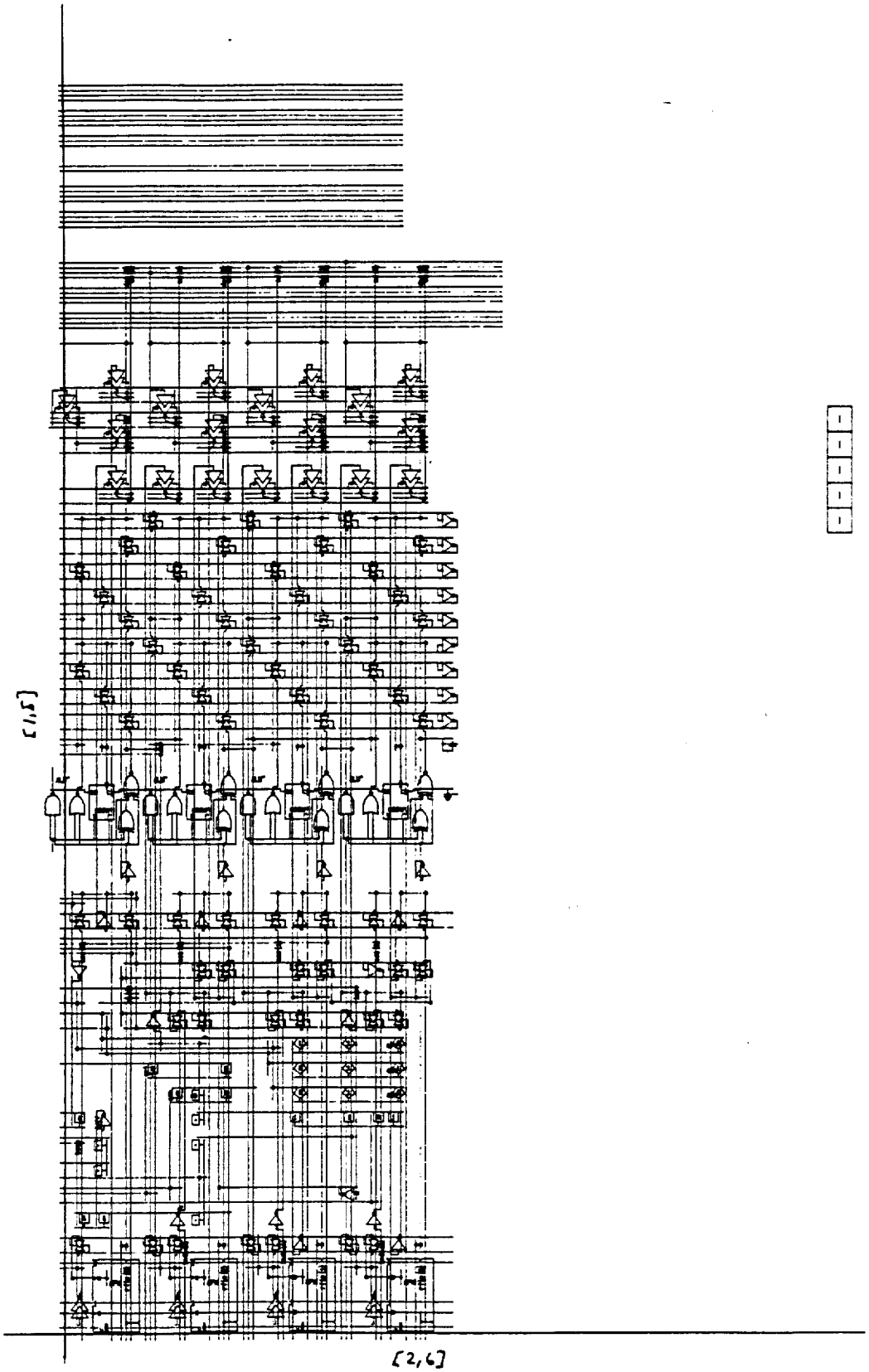

[1,6]
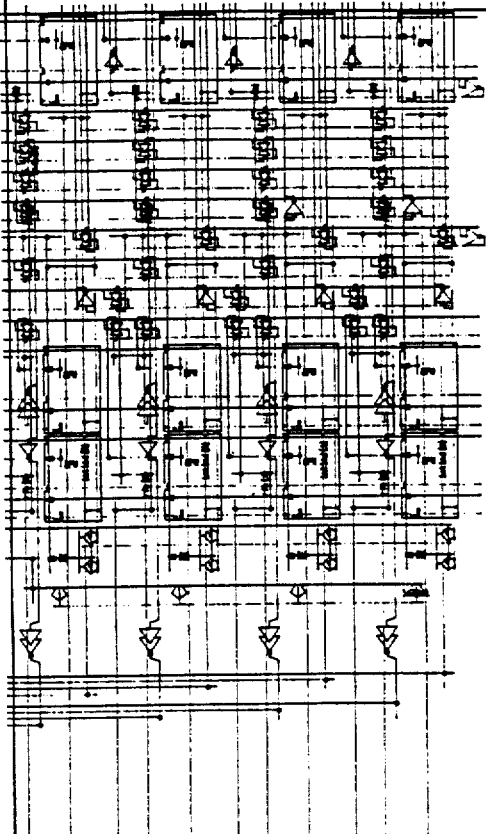
[2,5]
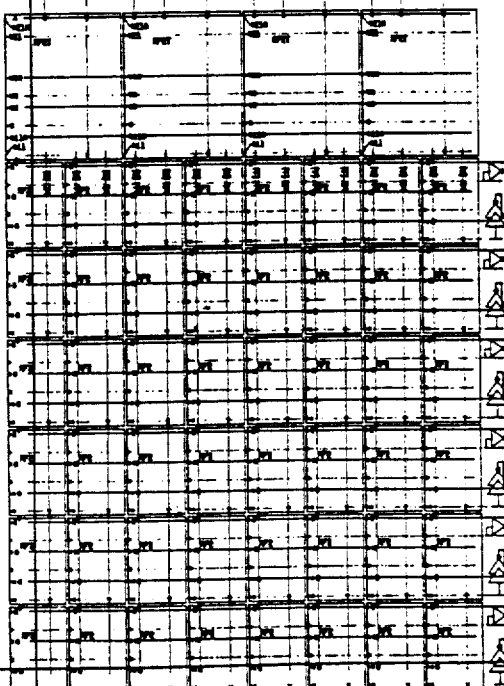
[3,6]

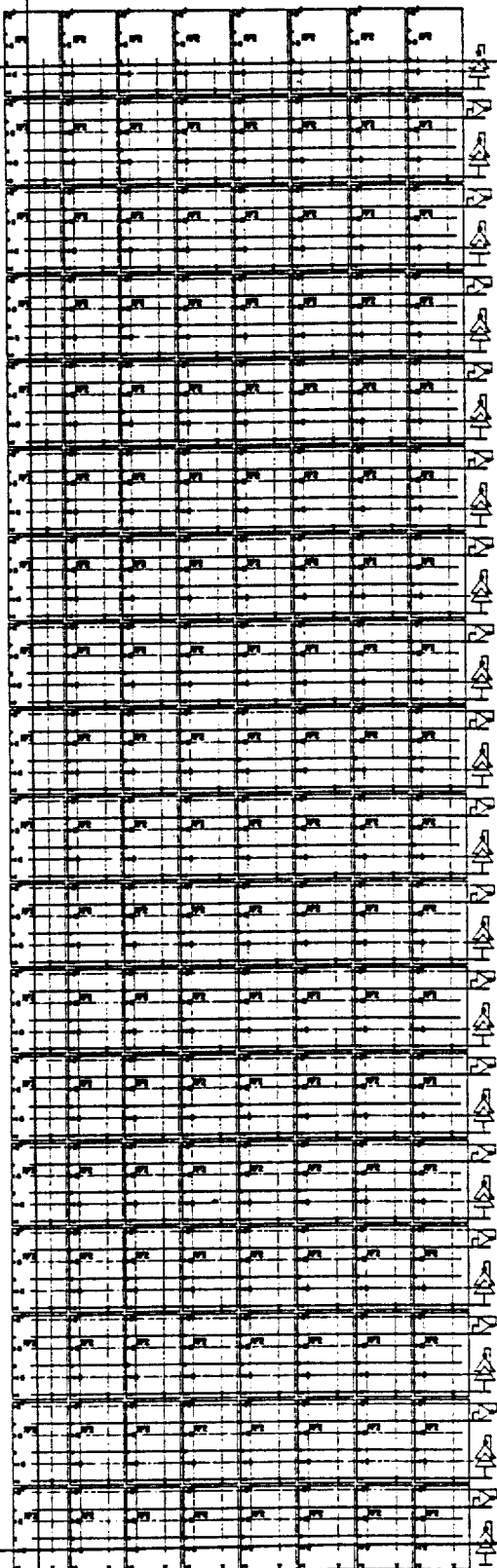

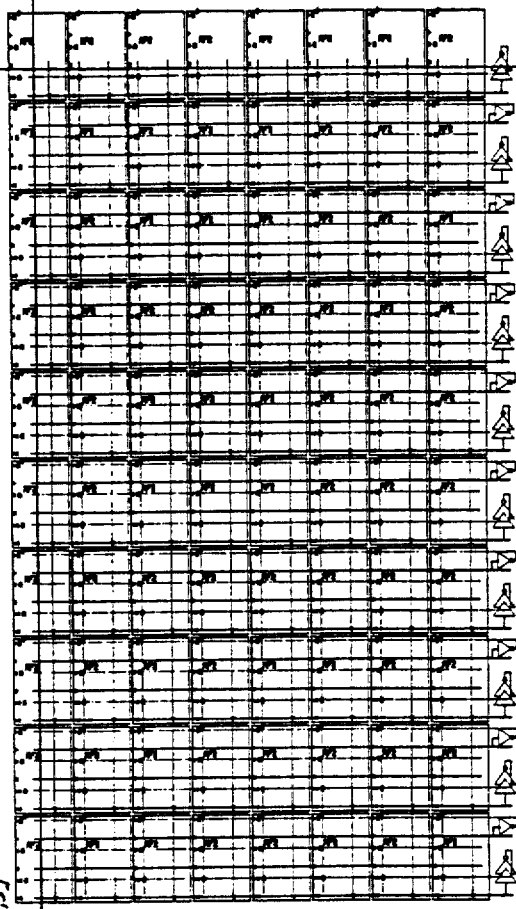

APPENDIX B

Microinstruction Set and Microcode

```
*********************************************************************
                            DEFINITIONS:
r1 & r2 :: any general purpose register including the index, indirect
           address register or the accumulator
n       :: any 8 bit number (0 - 255)
adr     :: a 10 bit ROM address
pa      :: a 8 bit for external port address
*********************************************************************

DATA MOVEMENT INSTRUCTIONS:
   ---------------------------
   mov     r1,r2          ; load the contents of register r1 into r2
   movi    n,r1           ; load the value n into register r1
   ldx     adr            ; load adr into context return address ram as
                          ; pointed by the index register
   in      pa,r1          ; load the contents of the port addressed
                          ; by pa into the register r1
   out     r1,pa          ; load the contents of register r1 into the
                          ; port addressed by pa
   ind     r1             ; load the contents of the port addressed by the
                          ; indirect register into register r1
   outd    r1             ; load the contents of register r1 into the port
                          ; addressed by the indirect register JUMP GROUP INSTRUCTIONS:
   ------------------------
   jump    adr            ; jump to address adr
   jz      adr            ; jump conditional to address adr if zero flag set
   jnz     adr            ; jump conditional to address adr if zero flag reset
   jc      adr            ; jump conditional to address adr if carry flag set
   jnc     adr            ; jump conditional to address adr if carry flag reset
   ji      adr            ; jump conditional to address adr if in flag set
   jni     adr            ; jump conditional to address adr if in flag reset CALL AND RETURN GROUP:
   ----------------------
   calls   adr            ; call subroutine starting from address adr
   rets                   ; return from subroutine
   rx      adr            ; return from interrupt and store adr in context
                          ; return address ram
   rxz     adr            ; return conditional from interrupt and store adr in
                          ; context return ram if zero flag is set
   rxnz    adr            ; return conditional from interrupt and store adr in
                          ; context return ram if zero flag is reset
   rxc     adr            ; return conditional from interrupt and store adr in
                          ; context return ram if carry flag is set
   rxnc    adr            ; return conditional from interrupt and store adr in
                          ; context return ram if carry flag is reset
   rxi     adr            ; return contitional from interrupt and store adr in
                          ; context return ram if in flag is set
   rxni    adr            ; return conditional from interrupt and store adr in
```

; context return ram if in flag is reset

ARITHMETIC AND LOGICAL OPERATIONS:
---------------------------------
```
add     r1,r2       ; add contents of r1 and r2 together and load back
                    ; into r2
addi    n,r1        ; add contents of r1 with value n and load back
                    ; into r1
and     r1,r2       ; logical and of contents of r1 and r2 and store in r2
andi    n,r1        ; logical and of contents of r1 with value n and store
                    ; in r1
or      r1,r2       ; logical or of contents of r1 and r2 and store in r2
ori     n,r1        ; logical or of contents of r1 with value n and store
                    ; in r1
tst     r1,r2       ; logical and of contents of r1 and r2
tsti    n,r1        ; logical and of contents of r1 with value n
cmp     r1,r2       ; compare the contents of r1 with r2
cmpi    n,r1        ; compare the contents of r1 with value n
srl     r1          ; shift right logical contents of r1 and store in r1
sll     r1          ; shift left logical contents of r1 and store in r1
```

ASSEMBLY/DISASSEMBLY SPECIAL INSTRUCTIONS:
------------------------------------------
```
ish     r1,r2       ; inshift the i-flag bit into register r2 with
                    ; register r1 options
osh     r1,r2       ; outshift the register r2 with register r1 options
bcap    r1,r2       ; bit count and accumulate parity in register r2
                    ; with register r1 options
```

The following is a formal description of the actions taken by the instructions
> .

1) mov  r1,r2

```
    acc,r2 <- r1
    Z <- zero (acc)
    C <- C
    I <- I
    PC <- PC + 1
```

2) movi n,r1

```
    acc,r1 <- n
    Z <- zero (acc)
    C <- C
    I
```

| INSTRUCTION   | acc    | r1     | r2  | alt Z | alt C | alt I | pc   |
|---------------|--------|--------|-----|-------|-------|-------|------|
| mov   r1,r2   | r1     | NC     | r1  | YES   | NO    | NO    | pc+1 |
| movi  n,r1    | n      | n      | --  | YES   | NO    | NO    | pc+1 |
| in    pa,r1   | db[pa] | db[pa] | --  | YES   | NO    | NO    | pc+1 |
| out   r1,pa   | NC     | NC     | --  | NO    | NO    | NO    | pc+1 |
| ind   r1      | $1     | $1     | --  | YES   | NO    | NO    | pc+1 |
| outd  r1      | NC     | NC     | --  | NO    | NO    | NO    | pc+1 |
| calls adr     | --     | --     | --  | NO    | NO    | NO    | adr  |
| jump  adr     | --     | --     | --  | NO    | NO    | NO    | adr  |
| jz    adr     | --     | --     | --  | NO    | NO    | NO    | adr  |
| jnz   adr     | --     | --     | --  | NO    | NO    | NO    | adr  |
| jc    adr     | --     | --     | --  | NO    | NO    | NO    | adr  |
| jnc   adr     | --     | --     | --  | NO    | NO    | NO    | adr  |
| ji    adr     | --     | --     | --  | NO    | NO    | NO    | adr  |
| jni   adr     | --     | --     | --  | NO    | NO    | NO    | adr  |
| calls adr     | --     | --     | --  | NO    | NO    | NO    | adr  |
| calls adr     | --     | --     | --  | NO    | NO    | NO    | adr  |
| calls adr     | --     | --     | --  | NO    | NO    | NO    | adr  |
| calls adr     | --     | --     | --  | NO    | NO    | NO    | adr  |
| calls adr     | --     | --     | --  | NO    | NO    | NO    | adr  |

| INSTRUCTION | acc | r1 | r2 | alt Z | alt C | alt I | pc |
|---|---|---|---|---|---|---|---|
| calls adr | -- | -- | -- | NO | NO | NO | adr |
| calls adr | -- | -- | -- | NO | NO | NO | adr |
| calls adr | -- | -- | -- | NO | NO | NO | adr |
| calls adr | -- | -- | -- | NO | NO | NO | adr |

Accumulator: {acc}

Index register format: {ix}

| Z | C | I | G | T | INDEX |
|---|---|---|---|---|---|

Z         Zero flag
C         Carry flag
I         In flag
G         GLobal (G=0 indicates local and only applies to scratch pad addressing within the opu)
T         Transmitter (T=0 indicates receiver)
INDEX    Channel number index

SPECIAL INSTRUCTIONS:
---------------------

1) ish r1,r2

Ish instruction has two arguments namely two registers. The regsiter r1 contains the optional opertaions to be performed on the register r2. Let us assign the I-flag I, the contents of r1 as r1{7:0} and the contents of r2 as r2{7:0}. The only bits within the r1 option register that are significant for ish are the two lsb's namely r1{1:0}. Execution of ish would result

```
if r1{1:0}=00 then r2= 0{7:6}I{4:1}
if r1{1:0}=01 then r2= 0{7}I{5:1}
if r1{1:0}=10 then r2= 0I{6:1}
if r1{1:0}=11 then r2= I{7:1}
```

2) osh r1

Osh instruction takes one register argument (r1). This instruction simply right shifts and rotates the contents of register r1 and stores a copy of the rotated bit in the I flag. If the initial contents of r1 was designated as r1{7:0} then after the execution of the instrution osh, r1 would contain r1{0,7:1} and the I flag would contain the r1{0} bit.

3) bcap r1,r2

Bcap instruction takes two register argument with the first being the option regsiter (r1) and the second one being the operation register (r2). The format of the option and operation register of bcap is defined as follows:

a) option register

| O/E* | POP | IGP | -- | -- | -- | -- |
|---|---|---|---|---|---|---|

O/E* : odd/even parity

POP : parity options
    00        no parity
    01        force parity (odd is force to 1 and even is force to 0)

b) operation register

```
+------+------+------+------+------+------+------+------+
| ACCP | BRK  |  --  |  --  |           COUNT      -    |
+------+------+------+------+------+------+------+------+
```

ACCP : accumulated parity

BRK : the break detect

COUNT : the current count

Execution of bcap would result in several operations. First the contents of the COUNT portion of the operation register is decremented and if it becomes zero, the Z flag is set. The ACCP bit would be used to generate the new accumulated parity bit where it is stored back in ACCP. BRK bit would be the or of the BRK with I flag and stored back in BRK. The state of the BRK bit is replicated in C flag for testing. In addition, the bcap instruction generates a parity error flag (PERR) in accordance with the O/E*, parity options (POP) and ignore parity (IGP) and loads it back into the I flag.

```
-------------------------------------------------------
              FIELD WIDTH DEFINITIONS
-------------------------------------------------------
   ITEM                                  MNEMONIC
Pre-op                                   i = 1
Op-short                                 j = 3
Op-long                                  k = 5
MC ROM ADDR                              r = 10
DP SCRATCH PAD ADDR                      m = 4
DP SCRATCH PAD ADDR (for 2nd source)     n = 4
REG WIDTH                                p = 8
EXT REG ADDR                             q = 8
-------------------------------------------------------
```

```
-------------------------------------------------------
            MICROCODE IMPLEMENTAION TYPES
-------------------------------------------------------
   TYPE            CODE
                   FEDCBA9876543210
     U             ikkkkk
     V             ikkkkk      mmmm
     W             ikkkkk  nnnnmmmm
     X             ikkkkkrrrrrrrrrr
     Y             ijjjppppppppmmmm
     Z             ijjjqqqqqqqqmmmm
-------------------------------------------------------
```

NOTE: A star (*) next to a register operand indicates that the contents of that register is altered after the operation.

NOTE: In OCTAL CODE column the msb bit of the actual code determines the long (L) or short (S) coding and the octal number determines the octal value of the code.

```
------------------------------------------------------------------------------
INST  NEMON   OPER       AFFECTS   CODING    CODE              OCTAL
NUM                                TYPE      FEDCBA9876543210  CODE
------------------------------------------------------------------------------
1     mov     r1,r2*     AZ        W         010000  nnnnmmmm   20L
2     movi    n,r1*      AZ        Y         1000ppppppppmmmm    0S
3     in      pa,r1*     AZ        Z         1001qqqqqqqqmmmm    1S
4     out     r1,pa                Z         1010qqqqqqqqmmmm    2S
5     ind     r1*        AZ        V         010001      mmmm   21L
6     outd    r1                   V         010010      mmmm   22L
```

| | | | | | | |
|---|---|---|---|---|---|---|
| 7 | calls | adr | | X | 001000rrrrrrrrrr | 10L |
| 8 | jump | adr | | X | 001001rrrrrrrrrr | 11L |
| 9 | jz | adr | | X | 001010rrrrrrrrrr | 12L |
| 10 | jnz | adr | | X | 001011rrrrrrrrrr | 13L |
| 11 | jc | adr | | X | 001100rrrrrrrrrr | 14L |
| 12 | jnc | adr | | X | 001101rrrrrrrrrr | 15L |
| 13 | ji | adr | | X | 001110rrrrrrrrrr | 16L |
| 14 | jni | adr | | X | 001111rrrrrrrrrr | 17L |
| 15 | rets | | | U | 011111 | 37L |
| 16 | ldx | adr | | X | 000000rrrrrrrrrr | 00L |
| 17 | rx | adr | | X | 000001rrrrrrrrrr | 01L |
| 18 | rxz | adr | | X | 000010rrrrrrrrrr | 02L |
| 19 | rxnz | adr | | X | 000011rrrrrrrrrr | 03L |
| 20 | rxc | adr | | X | 000100rrrrrrrrrr | 04L |
| 21 | rxnc | adr | | X | 000101rrrrrrrrrr | 05L |
| 22 | rxi | adr | | X | 000110rrrrrrrrrr | 06L |
| 23 | rxni | adr | | X | 000111rrrrrrrrrr | 07L |
| 24 | add | r1,r2* | AZC | W | 010011    nnnnmmmm | 23L |
| 25 | addi | n,r1* | AZC | Y | 1011ppppppppmmmm | 3S |
| 26 | and | r1,r2* | AZ | W | 010100    nnnnmmmm | 24L |
| 27 | andi | n,r1* | AZ | Y | 1100ppppppppmmmm | 4S |
| 28 | or | r1,r2* | AZ | W | 010101    nnnnmmmm | 25L |
| 29 | ori | n,r1* | AZ | Y | 1101ppppppppmmmm | 5S |
| 30 | tst | r1,r2 | AZ | W | 010110    nnnnmmmm | 26L |
| 31 | tsti | n,r2 | AZ | Y | 1110ppppppppmmmm | 6S |
| 32 | cmp | r1,r2 | AZ | W | 010111    nnnnmmmm | 27L |
| 33 | cmpi | n,r1 | AZ | Y | 1111ppppppppmmmm | 7S |
| 34 | srl | r1* | AZC | V | 011000         mmmm | 30L |
| 35 | sll | r1* | AZC | V | 011001         mmmm | 31L |
| 36 | ish | r1,r2* | AZ | W | 011010    nnnnmmmm | 32L |
| 37 | osh | r1* | AZI | V | 011011    nnnnmmmm | 33L |
| 38 | bcap | r1,r2* | AZCI | W | 011100    nnnnmmmm | 34L |
| 39 | ---- | | | | 011101 | 35L |
| 40 | nop | | | U | 011110 | 36L |

---
FIELD WIDTH DEFINITIONS
---

| ITEM | MNEMONIC |
|---|---|
| Pre-op | i = 1 |
| Op-short | j = 3 |
| Op-long | k = 5 |
| MC ROM ADDR | r = 10 |
| DP SCRATCH PAD ADDR | m = 4 |
| DP SCRATCH PAD ADDR (for 2nd source) | n = 4 |
| REG WIDTH | p = 8 |
| EXT REG ADDR | q = 8 |

---

---
REGISTERS & FLAGS
---

Accumulator:
    Short form        Acc

Index register:

```
+-----+-----+-----+-----+-----+------------------+
|  Z  |  C  |  I  |  G  |  T  |      INDEX       |
+-----+-----+-----+-----+-----+------------------+
```
    Z    Zero flag
    C    Carry flag I   In flag
G   GLobal (G=0 indicates local) (only for opu srcatch pad addressing)
T   Transmitter (T=0 indicates receiver)

Indirect register:
    Short form          Ind

------------------------------------------------------------

NOTE: A star (*) next to a register operand indicates that the contents of
      that register is altered after the operation.

| INST | OPER | AFFECTS | MCWIDTH | = |
|------|------|---------|---------|---|
| mov   | r1,r2* | AZ  | ikmn | 14 |
| movi  | n,r1*  | AZ  | ijmp | 16 |
| ldx   | adr    |     | ikr  | 16 |
| in    | pa,r1* | AZ  | ijqm | 16 |
| out   | r1,pa  |     | ijqm | 16 |
| ind   | r1*    | AZ  | ikm  | 10 |
| outd  | r1     |     | ikm  | 10 |
|       |        |     |      |    |
| jump  | adr    |     | ikr  | 16 |
| jz    | adr    |     | ikr  | 16 |
| jnz   | adr    |     | ikr  | 16 |
| jc    | adr    |     | ikr  | 16 |
| jnc   | adr    |     | ikr  | 16 |
| ji    | adr    |     | ikr  | 16 |
| jni   | adr    |     | ikr  | 16 |
|       |        |     |      |    |
| calls | adr    |     | ikr  | 16 |
| rets  |        |     | ik   | 6  |
| rx    | adr    |     | ikr  | 16 |
| rxz   | adr    |     | ikr  | 16 |
| rxnz  | adr    |     | ikr  | 16 |
| rxc   | adr    |     | ikr  | 16 |
| rxnc  | adr    |     | ikr  | 16 |
| rxi   | adr    |     | ikr  | 16 |
| rxni  | adr    |     | ikr  | 16 |
|       |        |     |      |    |
| add   | r1,r2* | AZC | ikn  | 14 |
| addi  | n,r1*  | AZC | ijmp | 16 |
| and   | r1,r2* | AZ  | ikn  | 14 |
| andi  | n,r1*  | AZ  | ijmp | 16 |
| or    | r1,r2* | AZ  | ikn  | 14 |
| ori   | n,r1*  | AZ  | ijmp | 16 |
| xor   | r1,r2* | AZ  | ikmn | 14 |
| cmp   | r1,r2  | AZ  | ikmn | 14 |
| cmpi  | n,r1   | AZ  | ijmp | 16 |
| srl   | r1*    | AZI | ikm  | 10 |
| sll   | r1*    | AZ  | ikm  | 10 |
|       |        |     |      |    |
| ish   | r1,r2* | AZ  | ikn  | 14 |
| osh   | r1,r2* | AZI | ikn  | 14 |
| bcap  | r1,r2* | AZ  | ikn  | 14 |

Firmware code examples for Cirrus Logic MCCC Octart

Sample Counter Timer Functions:
===================================

```
; The timer code cannot exceed 45 intructions.  Therefore the total
; execution has to be split up into suitable multiples.

; Receive Timer: The receiver timer makes an initial zero check on the
; RTR. No action is taken if RTR is zero.  If RTR is non zero then  it
; is decremnented by one and the check for a zero is  made. If RTR is
; zero, then a timeout bit in the PIR(Prescaler Interface Register) is
; set.

; Transmit Timer: The transmit timer  has a simpler  function then the
; receiver timer. If the value in TTR is zero then  no action is taken
; otherwise the value is decremented by one.

$timer   in     PIR,acc         ;check bit in PIR for timer tick
                 tsti   tmtck,acc       ;
                 jnz    timer1
                 ret ;
        $timer1  in     gr4, index      ;load index register
;
        $rcvtmr  in     RTR, acc        ;check value in channel RTR
                 jz     txtmr           ;jump to transmit timer
                 addi   0FF, RTR        ;decrement the timer register
                 out    acc, RTR        ;save contents
                 jnz    txtmr           ;check for zero after decrement
                 in     RFSR, acc
                 andi   realmsk, acc    ;set timeout bit
                 out    acc, RFSR
;
        txtmr:   in     TTR, acc        ;load transmit timer counter
                 jz     next            ;load next
                 addi   0FF, TTR        ;decrement transmit timer counter
                 out    acc, TTR        ;save contents ;       upd:     inc    index
                 cmpi   8, index        ;check for last channel addi   #01,index       ;index contains the flags also
                 andi   #0f,acc         ;zero the flags
                 cmpi   #08,acc         ;compare against max chn count
;
                 jz     comp
                 out    index, gr4      ;store index back
                 ret                    ;return
        comp:    movi   0, index        ;initialize index
                 out    index, gr4
                 andi   #Ntmtck, acc    ;reset the timer tick out    acc, PIR        ;load acc, in the interface
                                        ;register
                 ret
```

Input-Bit-Engine Code:
━━━━━━━━━━━━━━━━━━━━━

Registers used:

1) opt: character options (OPU register)

```
   ---------------------
   |p|?| pty |  ccount  |
   ---------------------
   ``` bit7=odd/even, bit6=?, bit5-4=parity option, bit3-0=character length 2) rcount: character count (OPU register)
   described as above,
   needs to be written each character time. Requires a move from the opt register. The bcap instruction needs only the bit7, and bit3-0 to be defined.

3) rchar:(OPU register)   holds the most   current   state of character assembly 4) rftr: (RAM register) receive fifo temporary register 5) stat-reg:(OPU register) stores the character status of the currently assembled character 6) rber: (IBE register) receive baud rate extension register, has the baud rate count and the control options for the channel.

Certain mnemonics for depicting states have been used. They represent the following operations.

```
strt     =  start of sequence, validates start bit.
stcnt    =  sets the count from half bit to full bit
chassy   =  character assembly routine (accumulates n-1 bits)
nopty    =  assemble the last bit with no parity
chwpty   =  assemble the last character before parity
ptyacc   =  accumulate the parity bit
stpbit   =  enter stop bit sequence to check for
normal   =  normal character termination, valid stop bit
brk-dtc  =  break detect sequence, go into half bit mode
brk-chk  =  check for continuance of break
frm-err  =  framing error detected
frm-err1 =  1st half bit interrupt following framing error
frm-err2 =  2nd half bit interrupt following framing error
```

EQUATES:
```
full-cnt  (ts + 1 bit time)
half-cnt
pmsk      (parity option)
pemsk     (parity error)
sted      (start level zero detect)
coed      (start time sampling)
```

The first interrupt indicates the recognition of the start bit. The value in the baudrate count is 1/2 bit time.

```
strt:  rxni   strt                 ;invalid start, get back
                                   ;to level search
       mov    opt, rcount          ;initialize count & parity
       rx     stcnt                ;recognize validated start bit
```

;int #2: set the half-bit count to full bit count, and proceed

```
stcnt: movi   full-cnt, acc        ;001 concat full-cnt
       out    acc, rber            ;rber = rcv_bd_reg
                                   ;set count to full bit time
       rx     chassy               ;
```

;int #3: begin character assembly

```
        chassy: ish     opt,rchar           ;shift in the bit and store
                bcap    opt, rcount
                rxnz    chassy              ;check if char assy complete
                tsti    opt,pmsk            ;check for parity options
                rxz     nopty               ;character with no parity
                rx      chwpty              ;character with parity
```

;int #4 (no parity, final character bit accumulation)

```
        nopty:  ish     opt,rchar           ;rchar=in_chr_reg
                bcap    opt, rcount
                out     rchar, rftr         ;rftr = rcv_hld_reg
                movi    sted+half-cnt, acc  ;begin level search
                out     acc, rber           ;from the accumulator
                rx      stpbt
```

;int #4 (with parity, final character bit accumulation)

```
        chwpty: ish     opt,rchar
                bcap    opt, rcount
                mov     rchar, frtr
                rx      ptyacc
```

;int #5 (parity accumulation)

```
        ptyacc: movi    sted+half-cnt, acc  ;1/2 bit + begin level search
                out     acc, rber           ;move the acc contents to port
                bcap    opt, rcount
                                            ;count is over, only relevance
                jnc     ptyn                ;is the pty err bit set.
        ptyerr: ori     stat-reg, pemsk     ;set parity error bit
        ptyn:   rx      stpbt
```

;int #5 (stop bit check, without parity)
;int #6 (stop bit check, with parity)

```
        stpbt : ji      normal              ;stop bit = 1 bcap    opt, rcount         ;accumulate the stop bit
                jo      brk-dtc             ;if zero bit set then break
```

;framing error sequence

```
        frm-err: ori    stat-reg, frmerr+ccomp  ;set frame error bit
                 rx     frm-errl
```

;normal termination of character assembly

```
        normal: movi    cmd+half-cnt, acc   ;enter normal bit search
                out     acc, rber           ;command.
                ori     stat-reg,ccomp      ;indicate char complete
                rx      strt                ;return to start
```

;

```
        brk-dtc: ori    stat-reg, brk+ccomp ;set break detect bit
                 rx     brk-chk
```

;int #7 (with no parity, break detect)
;int #8 (with parity, break detect)

```
        brk-chk: rxni   brk-chk                     ;continue break
                 movi   noed+half-cnt,acc   ;set normal detect
                 out    acc, rber
                 rx     strt                ;bit engine back in
                                            ;start bit detect
```

;int #7 (with no parity, framing error)
;int #8 (with parity, framing error)

```
        frm-err1: rxni    frm-err2                ;discard bit-value
                  movi    noed+half-cnt, acc      ;in case the bit
                  out     acc, rber               ;sampled on the edge
                  rx      strt                    ;is a one or a zero
```

;int #8 (with no parity, framing error)
;int #9 (with parity, framing error)

```
        frm-err2: movi    noed+half-cnt, acc      ;not the edge mode
                                                  ;just set half-count
                  out     acc, rber               ;state
                  rxi     strt                    ;look for start edge
                  rx      stcnt                   ;start bit validated
```

Output-Engine-Code:
====================

The output channel is activated as and when it is enabled. An interrupt is asserted to the OPU on the expiration of the full bit count. This interrupt is for the next bit and not the current bit. This clearly reflects a full bit time delay in the transmission of the first character. The interrupt causes the context of the channel to be loaded, and the character is processed further on. The channel DPR (dual port ram) is reset to zero, so as to be able to transmit the start bit. At the start of transmission the foreground code for the output checks for character count to be other than a zero, signifying that the foreground can anticipate a character to be the in the transmit register. If the count is zero the foreground makes a return of context, without doing anything. In such instances, the background is in charge of the bit engine, for transmitting exceptions, such as timed-break or an idle state.

; The cnt-reg apart from accumulating parity shall also have a command bit, which the background process uses to control the foreground. A low indicates an exception process (background controlling the OBE) and a high is a normal operation (foreground controlling the OBE). The exception can exist if there are no transmit characters or when there is a break transmission. At the beginning of each character, the foreground shall check the bit in the cnt-reg to determine the action required. On a normal character transmission the bit is cleared each time a charater is transmitted.
;

Registers used:

1)      opt: channel options (same as input)

2)      tcount: channel count 3)      stop-cnt:(RAM register) stores the current stop bit count.

4)      stat-reg:(OPU register) bit5 is the only bit required by the Output foreground process.

5)      tchar: (OPU register) contains the current tranmitted character.

6)      tftr: (RAM register) contains the next character to be transmitted.

7)      tber: (OBE register) stores the channel state and the output channel baud rate count.

8)      tbr: (OBE register) stores the next bit to be transmitted.

Equates:
        cdmsk

```
        ncdmsk
        pmsk
        full-cnt
```

Mnemonic description for the states:

strt: start of transmission of a character, but a check is
made on the command bit for an exception or a normal operation.

txfst: transmission of the first bit txchr: transmission of bit2 to bitn-1 txlst: transmit the last character bit txpty: transmit the parity bit txstp: transmit the stop bit txnxt: transmit the next start bit, if the command bit is set
for normal operation.

```
;
check count register for a non-zero count
if count > 0 then proceed, else return
;
        strt:   tsti    stat-reg, cdmsk         ;check for cmd bit
                rxz     strt
                mov     opt,tcount              ;restore count
                movi    acc,0                   ;load start bit value
                out     acc, tbr                ;insert in OBE
                rx      txchr ;
transmit the first character
;
        txfst:  in      tftr, tchar             ;tx-hld-reg = tftr
                                                ;out-chr-reg = tchar osh     opt, tchar              ;transmit the character
                out     acc, tbr
                bcap    opt, tcount
                rx      txchr ;
transmit characters till count expires (n-1 characters transmitted)
;
        txchr:  andi    stat-reg,ncdmsk         ;reset the cmd bit
                osh     opt, tchar
                out     acc, tbr                ;output the msb of acc
                bcap    opt,tchar
                rxnz    txchr
                rx      txlst ;
transmit last character and check for the parity option to decide
either to process the stop bit or the parity bit
;
        txlst:  osh     opt,tchar
                out     acc, tbr
                tsti    opt, pmsk               ;check if parity is needed
                jnz     txlst1
                rxz     txstp                   ;no parity reqd
        tslst1: bcap    opt, tcount
                rx      txpty                   ;parity is required
```

```
;
load parity and proceed to the stop bit transmit
;

txpty:  mov     tcount, acc         ;load parity bit (msb)
                out     acc, tbr            ;store in OBE
                rx      txstp ;
load the stop count and return to start
;

txstp:  movi    80, acc             ;load stop bit value
                out     acc, tbr
                in      stp-cnt,acc         ;load stop count
                out     acc, tber
                rx      txnxt               ;return to strt after transmit
                                            ;is over.

'
load full bit count back into the transmit baud rate register
check to see if the next character is ready
;

txnxt:  movi    full-cnt, acc       ;replace count = full-cnt out     acc, tber
                tsti    stat-reg, rmsk      ;check for next char ready
                rxz     strt

******(not needed if accumulator msb is zero***
                movi .  acc,0               ;can be omitted if acc(msb)=0 out     acc, tbr            ;load start bit
                rx      txchr
```

We claim:

1. An apparatus which serves as a communications interface for transferring data characters and associated status information between a host computing device and a set of one or more external computing devices comprising:

a storage area, said storage area comprising means for storing a plurality of said data characters, said data characters comprising one or more bits of data;

first transmitting means connected between said storage area and said host computing device for transmitting said data characters from said storage area to said host processor;

first receiving means connected between said storage area and said host computing device for receiving said data characters from said host computing device and storing said data characters in said storage area;

second receiving means having an input coupled to one or more external devices for receiving one or more bits of data per unit time from one or more of said external devices, said second receiving means having an output;

second transmitting means having an input for receiving bits of data and having an output coupled to at least one of said external devices for sending one or more bits of data per unit time to one or more of said external devices;

assembly means having an input and output, and including means coupling said input to the output of said second receiving means, said assembly means functioning to assemble said one or more bits of data received by said second receiving means into data characters and provide said data characters at said output;

means coupling said output terminal of said assembly means to said storage area for storing said assembly data characters in said storage area;

disassembly means having an input and an output, including means coupling said input of said disassembly means to said storage area for receiving and for disassembling data characters received by said first receiving means and stored in said storage area into one or more bits of data which are provided at said output of said disassembly means to be sent to said one or more of said external devices by said second transmitting means;

means coupling said output of said disassembly means to said input of said second transmitting means; and programming means coupled to said disassembly means and said assembly means for programming said apparatus, said programming means comprising means for modifying the steps by which said apparatus assembles and disassembles data characters.

2. An apparatus as in claim 1, also comprising:

detection means having an input and an output, and including means coupling said input of said detection means to said output of said assembly means, said detection means including means for categorizing data characters according to preselected criteria, means for identifying a change of category of received data characters from those belonging to a first category to those belonging to a second category and for producing at said output a first signal; and host signaling means having an input and an output, and including means coupling said input of said host signaling means to said output of said detection means, said host signaling means including means responsive to receipt of said first signal to produce at its output a signal for transmission to said host computing device identifying the availability of one or more characters of the first category type.

3. An apparatus as in claim 1, wherein said first transmitting means for transmitting data characters to said host computing device and said first receiving means for receiving data characters from said host computing device also comprise, means for accessing the location in said storage area from which said data characters will be transmitted to, or received from, said host computing device, without receiving said location from said host computing device.

4. An apparatus as in claim 1, wherein said assembly means and disassembly means further include:

a control storage area, including a plurality of locations each containing a control word, each of said control words comprising a plurality of control signals which direct said apparatus to perform a particular function, a context storage area including a plurality of locations each containing a vector, each of said vectors identifying the location in said control storage area of the first control word of a pre-defined sequence of said control words, means for executing a plurality of control words in a predefined sequence, comprising means for determining, after a data character has been disassembled into one or more bits of data and said one or more bits of data have been transmitted to one of said external computing devices, to which external computing device said one or more bits of data were transmitted, means for determining, after one or more bits of data have been received from one of said external computing device and said one or more bits of data have been assembled into a data character, from which external computing device said one or more bits of data were received, means for determining the vector corresponding to said external computing device from which said one or more bits of data were transmitted or received, and for using said vector to access the first location of its associated control words, means for executing the control word at said accessed location, and each subsequent control word in said predefined sequence, by causing said control words to cause said apparatus to perform a first function, and means for modifying the vector corresponding to an external device so that the modified vector specifies a different first control word of another sequence for performing a second function, said means for modifying the vector is employed within each predefined control sequence to produce a predetermined series of functions performed on the one or more bits of data received from or transmitted to said external computing device.

5. An apparatus as in claim 4, wherein said means for modifying the vector corresponding to an external device from which said data character was transmitted or received, comprises means for executing a control word comprising
a plurality of control signals which cause said apparatus to so modify said vector.

6. An apparatus as in claim 1, wherein said assembly means further comprises means for executing a control word, said control word comprising
a plurality of control signals which cause said apparatus to perform a function which, when repeated (n) times, where (n) is the number of bits in a character being assembled, causes the assembled (n)-bit character to be right justified in a data storage device having at least (n) storage locations, said function comprising the steps of
using a first portion of said control word to select a data storage device having data that defines (n),
using a second portion of said control word to identify the data storage device in which said character is being assembled,
using a third portion of said control word to specify:
shifting the bits in said data storage device one bit to the right,
inserting a bit received from an external computing device into the storage location corresponding to the most significant bit of said character being assembled, and
inserting a zero into each storage location of said data storage device more significant than the storage location containing the most significant bit of said bits.

7. An apparatus as in claim 1, wherein said disassembly means further comprises means for executing a control word, said control word comprising
a plurality of control signals which cause said apparatus to use portions of said control word to identify the data storage device from which a character is being disassembled, and to shift the bits in said identified data storage device, and
means for storing the least significant bit, prior to said shift, of said identified data storage device to be transmitted to one of said external devices by said means of transmitting said one or more bits.

8. An apparatus as in claim 1, wherein said assembly and disassembly means further comprises means for executing a control word, said control word comprising a plurality of control signals which cause said apparatus to perform a plurality of intermediate functions which, when repeated (n) times, once for each bit in the character as the bit is received from or transmitted to the external computing device, where (n) is the number of bits in said character being assembled or disassembled, supports the assembly or disassembly of an (n)-bit character, wherein said intermediate functions comprise using a first portion of said control word to identify a data storage device in which predetermined character parity options are stored, using a second portion of said control word to identify a data storage device in which parity accumulation, running break detection status, and a running bit count for the character being assembled or disassembled are stored, determining the accumulated parity of said character being assembled or disassembled, based upon the bits received or transmitted for said character being assembled or disassembled and the predetermined parity option, determining the accumulated break detection status of said character being assembled, based upon the bits received for said character being assembled, and determining the number of bits received or transmitted for said character being assembled or disassembled, and wherein status bits of said apparatus are set to indicate the parity error status of said assembled character, the break condition status of said assembled character, and the number of bits of said assembled or disassembled character.

9. In a system capable of transmitting and receiving a plurality of categories of data characters between a host computing device and an external computing device, at least one of which categories requires different processing by the host computing device than other categories, a method of informing the host computing device of the category of data characters received from an external computing device, said method comprising the steps of:

categorizing each received data character into one of the selected plurality of categories; and informing the host computing device that one or more characters of a selected category have been received.

10. A method as in claim 9, also comprising the steps of:

counting the number of data characters of a selected category; and informing said host computing device the number of data characters then in said selected category.

11. A method as in claim 9 wherein said categories of data characters comprise an error data category, in which an error occurred in transmitting a data character from said external computing device, an exception data category, which denotes that a data character is one of a pre-defined set of of special exception data characters, and a good data category, which denotes that a data character is neither of an error data category nor of an exception data category.

12. An apparatus for receiving data characters comprising one or more bits of data, said apparatus comprising:

data character receiving means for receiving data characters from (n) sources and identifying the source of the received characters, said data character receiving means having an input for receiving said data characters and for providing at an output m, signals identifying the source of related data characters;

a control storage area, including a plurality of locations each containing a control word, each of said control words comprising a plurality of control signals which direct said apparatus to perform a particular function, a context storage area including (n) locations each containing a vector, each of said vectors being uniquely associated with one of said (n) sources of data characters, which identifies the location in said control storage area of the first control word of a pre-defined sequence of said control words, said context storage area having an output for providing said vectors to said control storage area and an input for receiving from said data character receiving means said signals identifying the source of received data characters, means coupling said output m of said data character receiving means to said input of said context storage area;

means for determining the vector corresponding to the one of said n sources of data characters from which said data character was received, and for using said vector to access the first location of its associated control word in said control storage area, means coupled to said control storage area for executing the control word at said accessed location, and each subsequent control word in a predefined sequence, by causing said control words to cause said apparatus to perform a first function, and means for modifying the vector corresponding to one of said n sources of data characters so that the modified vector specifies a different first control word of another sequence of control words for performing a second function, said means for modifying the vector is employed within each predefined control sequence to produce a predetermined series of functions performed in response to the receipt of data characters.

13. An apparatus as in claim 12, wherein said means for modifying vectors comprise means for executing a control word comprising a plurality of control signals which cause said apparatus to modify said vector.

14. A method for assembling bits of data into a data character having one or more bits, said method being implemented utilizing an array of storage registers, each register having storage locations for at least (n) bits, and means for executing a control word to access said registers in said array, said method comprising the steps of:

utilizing a control word to direct the assembly of bits into a storage register, said control word comprising a plurality of control signals which cause said means for executing said control word to perform a function which, when repeated (n) times, where (n) is the number of bits in said data character being assembled, causes the assembled (n)-bit data character to be right justified in a first data storage register in said array, said function comprising the steps of using a first portion of said control word to select a second data storage register in said array having data that defines (n), using a second portion of said control word to identify said first register, using a third portion of said control word to direct;

shifting the bits in said first register one bit to the right, inserting the next bit in the sequence of bits comprising the data character into the bit position in the first register in which the data character is being assembled corresponding to the most significant bit, and inserting a zero into each storage location of said first register more significant than the storage location containing the most significant bit of said (n) bits.

15. A method for disassembling data characters having one or more bits of data into a sequence of bits, said method being implemented utilizing an apparatus comprising an array of storage registers, each register having storage locations for at least (n) bits, and a storage device for storing a bit of said sequence of bits and means for executing a control word to access said registers in said array and said storage device, said method comprising the steps of:

utilizing a control word to direct the disassembly of a data character in a storage register, said control word comprising a plurality of control signals which cause said apparatus to use portions of said control word to identify the data storage register containing the data character to be disassembled, and to shift the bits of said data storage register and to cause said apparatus to store the least significant bit in said storage device prior to said shift of said identified data storage register.

16. A method for assembling bits of data into a data character having one or more bits or disassembling a data character having one or more bits into a sequence of bits, said method being implemented utilizing an apparatus comprising an array of storage registers, each register having storage locations for at least (n) bits, and means for executing a control word to access said registers in said array, said control word comprising a plurality of control signals which cause said apparatus to perform a plurality of functions which, when repeated (n) times, once for each bit in the data character where (n) is the number of bits in said data character being assembled or disassembled, supports the assembly or disassembly of an (n)-bit data character, said method comprising the steps of:

using a first portion of said control word to identify a first data storage register in said array in which predetermined data character parity options are stored, using a second portion of said control word to identify a second data storage register is said array in which parity accumulation, running break detection status, and a running bit count for the character being assembled or disassemble are stored, determining the accumulated parity of said character being assembled or disassembled based upon the bits received or transmitted for said data character being assembled or disassembled and the predetermined parity option, determining the accumulated break detection status of said character being assembled based upon the bits received for said data character being assembled, determining the number of bits received or transmitted for said character being assembled or disassembled, and setting status bits of said apparatus to indicate the parity error status of said assembled data character, the break condition status of said assembled data character, and the number of bits of said assembled or disassembled data character.

17. An apparatus for transmitting data characters comprising one or more bits of data, said apparatus comprising:

data character transmitting means for transmitting data characters to (n) destinations and identifying the destination of the transmitted data characters, said data character transmitting means having an output for transmitting said data characters and for providing, at an output m, a signal identifying the destination of transmitted data characters;

a control storage data, including a plurality of locations each containing a control word, each of said control words comprising a plurality of control signals which direct said apparatus to perform a particular function;

a context storage area including (n) locations each containing a vector, each of said vectors being uniquely associated with one of said (n) destinations of data characters, which identifies the location in said control storage area of the first control word of a pre-defined sequence of said control words, said context storage area having an output for providing said vectors to said control storage area and an input for receiving from said data character transmitting means said signals identifying the destination of transmitted data characters;

means coupling said output m of said data character transmitting means to said input of said context storage area;

means for determining the vector corresponding to the one of said (n) destinations identified by the signal at said output m, and for using said vector to access the first location of its associated control word in said control storage area;

means coupled to said control storage area for executing the control word at said accessed location, and each subsequent control word in a predefined sequence, by causing said control words to cause said apparatus to perform a first function; and means for modifying the vector corresponding to one of said (n) destinations of data characters so that the modified vector specifies a different first control word of another sequence of control words for performing a second function, said means for modifying the vector is employed within each predefined control sequence to produce a predetermined series of functions performed in the transmission of data characters.

18. An apparatus as in claim 17, wherein said means for modifying vectors comprise means for executing a control word comprising a plurality of control signals which cause said apparatus to modify said vector.

* * * * *

UNITED STATES PATENT AND TRADEMARK OFFICE
CERTIFICATE OF CORRECTION

PATENT NO.  : 4,975,828
DATED       : December 4, 1990
INVENTOR(S) : Wishneusky et al.

It is certified that error appears in the above-identified patent and that said Letters Patent is hereby corrected as shown below:

Title Page:
ABSTRACT - line 16, delete "Custon" and insert --Custom--.

Column 9, line 63, delete "SCN6861" and insert --SCN68661--.

Column 31, line 8, delete "BIt" and insert --Bit--.

Column 31, line 61-68, insert --;-- before "invalid", before "initialize" and before "recognize".

Column 104, line 57 (Claim 1), delete "assembly" and insert --assembled--.

UNITED STATES PATENT AND TRADEMARK OFFICE
CERTIFICATE OF CORRECTION

PATENT NO. : 4,975,828

DATED : December 4, 1990

INVENTOR(S) : Wishneusky et al

It is certified that error appears in the above-identified patent and that said Letters Patent is hereby corrected as shown below:

Column 107, line 67 (Claim 11), delete "of" (third occurrence).

Signed and Sealed this

Fourth Day of May, 1993

Attest:

MICHAEL K. KIRK

Attesting Officer

Acting Commissioner of Patents and Trademarks